(12) United States Patent
Liu

(10) Patent No.: US 12,413,546 B2
(45) Date of Patent: Sep. 9, 2025

(54) EMAIL MANAGEMENT METHOD AND ELECTRONIC DEVICE

(71) Applicant: Honor Device Co., Ltd., Shenzhen (CN)

(72) Inventor: Fucheng Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/036,090

(22) PCT Filed: Apr. 14, 2022

(86) PCT No.: PCT/CN2022/086901
§ 371 (c)(1),
(2) Date: May 9, 2023

(87) PCT Pub. No.: WO2022/257599
PCT Pub. Date: Dec. 15, 2022

(65) Prior Publication Data
US 2024/0007430 A1 Jan. 4, 2024

(30) Foreign Application Priority Data
Jun. 11, 2021 (CN) .......................... 202110654171.6

(51) Int. Cl.
*H04L 51/234* (2022.01)
*G06F 40/166* (2020.01)
(Continued)

(52) U.S. Cl.
CPC .......... *H04L 51/234* (2022.05); *G06F 40/166* (2020.01); *G06Q 10/101* (2013.01); *G06Q 10/107* (2013.01); *H04L 51/42* (2022.05)

(58) Field of Classification Search
CPC ....... H04L 51/224; H04L 51/48; H04L 51/02; H04L 67/535; H04L 12/1822;
(Continued)

(56) References Cited

U.S. PATENT DOCUMENTS 7,921,174 B1 * 4/2011 Denise ................. G06Q 10/107
709/224
9,654,435 B2 5/2017 Kim et al.
(Continued)

FOREIGN PATENT DOCUMENTS

| CN | 105262673 A | 1/2016 |
| CN | 108418748 A | 8/2018 |

(Continued)

*Primary Examiner* — Djenane M Bayard
(74) *Attorney, Agent, or Firm* — Slater Matsil, LLP

(57) ABSTRACT

Embodiments of this application provide an email management method and an electronic device, and relate to the field of computer technologies, so as to resolve a problem that reply emails cannot be checked in a timely manner and accurately. A specific solution is as follows: An electronic device sends a first email to email receiving devices, where the first email is an email configured with time limit information, and the time limit information is used to instruct the email receiving devices to provide a handling reminder for the first email; the electronic device receives reply emails to the first email from the email receiving devices.

20 Claims, 43 Drawing Sheets

(51) Int. Cl.
*G06Q 10/101* (2023.01)
*G06Q 10/107* (2023.01)
*H04L 51/42* (2022.01)

(58) Field of Classification Search
CPC ....... H04L 51/42; H04L 51/216; H04L 51/00;
H04L 51/18; H04L 51/52; H04L 12/1895;
H04L 63/0428; H04L 67/52; H04L
51/066; H04L 51/234; H04L 51/046;
H04L 51/23; H04L 63/123; H04L 51/04;
H04L 51/08; H04L 51/212; H04L 51/222;
H04L 51/10; H04L 51/214; H04L
63/0421; H04L 63/101; H04L 67/146;
H04L 9/00; H04L 9/32; H04L 2209/42;
H04L 63/08; H04L 63/10; H04L 63/104;
H04L 12/1813; H04L 12/1827; H04L
12/28; H04L 12/4641; H04L 51/063;
H04L 51/56; H04L 63/0823; H04L
65/1016; H04L 65/1063; H04L 65/1069;
H04L 65/1095; H04L 65/1104; H04L
67/02; H04L 67/142; H04L 67/303; H04L
69/24; H04L 69/28; G06F 16/38; G06F
21/6227; G06F 2221/2107; G06F 16/29;
G06F 16/3326; G06F 16/335; G06F
16/337; G06F 16/904; G06F 16/9535;
G06F 16/9537
See application file for complete search history.

(56) References Cited

U.S. PATENT DOCUMENTS

| | | | |
|---|---|---|---|
| 2001/0051935 A1* | 12/2001 | Sugiura | G06Q 10/109 706/12 |
| 2006/0031356 A1 | 2/2006 | Drouet et al. | |
| 2006/0041626 A1* | 2/2006 | Chen | H04L 51/234 709/217 |
| 2007/0061423 A1 | 3/2007 | Accapadi et al. | |
| 2007/0282660 A1* | 12/2007 | Forth | G06Q 10/10 705/7.15 |
| 2009/0222299 A1* | 9/2009 | Clemenson | G06Q 10/063118 705/7.17 |
| 2009/0299811 A1* | 12/2009 | Verfuerth | G06Q 10/06311 705/7.13 |
| 2017/0346866 A1* | 11/2017 | Champel | H04N 21/44 |
| 2018/0152407 A1 | 5/2018 | Soni | |

FOREIGN PATENT DOCUMENTS

| | | |
|---|---|---|
| CN | 111064638 A | 4/2020 |
| CN | 111080223 A | 4/2020 |
| CN | 113506079 A | 10/2021 |
| CN | 113595865 A | 11/2021 |
| EP | 2830263 A1 | 1/2015 |
| TW | 200922275 A | 5/2009 |

* cited by examiner

EMAIL MANAGEMENT METHOD AND ELECTRONIC DEVICE

CROSS-REFERENCE TO RELATED APPLICATIONS

This application is a national stage of International Application No. PCT/CN2022/086901, filed on Apr. 14, 2022, which claims priority to Chinese Patent Application No. 202110654171.6, filed on Jun. 11, 2021. The disclosures of both of the aforementioned applications are hereby incorporated by reference in their entireties.

TECHNICAL FIELD

This application relates to the field of computer technologies, and in particular, to an email management method and an electronic device.

BACKGROUND

Electronic mail (referred to as email) is a communication method that provides information exchange by electronic means, and is a widely used service on the Internet. By using an email, a user can contact another user anywhere in the world. In a process of daily work and business transactions, emails sent by a user (for example, referred to as a publisher) often require recipients of the emails to handle and reply in a timely manner. The user is also required to regularly check replies to a sent first email and urge a recipient who has not handled the email.

However, a mailbox of the user may receive a large quantity of other emails every day. If the user confirms whether a recipient has completed replying to the first email by checking received emails one by one, it inevitably leads to relatively low efficiency of human-computer interaction and relatively low intelligence.

SUMMARY

Embodiments of this application provide an email management method and an electronic device, which automatically count and display a reply state corresponding to a first email, so that there is no need to manually check received emails one by one, thereby improving efficiency of human-computer interaction and intelligence of email data.

To achieve the foregoing objective, the following technical solutions are used in the embodiments of this application:

According to a first aspect, an embodiment of this application provides an email management method. The method further includes: An electronic device sends a first email to email receiving devices, where the first email is an email configured with time limit information, and the time limit information is used to instruct the email receiving devices to provide a handling reminder for the first email; the electronic device receives reply emails to the first email from the email receiving devices; the electronic device counts a reply state corresponding to the first email; and the electronic device displays the reply state corresponding to the first email on a task management interface of an email application, where the reply state includes a reply state of at least one reply email corresponding to the first email.

In the foregoing embodiment, after sending the first email, the electronic device can not only count the reply emails in real time, but also display the reply state on the task management interface of the email application. In this way, with regard to the first email configured with the time limit information, that is, the email that a recipient needs to be urged to handle in a timely manner, a user does not need to check whether the received mass emails include a reply email to the first email. There is no need to manually count a handling status corresponding to the first email. Therefore, efficiency of human-computer interaction is improved.

With reference to the first aspect, in a possible implementation, the method further includes:

The electronic device receives emails, and parses out a reply chain of each of the emails from an email header of the email; and confirm that a source email indicated by the reply chain is the first email, and determine that the email is a reply email to the first email.

In the foregoing embodiment, accuracy of identifying the reply email corresponding to the first email is improved.

With reference to the first aspect, in a possible implementation, the task management interface further includes a handling state of a second email, where the second email is an email received by the electronic device and has time limit information, and the handling state includes "handled" and "unhandled". With reference to the first aspect, in a possible implementation, the reply state includes a reply proportion chart and/or a reply proportion; and the electronic device counts a quantity of the reply emails and a total quantity of receiving mailboxes corresponding to the first email, and determines the reply proportion chart and/or the reply proportion.

For example, the reply state may be a reply proportion chart, that is, a graph representing a proportion of a quantity of receiving mailboxes that have replied to the first email in a quantity of all receiving mailboxes corresponding to the first email.

For another example, the reply state may alternatively be a reply proportion, that is, a value representing a proportion of a quantity of receiving mailboxes that have replied to the first email in a quantity of all receiving mailboxes corresponding to the first email.

For another example, the reply state may alternatively include both a reply proportion chart and a reply proportion.

With reference to the first aspect, in a possible implementation, the task management interface further includes a task item corresponding to the first email, and the method further includes:

When receiving an operation on the task item, the electronic device displays reply details about the first email, where the reply details include information representing whether the receiving mailboxes corresponding to the first email reply.

With reference to the first aspect, in a possible implementation, the time limit information includes a reminder time point, and the method further includes:

When a system time reaches the reminder time point, the electronic device displays a task item of the first email on top and/or a to-do mark corresponding to the task item of the first email on the task management interface.

For example, when the system time reaches the reminder time point, the task item of the first email may be displayed on top of the task management interface. Therefore, the user is reminded to pay attention to the sent first email, so as to avoid forgetting the sent first email. In this way, even if a receiving mailbox has not completed a reply to the first email, the user can still perform targeted urging for handling.

For another example, when the system time reaches the reminder time point, a to-do mark corresponding to the task item of the first email may be displayed. Therefore, the user is reminded to pay attention to the sent first email, so as to avoid forgetting the sent first email. In this way, even if a receiving mailbox has not completed a reply to the first email, the user can still perform targeted urging for handling.

For another example, when a system time reaches the reminder time point, on the task management interface, a task item of the first email may be displayed on top and a to-do mark corresponding to the task item of the first email may be displayed.

In addition, in some possible embodiments, the user may further set a preset prompt time point different from the reminder time point, so that when the system time reaches the preset prompt time point, on the task management interface, a task item of the first email is displayed on top and/or a to-do mark corresponding to the task item of the first email is displayed.

With reference to the first aspect, in a possible implementation, the time limit information includes a reminder time point, and the method further includes:

When a system time reaches the reminder time point, the electronic device displays the first email on top and/or a to-do mark corresponding to the first email on an outbox interface of the email application.

For example, when a system time reaches the reminder time point, the first email is displayed on top of an outbox interface of the email application.

For another example, when a system time reaches the reminder time point, on an outbox interface of the email application, a to-do mark corresponding to the first email is displayed.

In addition, in some possible embodiments, the user may further set a preset prompt time point different from the reminder time point, so that when the system time reaches the preset prompt time point, on the outbox interface of the email application, the first email is displayed on top and/or a to-do mark corresponding to the first email is displayed.

With reference to the first aspect, in a possible implementation, the time limit information includes a deadline, and the method further includes:

When the system time exceeds the deadline, and no reply email to the first email is received from at least one receiving mailbox, the electronic device displays an overdue mark corresponding to the task item of the first email on the task management interface, and/or displays the task item of the first email on top of the task management interface.

For example, when the system time exceeds the deadline, and no reply email to the first email is received from at least one receiving mailbox, an overdue mark corresponding to the task item of the first email is displayed on the task management interface.

For another example, when the system time exceeds the deadline, and no reply email to the first email is received from at least one receiving mailbox, on the task management interface, an overdue mark corresponding to the task item of the first email is displayed, and/or the task item of the first email is displayed on top.

In addition, in some possible embodiments, the user may further set a preset overdue prompt time different from the deadline. In this way, when the system time exceeds the overdue prompt time, and no reply email to the first email is received from at least one receiving mailbox, the electronic device displays an overdue mark corresponding to the task item of the first email on the task management interface, and/or displays the task item of the first email on top of the task management interface.

With reference to the first aspect, in a possible implementation, the time limit information includes a deadline; and the method further includes: When the system time exceeds the deadline, and no reply email to the first email is received from at least one receiving mailbox, the electronic device displays an overdue mark corresponding to the first email on the outbox interface of the email application, and/or displays the first email on top of the outbox interface.

With reference to the first aspect, in a possible implementation, the method further includes: providing a reminder for the first email by using a calendar application or an alarm clock application in the electronic device, to prompt a user to check the reply state of the first email.

In the foregoing embodiment, the user can also be reminded in a timely manner in a scenario in which the user does not start the email application.

With reference to the first aspect, in a possible implementation, before the providing a reminder for the first email by using a calendar application or an alarm clock application in the electronic device, the method further includes: based on the time limit information, configuring a schedule reminder in the calendar application, and/or configuring an alarm clock reminder in the alarm clock application.

According to a second aspect, an embodiment of this application provides an electronic device, where the electronic device includes one or more processors, one or more memories, and a wireless communication module; and the one or more memories and the wireless communication module are coupled to the one or more processors; and the one or more memories are configured to: send a first email to email receiving devices, where the first email is an email configured with time limit information, and the time limit information is used to instruct the email receiving devices to provide a handling reminder for the first email; receive reply emails to the first email from the email receiving devices; count a reply state corresponding to the first email; and display the reply state corresponding to the first email on a task management interface of an email application, where the reply state includes a reply state of at least one reply email corresponding to the first email.

With reference to the second aspect, in a possible implementation, the one or more memories are further configured to: receive emails, and parse out a reply chain of each of the emails from an email header of the email; and confirm that a source email indicated by the reply chain is the first email, and determine that the email is a reply email to the first email.

With reference to the second aspect, in a possible implementation, the task management interface further includes: The one or more memories are further configured to receive a handling state of an email with time limit information, where the handling state includes "handled" and "unhandled".

With reference to the second aspect, in a possible implementation, the reply state includes a reply proportion chart and/or a reply proportion; and the one or more memories are further configured to count a quantity of the reply emails and a total quantity of receiving mailboxes corresponding to the first email, and determine the reply proportion chart and/or the reply proportion.

With reference to the second aspect, in a possible implementation, the task management interface further includes a task item corresponding to the first email, and when receiving an operation on the task item, the one or more memories are further configured to display reply details about the first email, where the reply details include information representing whether the receiving mailboxes corresponding to the first email reply.

With reference to the second aspect, in a possible implementation, the time limit information includes a reminder time point; and when a system time reaches the reminder time point, the one or more memories are further configured to display, on the task management interface, a task item of the first email on top and/or a to-do mark corresponding to the task item of the first email.

With reference to the second aspect, in a possible implementation, the time limit information includes a reminder time point; and when a system time reaches the reminder time point, the one or more memories are further configured to display the first email on top and/or a to-do mark corresponding to the first email on an outbox interface of the email application.

With reference to the second aspect, in a possible implementation, the time limit information includes a deadline; and when the system time exceeds the deadline, and no reply email to the first email is received from at least one receiving mailbox, the one or more memories are further configured to display, on the task management interface, an overdue mark corresponding to the task item of the first email, and/or display the task item of the first email on top of the task management interface.

With reference to the second aspect, in a possible implementation, the time limit information includes a deadline; and when the system time exceeds the deadline, and no reply email to the first email is received from at least one receiving mailbox, the one or more memories are further configured to display an overdue mark corresponding to the first email on the outbox interface of the email application, and/or display the first email on top of the outbox interface.

With reference to the second aspect, in a possible implementation, the one or more memories are further configured to: provide a reminder for the first email by using a calendar application or an alarm clock application in the electronic device, to prompt a user to check the reply state of the first email.

With reference to the second aspect, in a possible implementation, the one or more memories are further configured to: based on the time limit information, configure a schedule reminder in the calendar application, and/or configure an alarm clock reminder in the alarm clock application.

According to a third aspect, an embodiment of this application provides a computer storage medium including computer instructions, where when the computer instructions are run on an electronic device, the electronic device is enabled to perform the method according to any one of the first aspect or the possible design methods of the first aspect.

According to a fourth aspect, an embodiment of this application provides a computer program product, where when the computer program product runs on a computer, the computer is enabled to perform the method according to any one of the first aspect or the possible design methods of the first aspect.

It can be understood that the electronic device according to any one of the second aspect or the possible design methods of the second aspect, the computer storage medium according to the third aspect, and the computer program product according to the fourth aspect that are described above are all used to perform the foregoing corresponding methods. Therefore, for beneficial effects that can be achieved by the electronic device, the computer storage medium, and the computer program product, refer to the beneficial effects of the foregoing corresponding methods. Details are not described herein again.

DETAILED DESCRIPTION OF ILLUSTRATIVE EMBODIMENTS

The terms "first" and "second" are used herein for description only, and cannot be understood as indicating or implying relative importance or implicitly indicating the quantity of indicated technical features. Therefore, the features defined with "first" and "second" can explicitly or implicitly include one or more of the features. In the description of embodiments, unless otherwise specified, "a plurality of" means two or more.

Implementations of this application are described in detail below with reference to the accompanying drawings.

Figure 1:
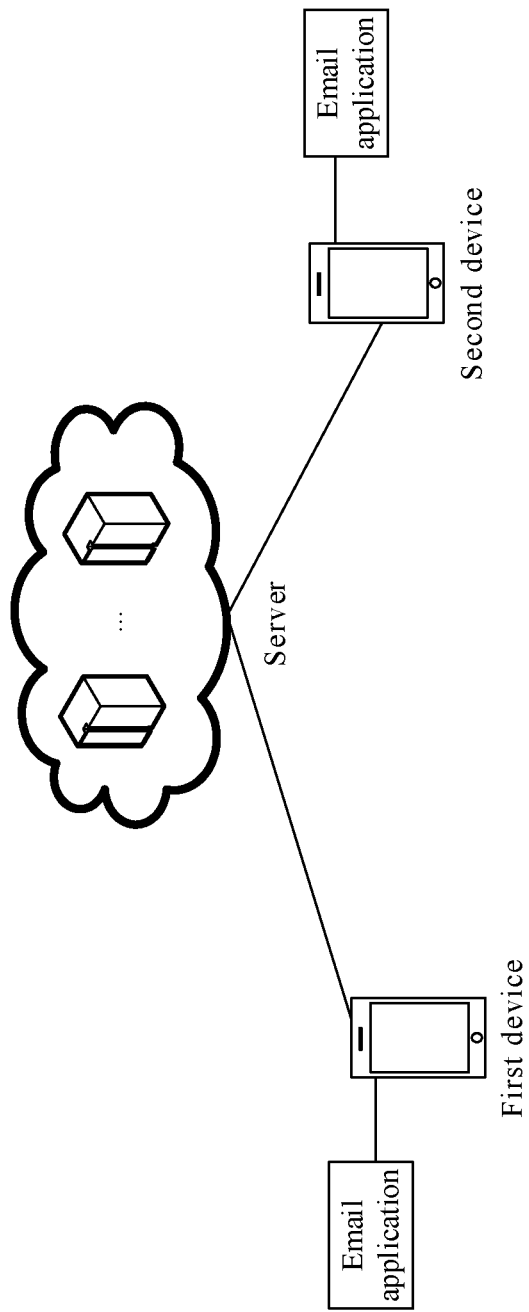
FIG. 1 is a schematic diagram of a system architecture according to an embodiment of this application.

FIG. 1 is a schematic diagram of a system architecture according to an embodiment of this application, including two electronic devices: a first device and a second device, and further includes one or more servers. An email application (application, APP) may be installed on the first device and the second device. The first device and the second device each can obtain an email service from a corresponding server by using the email APP. For example, on the first device and the second device, a mailbox of the user is logged in by using the email APP, and then a server corresponding to the mailbox (hereinafter referred to as the corresponding server) is logged in to implement email transceiving.

It can be understood that the first device and the second device may assume different roles in an email transceiving process. For example, the first device may be an email sending end, that is, the first device assumes a role of sending an email; and the second device may be an email receiving end, that is, the second device assumes a role of receiving an email. In this way, the first device may send an email to the second device by using a corresponding server. The second device may also receive, by using a corresponding server, an email sent by the first device.

For another example, the first device may be an email receiving end, and the second device may be an email sending end. In this way, the second device may send an email to the first device by using a corresponding server. In addition, the first device may also receive, by using a corresponding server, an email sent by the second device.

For example, the electronic device (for example, the first device or the second device) in this embodiment of this application may be a device on which the foregoing email application may be installed, such as a mobile phone, a tablet computer, a desktop computer, a handheld computer, a notebook computer (laptop), an ultra-mobile personal computer (ultra-mobile personal computer, UMPC), a netbook, a personal digital assistant (personal digital assistant, PDA), or an augmented reality (augmented reality, AR)/virtual reality (virtual reality, VR) device. A specific form of the electronic device is not specially limited in this embodiment of this application.

An operating system of the electronic device may be Android (Android), HarmonyOS, IOS, or another operating system. An operating system type of the electronic device is not limited in this embodiment of this application.

Figure 2:
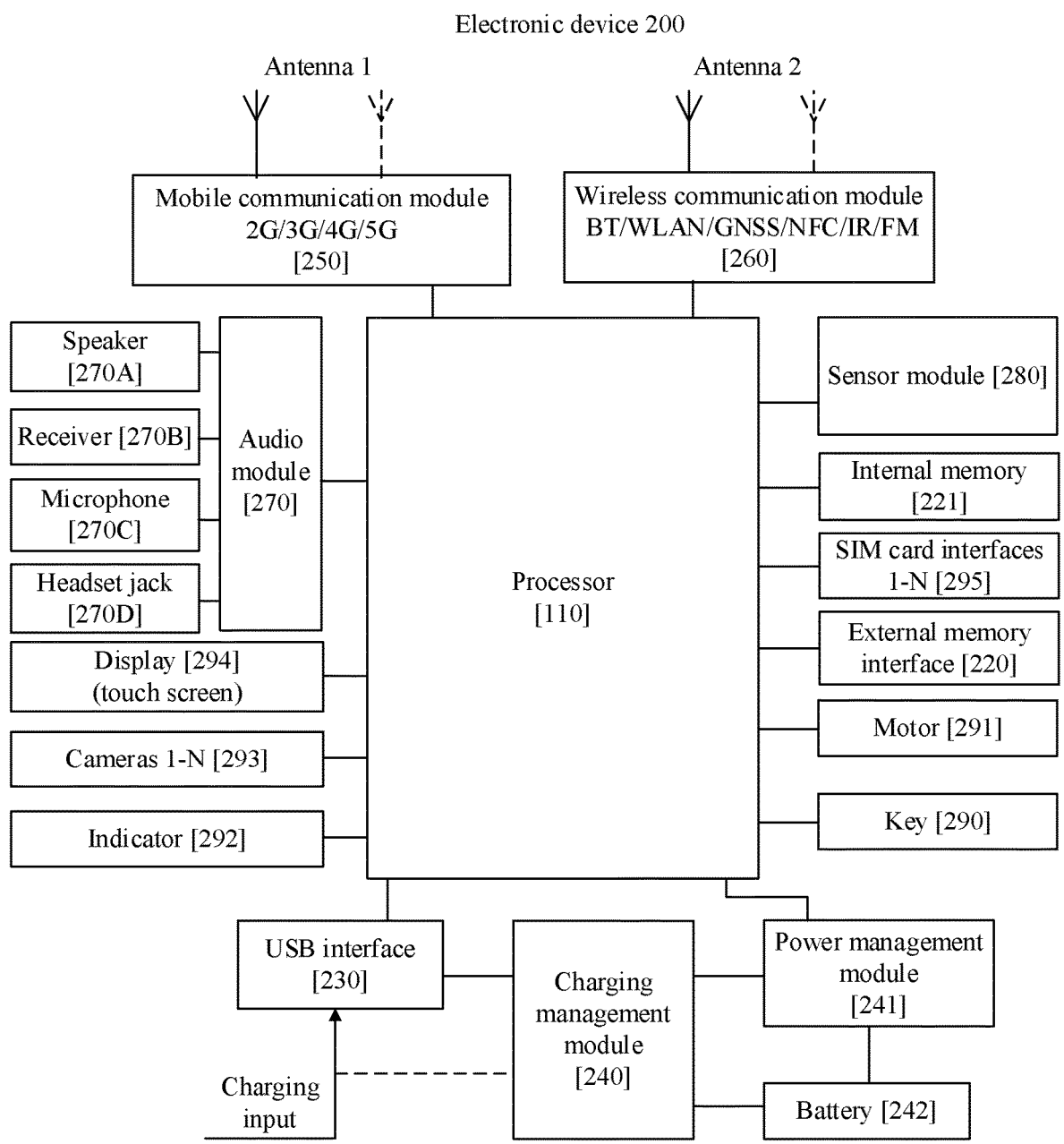
FIG. 2 is a schematic diagram of a hardware structure of an electronic device according to an embodiment of this application.

In this embodiment of this application, the structure of the electronic device according to this embodiment of this application is described based on an example in the first device or the second device shown in FIG. 2 is an electronic device 200 (such as a mobile phone). As shown in FIG. 2, the electronic device 200 (such as a mobile phone) may include: a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display 294, a subscriber identification module (subscriber identification module, SIM) card interface 295, and the like.

The sensor module 280 may include sensors such as a pressure sensor, a gyro sensor, a barometric pressure sensor, a magnetic sensor, an acceleration sensor, a distance sensor, a proximity sensor, a fingerprint sensor, a temperature sensor, a touch sensor, an ambient light sensor, and a bone conduction sensor.

It can be understood that the structure illustrated in this embodiment does not constitute a specific limitation on the electronic device 200. In some other embodiments, the electronic device 200 may include more or fewer components than those shown in the figure, or combine some components, or split some components, or have different component arrangements. The illustrated components may be implemented by using hardware, software or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device 200. The controller can generate an operation control signal based on instruction operation codes and a timing signal, and complete the control of fetching and executing instructions.

The processor 210 may be further provided with a memory for storing instructions and data. In some embodiments, the memory in the processor 210 is a cache memory. The memory can store an instruction or data that the processor 210 has just used or used cyclically. If the processor 210 needs to use the instruction or data again, the instruction or data can be directly invoked from the memory. Repeated access is avoided, and a waiting time of the processor 210 is reduced, thereby improving system efficiency.

In some embodiments, the processor 210 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

It can be understood that the interface connection relationship between the modules illustrated in the embodiments is merely an example for description, and does not constitute a limitation on the structure of the electronic device 200. In some other embodiments, the electronic device 200 may alternatively use an interface connection mode that is different from those in the foregoing embodiments, or use a combination of a plurality of interface connection modes.

The charging management module 240 is configured to receive a charging input from a charger. The charger may be a wireless charger, or may be a wired charger. When charging the battery 242, the charging management module 240 can further supply power to the electronic device by using the power management module 241.

The power management module 241 is configured to connect the battery 242, the charging management module 240, and the processor 210. The power management module 241 receives an input of the battery 242 and/or an input of the charging management module 240, and supplies power to the processor 210, the internal memory 221, the display 294, the mobile communication module 293, the wireless communication module 260, and the like. In some embodiments, the power management module 241 and the charging management module 240 may be disposed in a same device.

The wireless communication function of the electronic device 200 may be implemented by using the antenna 1, the antenna 2, the mobile communication module 250, the wireless communication module 260, the modem processor, the baseband processor, and the like. In some embodiments, the antenna 1 of the electronic device 200 is coupled to the mobile communication module 250, and the antenna 2 is coupled to the wireless communication module 260, so that the electronic device 200 can communicate with a network and another device by using a wireless communication technology.

The antenna 1 and the antenna 2 are configured to transmit and receive electromagnetic wave signals. Each antenna in the electronic device 200 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 250 can provide a wireless communication solution that is applied to the electronic device 200, including 2G/3G/4G/5G and the like. The mobile communication module 250 may include at least one filter, a switch, a power amplifier, a low-noise amplifier (low noise amplifier, LNA), and the like. The mobile communication module 250 can receive an electromagnetic wave by using the antenna 1, perform processing such as filtering and amplification on the received electromagnetic wave, and transmit a processed electromagnetic wave to the modem processor for demodulation.

The mobile communication module 250 may further amplify a signal modulated by the modem processor and convert, by using the antenna 1, the signal into electromagnetic waves for radiation. In some embodiments, at least some functional modules of the mobile communication module 250 may be disposed in the processor 210. In some embodiments, at least some functional modules of the mobile communication module 250 may be disposed in a same device as at least some modules of the processor 210.

The wireless communication module 260 may provide a wireless communication solution that is applied to the electronic device 200, including a WLAN (such as a (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like.

The wireless communication module 260 may be one or more devices integrating at least one communication processing module. The wireless communication module 260 receives electromagnetic waves by using the antenna 2, performs frequency modulation and filtering on an electromagnetic wave signal, and sends a processed signal to the processor 210. The wireless communication module 260 can further receive a to-be-sent signal from the processor 210, and perform frequency modulation and amplification on the signal, and the signal is converted into an electromagnetic wave and radiated by the antenna 2.

The electronic device 200 implements a display function by using the GPU, the display 294, the application processor, and the like. The GPU is an image processing microprocessor, which is connected to the display 294 and the application processor. The GPU is configured to perform mathematical and geometric calculations to render graphics. The processor 210 may include one or more GPUs that execute program instructions to generate or change display information.

The display 294 is configured to display an image, a video, and the like. The display 294 includes a display panel.

The electronic device 200 can implement a photographing function by using the ISP, the camera 293, the video codec, the GPU, the display 294, the application processor, and the like. The ISP is configured to process data fed back by the camera 293. The camera 293 is configured to capture a still image or a video. In some embodiments, the electronic device 200 may include one or N cameras 293, where N is a positive integer greater than 1.

The external memory interface 220 may be configured to connect to an external memory card such as a Micro SD card, so as to expand a storage capacity of the electronic device 200. The external memory card communicates with the processor 210 by using the external memory interface 220 to implement a data storage function. For example, music, video, and other files are stored in the external memory card.

The internal memory 221 may be configured to store computer executable program code, where the executable program code includes an instruction. The processor 210 executes various function applications and data processing of the electronic device 200 by running an instruction stored in the internal memory 221. For example, in this embodiment of this application, the processor 210 can execute instructions stored in the internal memory 221. The internal memory 221 may include a program storage area and a data storage area.

The program storage area may store an operating system, an application required by at least one function (such as a sound play function or an image play function), or the like. The data storage area may store data (such as audio data and a phone book) created during use of the electronic device 200. In addition, the internal memory 221 may include a high-speed random access memory, and may further include a non-volatile memory, such as at least one magnetic disk storage device, a flash memory device, or a universal flash storage (universal flash storage, UFS).

The electronic device 200 can implement audio functions (such as music playing and sound recording) by using the audio module 270, the speaker 270A, the receiver 270B, the microphone 270C, the headset jack 270D, the application processor, and the like.

The key 290 includes a power-on key, a volume key, or the like. The key 290 may be a mechanical key, or may be a touch key. The motor 291 can generate a vibration prompt. The motor 291 may be configured to provide an incoming call vibration prompt, or may be configured to provide a touch vibration feedback. The indicator 292 may be an indicator light, which may be configured to indicate a charging state and a power change, or to indicate a message, a missed call, a notification, or the like. The SIM card interface 295 is configured to connect to a SIM card. The SIM card may be inserted into the SIM card interface 295 or removed from the SIM card interface 295 to implement contact and separation from the electronic device 200. The electronic device 200 can support 1 or N SIM card interfaces, where N is a positive integer greater than 1. The SIM card interface 295 can support the Nano SIM card, the Micro SIM card, the SIM card, and the like.

For clarity and brevity of the following embodiments, related concepts or technologies are briefly described below.

In a process of daily work and business transactions, emails are often used for task item publishing, transaction check, event notification, and the like. Emails used for task item publishing or transaction check often require a recipient to reply to the emails after handling related items. For example, if a publisher publishes a task item to a recipient by email, then the recipient needs to feed back a result of handling the task item to the publisher in the form of an email after handling the task item.

For ease of description, all emails that require recipients to handle and reply are referred to as first emails.

However, mailboxes of the recipients, that is, receiving mailboxes of the first emails, receive a large quantity of other emails every day. Apparently, display positions of the first emails in the receiving mailboxes will be replaced by new emails. This also means that if the recipients do not immediately handle and reply to the first emails, the first emails may be ignored by the recipients.

To resolve the foregoing problem, an embodiment of this application provides an email management method. A publisher's mailbox (that is, a publishing mailbox) sends a first email carrying time limit information to receiving mailboxes. In addition, the receiving mailboxes remind recipients to handle the first email in a timely manner based on the time limit information carried in the first email, so as to prevent the recipients from forgetting to handle the first email, and improve efficiency of human-computer interaction and email intelligence.

For ease of understanding, an implementation process of the method according to this embodiment of this application is described based on an example below with reference to the accompanying drawings. In addition, in this example, the first device is a sending end of the first email, and the second device is a receiving end of the first email. A receiving mailbox of the first email is logged in on the second device, which may also be referred to as an email receiving device.

That a user creates and publishes the first email by using the first device (for example, a mobile phone 1) is used as an example. In this example, the first device is an email sending end of the first email, and may create the first email and send the first email to the second device.

Figure 3A:
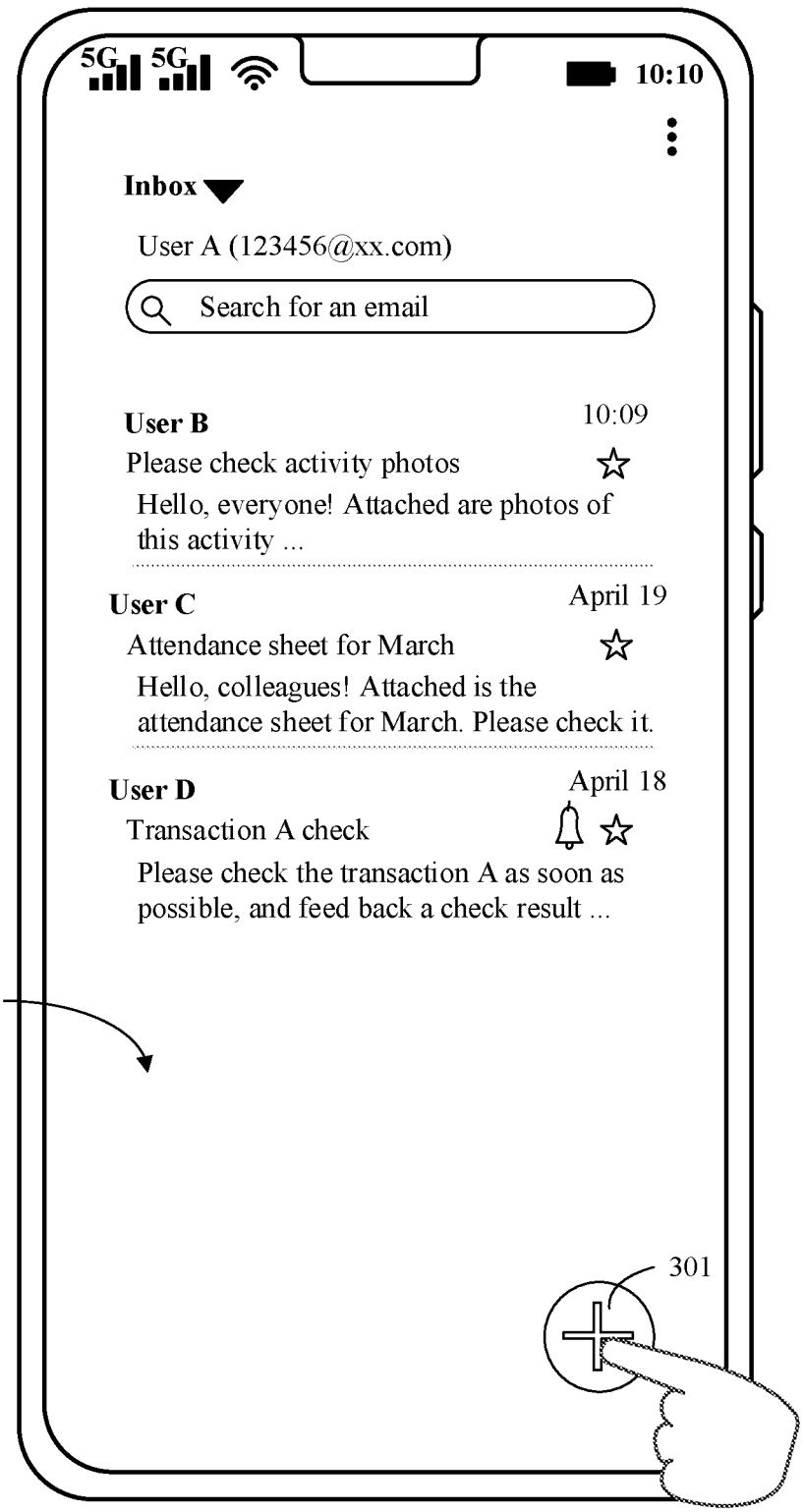
FIG. 3(A) and FIG. 3(B) are a schematic display diagram of an email sending end according to an embodiment of this application.

After the mobile phone 1 starts the email APP, the mobile phone 1 may display an interface shown in FIG. 3(A), that is, a mailbox interface 304 of a user A (also referred to as a first interface of the email application). The mailbox interface 304 includes different emails received by the mailbox of the user A, and the emails are arranged based on a time sequence.

For example, as shown in FIG. 3(A), the mailbox of the user A has received an email with a subject of "Please check activity photos" (referred to as an email 1), an email with a subject of "Attendance sheet for March" (referred to as an email 2), and an email with a subject of "Transaction A check" (referred to as an email 3). The email 1 was sent most recently, and the email 2 was sent earlier than the email 1 but later than the email 3. Therefore, the email 1 is displayed on top of the mailbox interface 304, and the email 2 and the email 3 are displayed behind the email 1.

In addition, the mailbox interface 304 further includes a control for creating a new email, for example, a control 301 shown in FIG. 3(A).

Figure 3B:
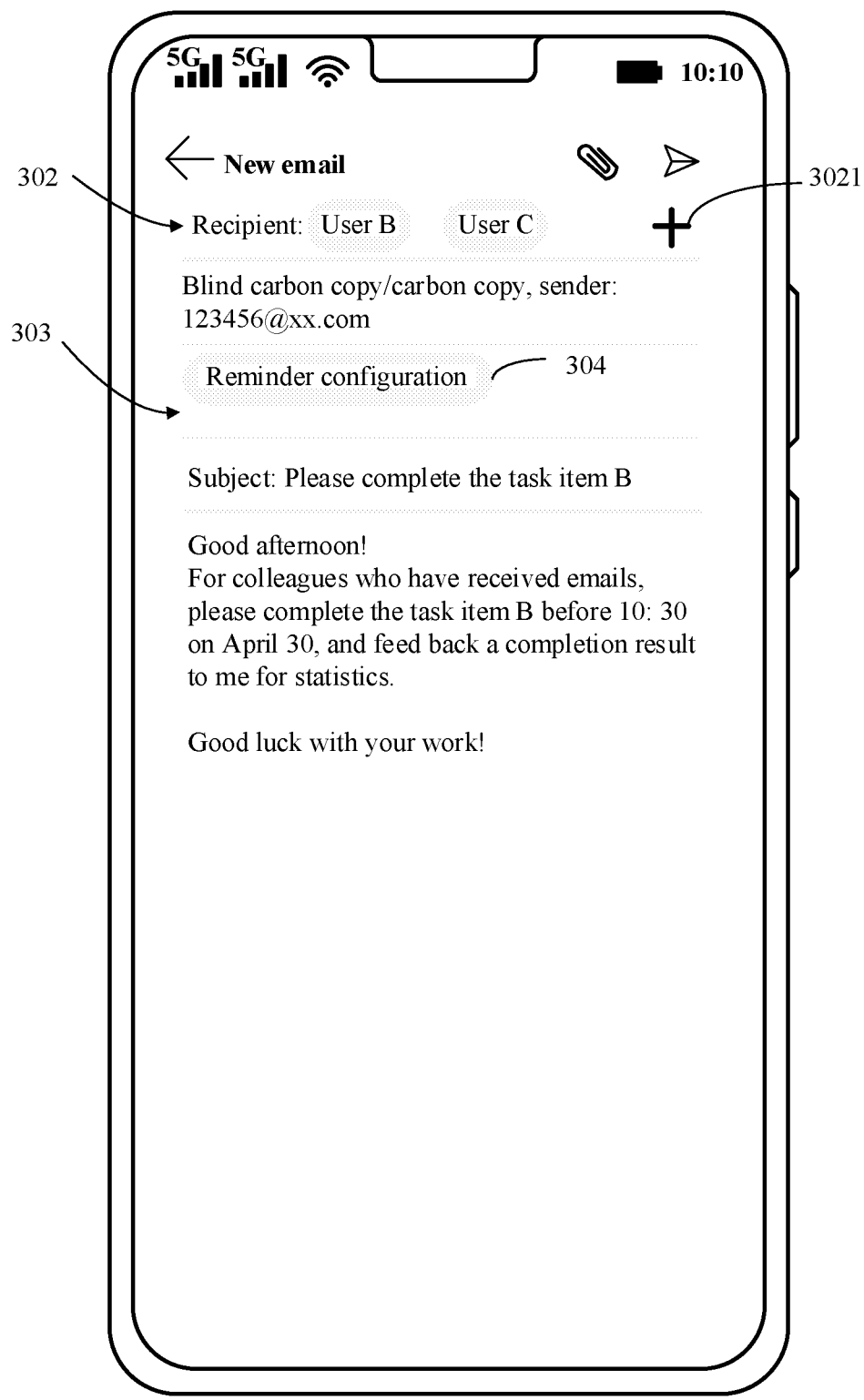

For example, after the mobile phone 1 receives an operation of the user on the control 301, such as a tap operation, an email editing interface shown in FIG. 3(B) may be displayed.

The email editing interface includes an input field for configuring a receiving mailbox, for example, an input box 302 of a recipient shown in FIG. 3(B).

In some embodiments, the user may input a mailbox address in the input box 302 of the recipient, so that the mobile phone 1 can obtain the mailbox address input by the user, and the mailbox address input by the user or a mailbox name corresponding to the mailbox address may be displayed at the input box 302 of the recipient. It can be understood that both the mailbox address and the mailbox name corresponding to the mailbox address refer to a same mailbox.

In addition, the input box 302 of the recipient may further include a control for searching a mailbox address book, for example, a control 3021 shown in FIG. 3(B). After the mobile phone 1 receives a tap operation of the user on the control 3021, a mailbox address book interface may be displayed. The mailbox address book interface includes a plurality of mailbox addresses and mailbox names corresponding to the mailbox addresses. The user may select a mailbox address on the mailbox address book interface, and the mobile phone 1 can obtain, based on the selection operation of the user on the mailbox address book interface, the mailbox address selected by the user. The mailbox name corresponding to the mailbox address is displayed in the input box 302 of the recipient.

When the first email is created, the mailbox configured by the user in the input box 302 of the recipient is the receiving mailbox of the first email, and is also the mailbox that are required to handle and reply to the first email.

For example, when a first email (referred to as an email 4) with a subject of "Please complete the task item B" is created, the mobile phone 1 receives mailbox addresses of a user B and a user C that are input by the user in the input box 302 of the recipient, and displays mailbox names of the user B and the user C in the input box 302 of the recipient. In this scenario, the mailboxes of the user B and the user C are mailboxes that are required to actually handle and reply to the email 4.

In addition, the email editing interface further includes a "Blind carbon copy/carbon copy, sender" input field, a "Subject" input field, and an "Email text" editing area. For functions and implementations of the "Blind carbon copy/carbon copy, sender" input field, the "Subject" input field, and the "Email text" editing area described above, refer to related technologies. Details are not described herein again.

In addition, in this embodiment of this application, the email editing interface further includes a function entry for configuring time limit information, for example, a reminder bar 303. In this way, the mobile phone 1 may configure, based on an operation of the user on the reminder bar 303, the time limit information for the first email being edited.

The foregoing time limit information may include one or more of a reminder period, a deadline, a reminder time point, and the like. The foregoing time limit information may indicate a handling time limit of the first email.

The foregoing reminder period is a parameter indicating an interval between two adjacent reminding, and is used to implement cyclic reminding. The foregoing deadline is a deadline for a receiving mailbox (for example, the mailboxes of the user B and the user C) to handle and reply to the first email. The foregoing reminder time point is a time for providing a single handling reminder for the first email. The reminder time point is valid when the receiving mailbox is not used to handle and reply to the first email.

For example, when the reminder time point of the email 4 is 10:25 a.m. on April 30, if the time reaches 10:25 a.m. on April 30, and the mailbox of the user C does not reply to the email 4, then under an instruction of the reminder time point, the mailbox of the user C will automatically remind. For another example, if the mailbox of the user B has replied to the email 4 before 10:25 a.m. on April 30, then the email of the user B will not remind.

For example, the reminder bar 303 includes a control for setting time limit information, for example, a reminder configuration 304 shown in FIG. 3(B). The user may operate the "Reminder configuration" control to set the time limit information for the first email being edited (for example, the email 4). In this way, the mobile phone 1 may configure, based on an operation of the user on the reminder configuration 304, the time limit information for the first email being edited.

For example, after receiving a tap operation of the user on the reminder configuration 304, the mobile phone 1 may display an input box for inputting time limit information. In this way, the user may input the time limit information in the input box, for example, by using a virtual keyboard. In this way, the mobile phone 1 can obtain the time limit information input by the user.

In addition, in another example, different types of time limit information may alternatively configured by using different controls in the reminder bar 303.

Figure 4A:
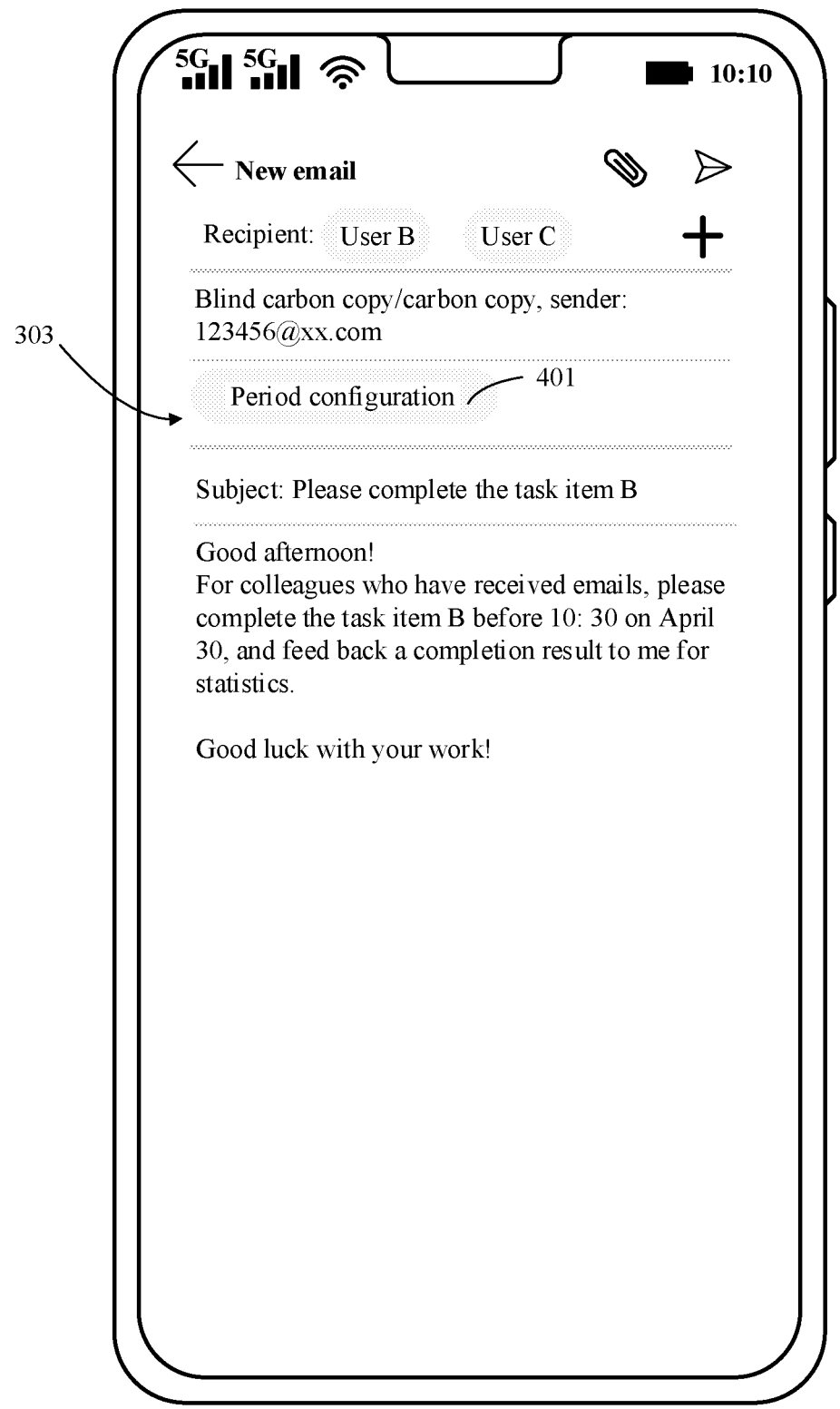
FIG. 4(A) and FIG. 4(B) are another schematic display diagram of an email sending end according to an embodiment of this application.

For example, the reminder bar 303 includes a control (also referred to as a first control) for setting a reminder period, for example, a period configuration 401 shown in FIG. 4(A). In this way, the user may set the reminder period by operating the period configuration 401. In this way, the mobile phone 1 may configure, based on an operation of the user on the period configuration 401, the reminder period for the first email being edited.

Figure 4B:
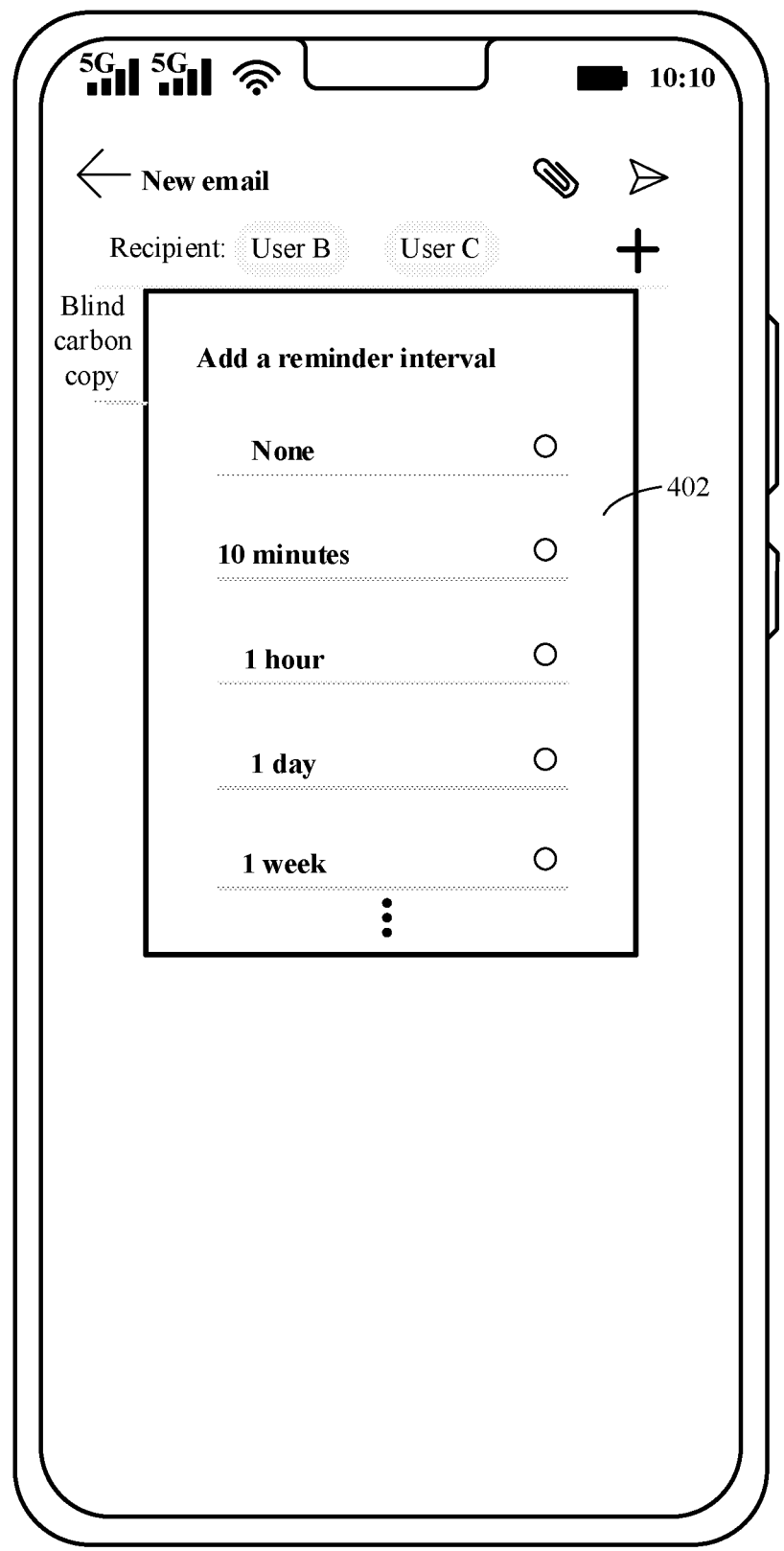

In a possible implementation, after the mobile phone 1 receives an operation of the user on the period configuration 401, such as a tap operation, as shown in FIG. 4(B), a first selection box 402 may be displayed. The foregoing first selection box 402 includes a plurality of selectable period parameters (also referred to as configuration items for representing a period). In this way, the mobile phone 1 may configure, based on a selection operation of the user on the period parameters, such as tap operation, the reminder period for the first email being edited.

For example, the first selection box 402 may include selectable period parameters such as "None", "10 minutes", "1 hour", "1 day", and "1 week". Using the period parameter "None" tapped by the user as an example, the mobile phone 1 receives a selection operation on the period parameter "None", which indicates that the user indicates that the email 4 does not require a period reminder. Using the period parameter "1 day" tapped by the user as an example, after receiving the selection operation on the period parameter "1 day", the mobile phone 1 may configure, for the email 4, a reminder period for providing a reminder once every other day. That is, a receiving mailbox (for example, the mailboxes of the user B and the user C) will provide a reminder for the email 4 every other day after receiving the email 4 and identifying the reminder period, until the receiving mailbox completes a reply to the email 4. When the mobile phone 1 receives a selection operation on another period parameter, the operation is the same as above. Details are not described herein.

Figure 5A:
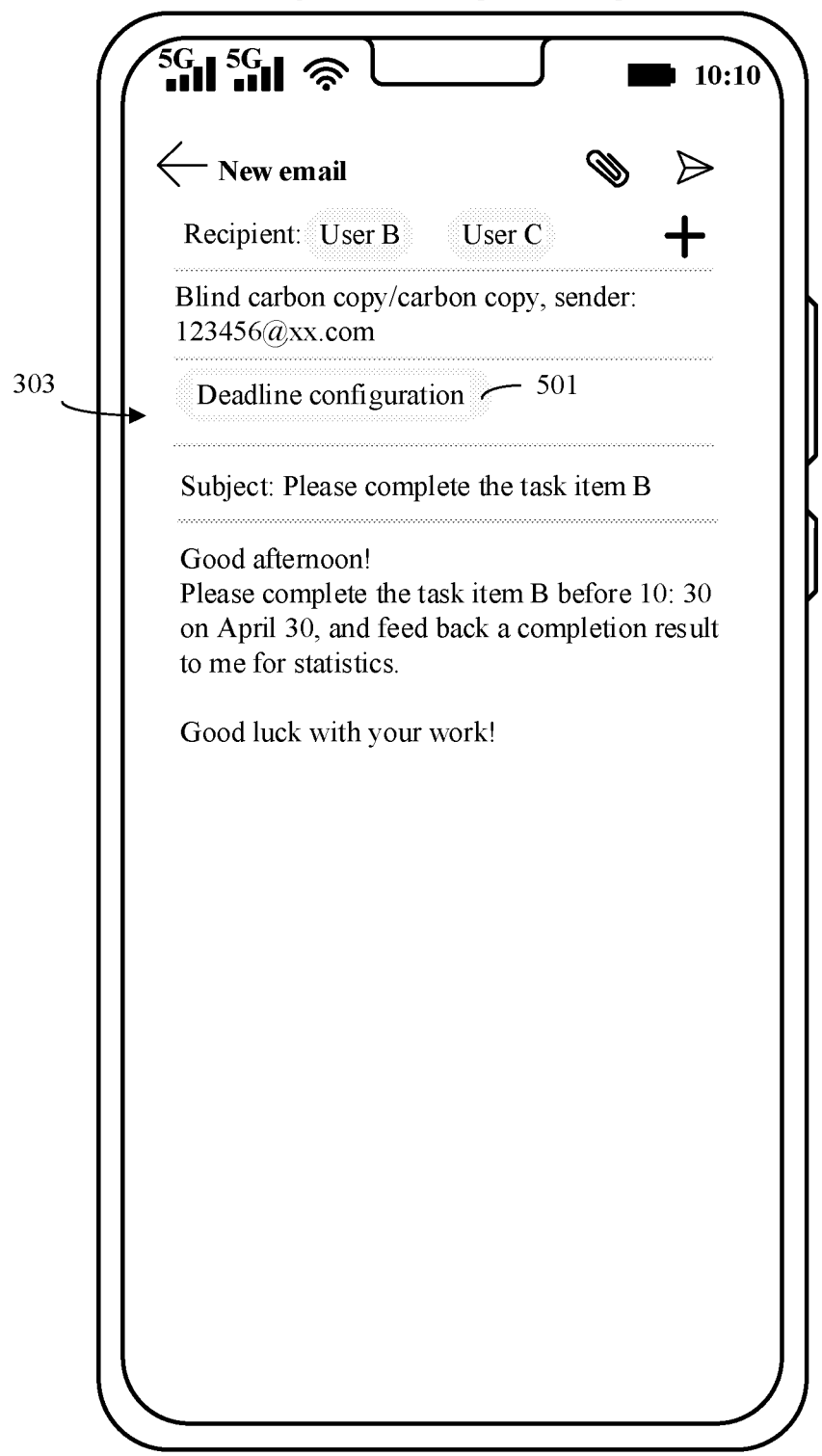
FIG. 5(A) and FIG. 5(B) are another schematic display diagram of an email sending end according to an embodiment of this application.

For another example, the reminder bar 303 includes a control (also referred to as a second control) for setting a deadline, for example, a deadline configuration 501 shown in FIG. 5(A). In this way, the user may set the deadline by operating the deadline configuration 501. In this way, the mobile phone 1 may configure, based on an operation of the user on the deadline configuration 501, the deadline for the first email being edited.

Figure 5B:
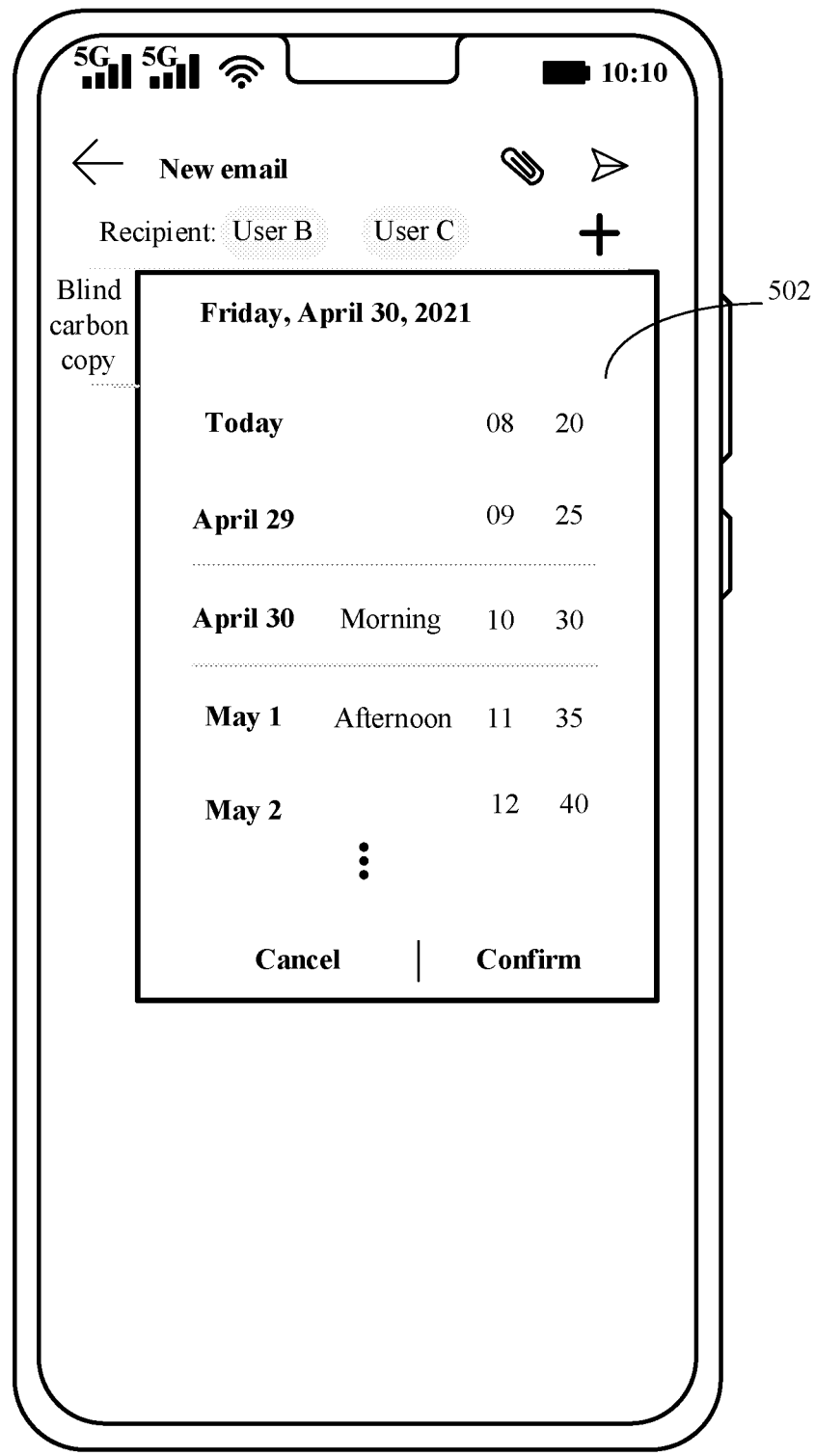

In a possible implementation, after the mobile phone 1 receives an operation on the deadline 501, such as a tap operation, as shown in FIG. 5(B), a second selection box 502 may be displayed. The second selection box 502 includes a plurality of selectable dates and selectable time points (that is, configuration items for determining the deadline). The mobile phone 1 configures, based on an operation of the user on the second selection box 502, the deadline for the first email being edited.

For example, the user combines April 30, morning, and 10:30 in the second selection box 502 through a slide operation and taps "Confirm" in the second selection box 502, and the mobile phone 1 may configure 10:30 a.m. on April 30 as the deadline of the email 4 based on the foregoing operation of the user.

Figure 6A:
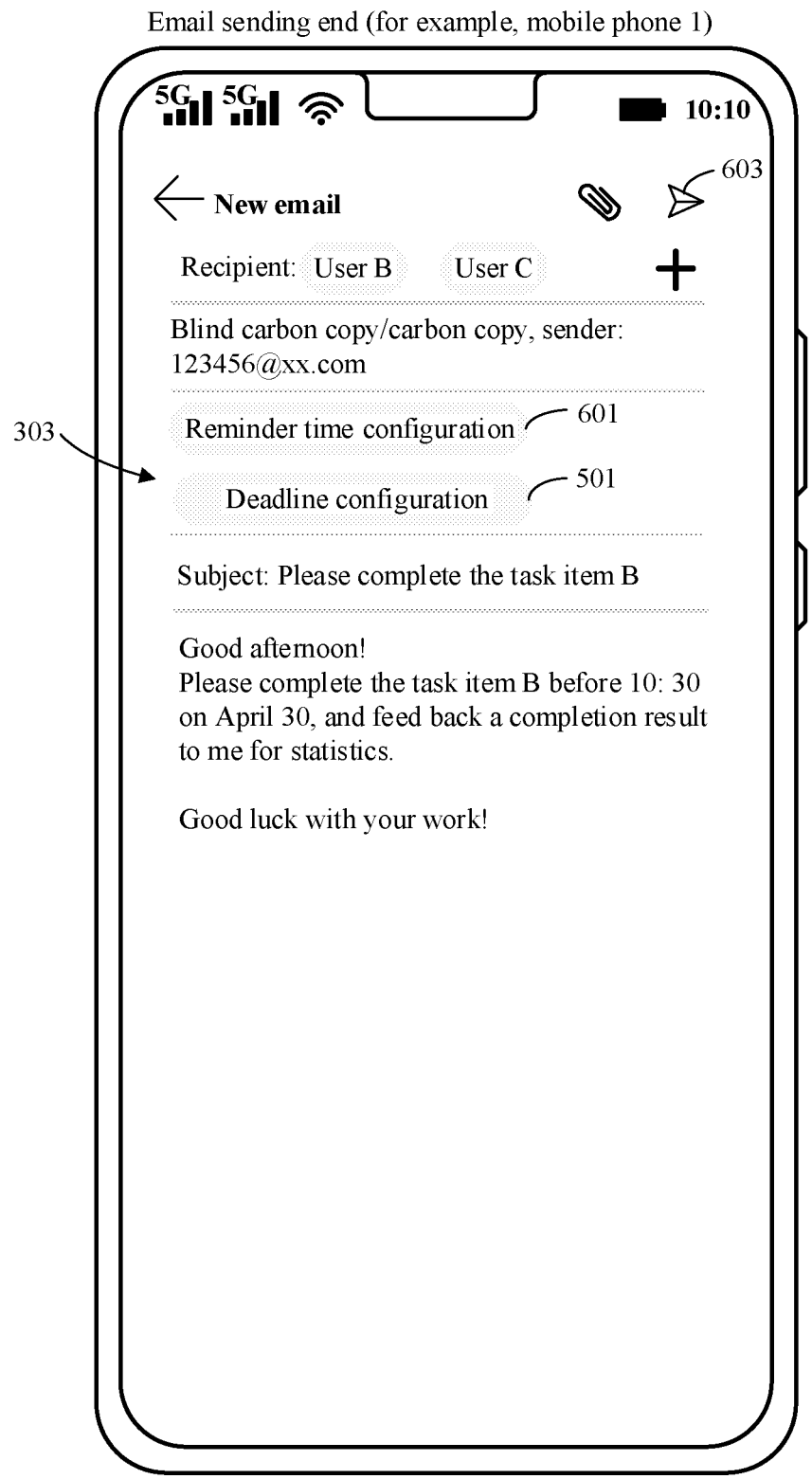
FIG. 6(A) and FIG. 6(B) are another schematic display diagram of an email sending end according to an embodiment of this application.

For another example, when the time limit information includes both a deadline and a reminder time point, the reminder bar 303 includes a control for setting the deadline and a control for setting the reminder time point (also referred to as a third control). For example, as shown in FIG. 6(A), a deadline configuration 501 and a reminder time configuration 601 are included.

In some embodiments, for the implementation of configuring the deadline by using the deadline configuration 501, reference may be made to the foregoing embodiment. Details are not described herein again.

In addition, the user may operate the reminder time configuration 601 to set the reminder time point, so that the mobile phone 1 may configure, based on an operation of the user on the reminder time configuration 601, the reminder time point for the first email being edited.

In a possible implementation, after the mobile phone 1 receives a tap operation of the user on the reminder time configuration 601, a third selection box may be displayed. The foregoing third selection box includes a plurality of selectable time parameters (also referred to as configuration items for determining the reminder time point). In this way, the mobile phone 1 may configure, based on an operation of the user on the time parameters, such as a tap operation, the reminder time point for the first email being edited.

In some embodiments, the foregoing time parameter may be a specific time point or an interval with the deadline.

When the foregoing time parameter is a specific time point, the mobile phone 1 may directly configure, based on an operation of the user on the time parameter, the reminder time point for the first email being edited.

For example, for the configuration items included in the third selection box, refer to the example shown in FIG. 5(B). Details are not described herein again. For example, the time parameters displayed in the third selection box may include 10:10 on Apr. 30, 2021, 10:25 on Apr. 30, 2021, and the like. When the mobile phone 1 receives a tap operation of the user at 10:25 on Apr. 30, 2021, 10:25 on Apr. 30, 2021 is directly configured as the reminder time point of the first email.

When the foregoing time parameter is the interval with the deadline, the mobile phone 1 may configure, based on the an operation of the user on the time parameter and with reference to the configured deadline, the reminder time point for the first email being edited.

Figure 6B:
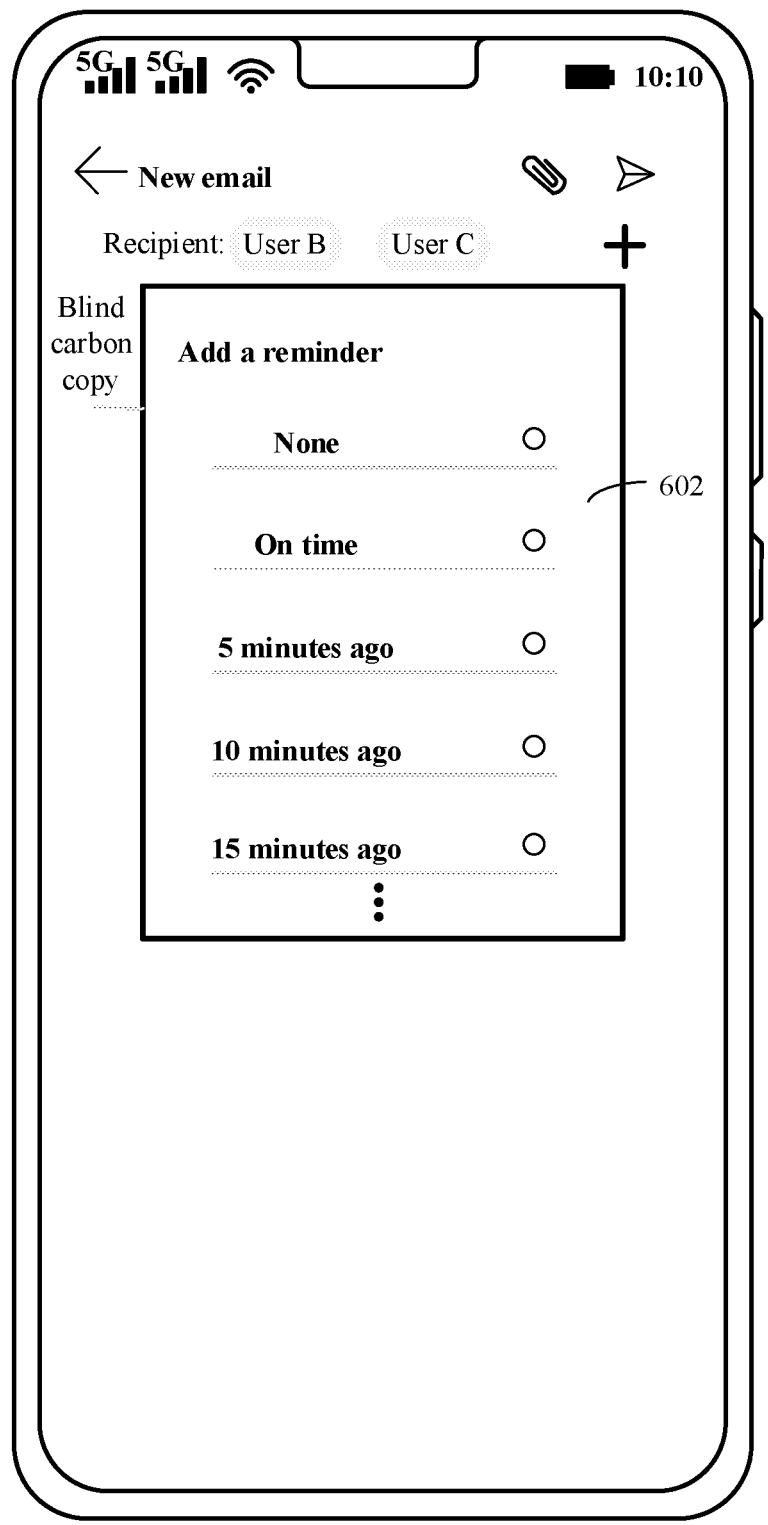

For example, as shown in FIG. 6(B), the third selection box 602 may include a plurality of time parameters, such as "None", "On time", "5 minutes ago", "10 minutes ago", and "15 minutes ago". Using the time parameter "None" tapped by the user as an example, the mobile phone 1 receives a tap operation of the user on the time parameter "None". In this scenario, it indicates that the user does not configure the reminder time point for the email 4. Using the time parameter "On time" tapped by the user as an example, the mobile phone 1 receives a tap operation on the time parameter "On time", and may configure the deadline as the reminder time point of the email 4 based on the tap operation. For example, when the deadline is 10:30 on Apr. 30, 2021, and the mobile phone 1 receives a tap operation on "On time", then 10:30 on Apr. 30, 2021 is determined as the reminder time point.

Using the time parameter "5 minutes ago" tapped by the user as an example, the mobile phone 1 receives the tap operation of the user on the time parameter "5 minutes ago". Based on the tap operation, 5 minutes before the deadline is configured as the reminder time point of the email 4. For example, when the deadline is 10:30 on Apr. 30, 2021, and the mobile phone 1 receives the tap operation on "5 minutes ago", then 10:25 on Apr. 30, 2021 is determined as the reminder time point.

Similarly, when the user taps the time parameter "10 minutes ago", the mobile phone 1 receives the tap operation on the time parameter "10 minutes ago". In addition, 10 minutes before the deadline is configured as the reminder time point of the email 4. For example, if the deadline is 10:30 on Apr. 30, 2021, and the mobile phone 1 receives a tap operation on "10 minutes ago", then 10:20 on Apr. 30, 2021 will be determined as the reminder time point, and so on.

In addition, when the time limit information includes both a deadline and a reminder period, the reminder bar 303 may include a deadline configuration 501 and a period configuration 401. In some embodiments, for the implementation of configuring the deadline by using the deadline configuration 501 and configuring the reminder period by using the period configuration 401, refer to the foregoing embodiment. Details are not described herein again.

In some scenarios, different types of time limit information may also be configured by using a same control in the reminder bar 303. For example, different types of time limit information are set by using the reminder configuration 304 shown in FIG. 3(B). The mobile phone 1 may configure, based on different operations of the user on the reminder configuration 304, any one of a reminder period, a reminder time point, or a deadline for the first email being edited. For example, when the mobile phone 1 receives an operation 1 on the reminder configuration 304, such as a slide operation, a first selection box 402 shown in FIG. 4(B) may be displayed, so as to configure the reminder period for the first email being edited. When the mobile phone 1 receives an operation 2 on the reminder configuration 304, such as a double-tap operation, a second selection box 502 shown in FIG. 5(B) may be displayed to configure the deadline for the first email being edited. When the mobile phone 1 receives a third operation on the reminder configuration 304, such as a touch and hold operation, a third selection box 602 shown in FIG. 6(B) is displayed. Certainly, when the mobile phone 1 receives a fourth operation on the reminder configuration 304, such as a tap operation, an input box for receiving the time limit information may be further displayed to receive time limit information input by the user.

Certainly, switching functions of the reminder configuration 304 through different operations is only a possible implementation. During actual implementation, functions of the reminder configuration 304 control may be further switched by using a first selection window. That is, when the mobile phone 1 receives an operation on the reminder configuration 304, the first selection window is displayed. The first selection window includes an option for configuring a reminder period, an option for configuring a deadline, and an option for configuring a reminder time point. The mobile phone 1 may configure, based on a selection operation on different options in the first selection window, such as a tap operation, the reminder period, the deadline, or the reminder time point for the first email being edited. For example, when the mobile phone 1 receives an operation of the user on an option for configuring the reminder period in the first selection window, the first selection box 402 shown in FIG. 4(B) is displayed to configure the reminder period for the first email being edited. When the mobile phone 1 receives an operation of the user on the option for configuring the deadline in the first selection window, the second selection box 502 shown in FIG. 5(B) is displayed to configure the deadline for the first email being edited. When the mobile phone 1 receives an operation of the user on the option for configuring the reminder time point in the first selection window, the third selection box 602 shown in FIG. 6(B) is displayed to configure the reminder time point for the first email being edited.

After the configuration of the time limit information is completed, if the mobile phone 1 receives an email sending instruction, the first email configured with the time limit information is sent to a corresponding receiving mailbox. For example, after receiving an email sending operation, for example, after receiving an operation of the user on the control 603 shown in FIG. 6(A), the mobile phone 1 may send the email 4 configured with the time limit information to the mailboxes of the user B and the user C.

In this embodiment of the application, after the first email is sent to a receiving mailbox, the receiving mailbox may automatically provide a reminder based on time limit information carried in the first email.

For example, the mailbox of the user B (that is, the receiving mailbox of the email 4) is logged in on the second device (for example, a mobile phone 2). In this example, the second device is an email receiving end of the first email, and may receive the first email sent by the first device.

Figure 7:
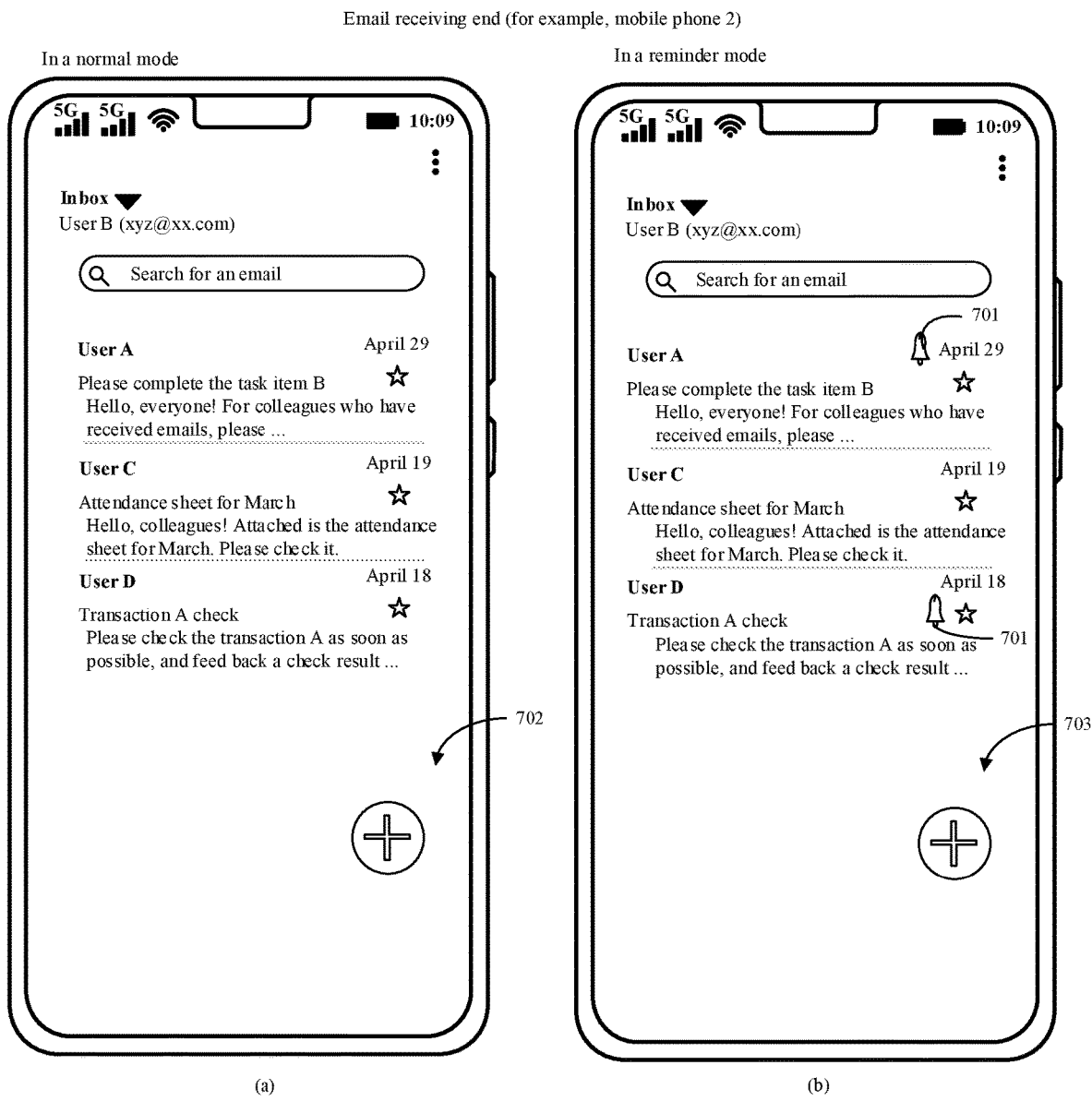
FIG. 7 is a schematic display diagram of an email receiving end according to an embodiment of this application.

After the mailbox of the user B is logged in on the mobile phone 2, a mailbox interface 702 shown in FIG. 7(A) may be displayed. The mailbox interface 702 is a display interface of the email APP in a normal mode.

It should be noted that the mailbox logged in on the second device may also be referred to as a current mailbox. For example, after the mailbox of the user B is logged in on the mobile phone 2, the current mailbox corresponding to the mobile phone 2 is the mailbox of the user B.

In addition, the foregoing mailbox interface 702 includes different emails received by the current mailbox, and the emails are arranged based on a sending time sequence.

For example, the mailbox interface 702 includes an email with a subject of "Please complete the task item B" (referred to as an email 4), an email with a subject of "Attendance sheet for March" (referred to as an email 2), and an email with a subject of "Transaction A check" (referred to as an email 3). The email 4 was sent most recently, and the email 2 was sent earlier than the email 4 but later than the email 3. Therefore, the email 4 is displayed on top of the mailbox interface 702, and the email 2 and the email 3 are displayed behind the email 1. It can be understood that, after a new email is received, the new email will be displayed on top, and display positions of other emails (for example, the email 2, the email 3, and the email 4) will be adjusted accordingly. In this way, once an email is not handled in a timely manner, the email may be submerged in many new emails.

In some embodiments, after the mailbox of the user B is logged in on the mobile phone 2, a mailbox interface 703 shown in FIG. 7(B) may be further displayed. The mailbox interface 703 is a display interface of the email APP in a reminder mode. The mailbox interface 703 also includes an email 2, an email 3, and an email 4. Similarly, the email 2, the email 3, and the email 4 are also sorted based on a corresponding sending time sequence.

The difference from the mailbox interface 702 is: When the mobile phone 2 displays a received first email (for example, the email 3 and the email 4) on the mailbox interface 703, prompt information 1 corresponding to the first email may be further displayed to remind the user to pay attention to the first email. For example, the foregoing prompt information 1 may be a special identifier, for example, an identifier 701 shown in FIG. 7(B). In this way, among many emails in the mailbox, the user is reminded to pay attention to the first email received by the mailbox.

In some embodiments, the foregoing prompt information 1 may always be displayed on the mailbox interface 703. Therefore, the first email is distinguished from other emails.

In some other embodiments, when the mailbox of the user B does not reply to the first email, prompt information 1 may be displayed on the mailbox interface 703 corresponding to the first email. When the mailbox of the user B has replied to the first email, displaying of the prompt information 1 corresponding to the first email is canceled on the mailbox interface 703.

In other words, in the foregoing embodiment, the prompt information 1 may be correspondingly displayed at the first email from the time when the first email is displayed on the mailbox interface 703, and corresponding displaying of the prompt information 1 at the first email is canceled after the mobile phone 2 receives the reply operation for the first email. Therefore, the first email that is not replied to is accurately distinguished from other emails in the mailbox.

Figure 8A:
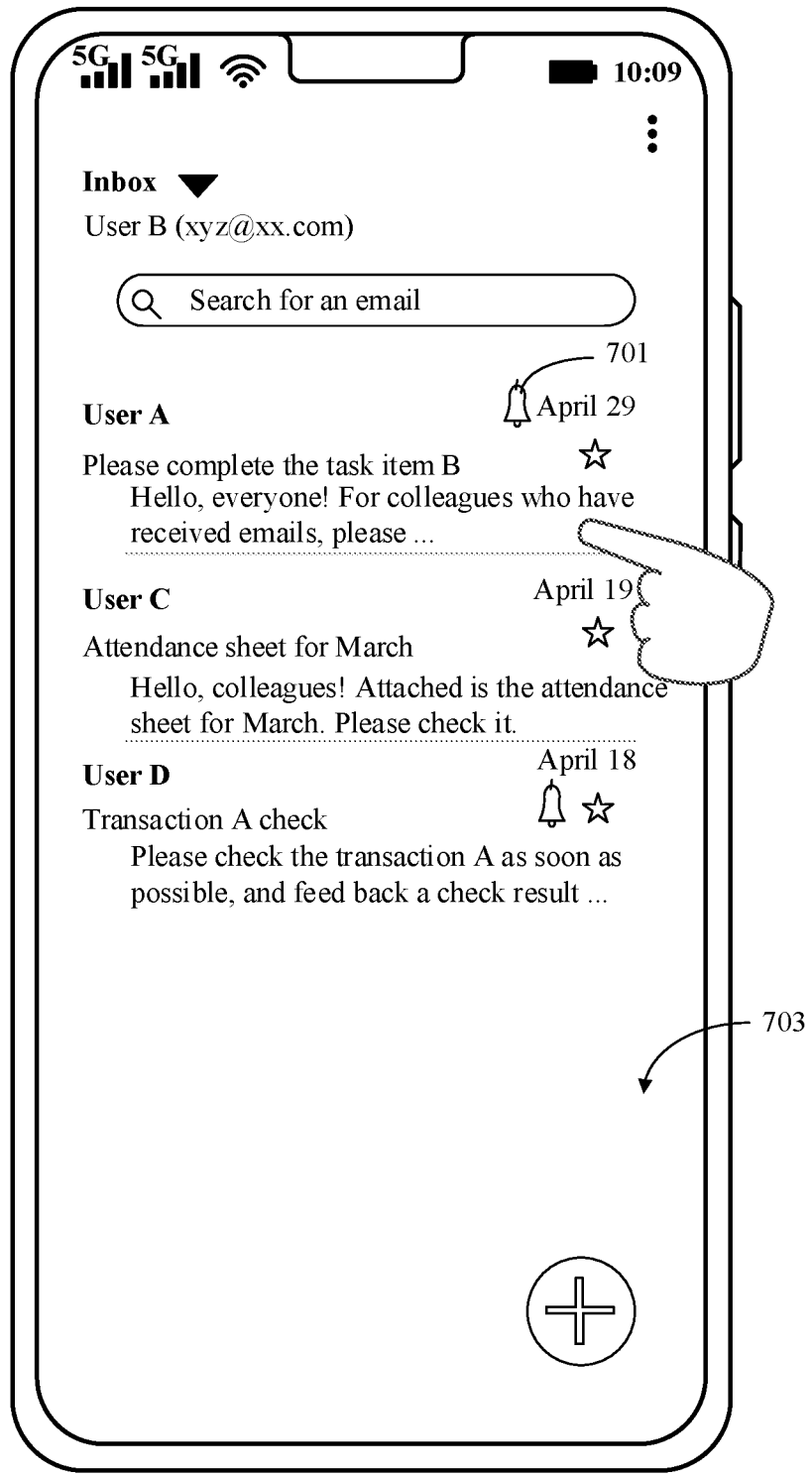
FIG. 8(A), FIG. 8(B), and FIG. 8(C) are another schematic display diagram of an email receiving end according to an embodiment of this application.
Figure 8B:
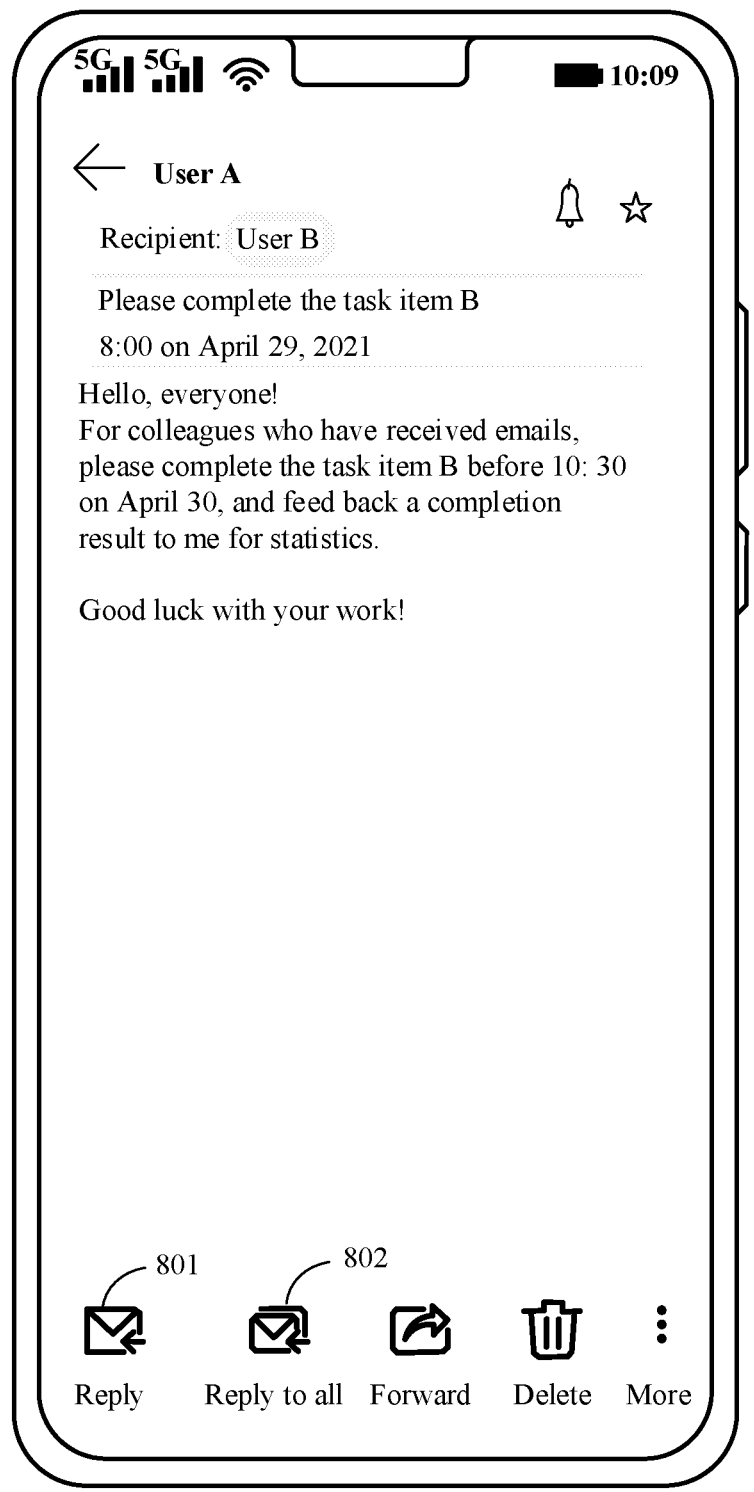

For example, as shown in FIG. 8(A), the user may tap an email 4 on a mailbox interface 703. A mobile phone 2 may receive a tap operation of the user on the email 4. In response to the tap operation on the email 4, the mobile phone 2 may display a details interface of the email 4 shown in FIG. 8(B). The details interface of the email 4 includes a control for replying to an email, such as a control 801 and a control 802. The foregoing control 801 is used to instruct creation of a reply email that replies to only a sender (that is, a publishing mailbox of the email 4). The foregoing control 802 is used to instruct creation of reply emails that reply to everyone (that is, a publishing mailbox of the email 4 and other receiving mailboxes involved in the email 4).

Then, when the mobile phone 2 receives a tap operation of the user on the control 801 or the control 802, an email reply interface may be displayed. During displaying of the foregoing email reply interface, the user may create a reply email to the email 4. In this way, the mobile phone 2 may receive relevant data of the reply email, such as a recipient, a sender, a subject, email text, and the like of the reply email. After the mobile phone 2 receives an operation of the user on a sending control, the foregoing reply email is sent. The foregoing sending control is a control used to trigger sending of the reply email on the email reply interface. It can be understood that, in the foregoing process, the operation received by the mobile phone 2 is the reply operation on the email 4. Then, when the mobile phone 2 displays the mailbox interface 703 again, displaying of prompt information 1 of the email 4 may be canceled on the mailbox interface 703.

In some other embodiments, alternatively, when the mobile phone 2 receives an operation of the user on the prompt information 1, such as a touch and hold operation on an identifier 701, displaying of the prompt information 1 corresponding to the email 4 may be canceled. Therefore, the user can manually confirm completion of the reply. In this way, the user may cancel reminding independently after completing, in a non-email reply manner, an item specified in the first email, so as to avoid impact of excessive reminding on user experience.

Figure 8C:
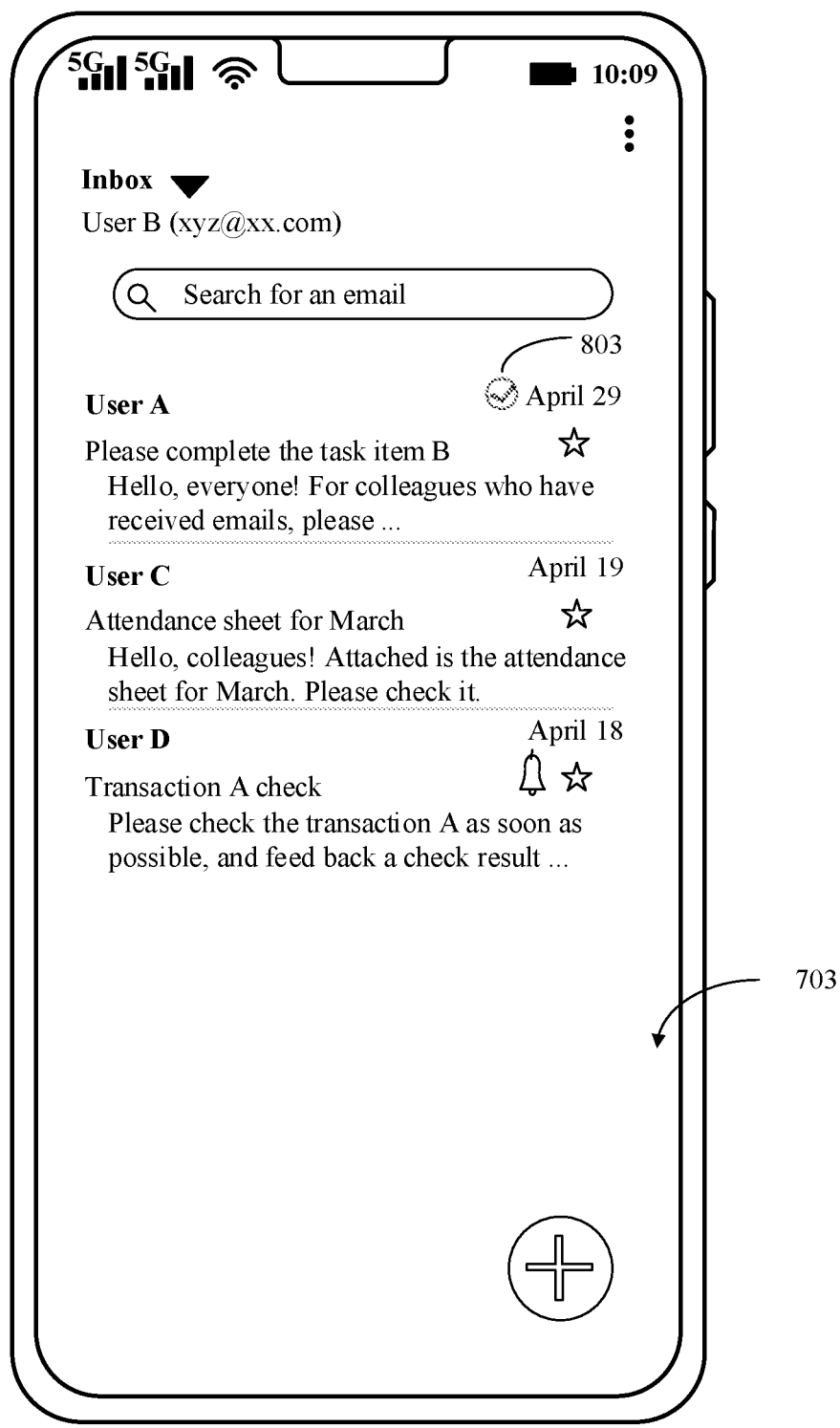

It can be understood that canceling displaying of the prompt information 1 corresponding to the first email is only a manner for prompting that a reply to the first email has been completed. In some other embodiments, alternatively, when the mailbox of the user has replied to the first email, prompt information 2 (also referred to as fifth prompt information) may be displayed on the mailbox interface 703 corresponding to the first email, so as to replace the prompt information 1 corresponding to the first email. The foregoing prompt information 2 is an identifier used to represent that a reply to the first email has been completed, such as an identifier 803 shown in FIG. 8(C).

Certainly, when the current mailbox corresponding to the mobile phone 2 does not reply to the first emails, the prompt information 1 is displayed on the mailbox interface 703 corresponding to the first emails. In this way, the mailbox interface 703 may distinguish between the first emails that need to be handled and the first emails that have been handled.

Generally, in the reminder mode, the email APP may use a state reminder manner such as displaying prompt information 1, and displaying prompt information 2 (or canceling displaying of the prompt information 1) after the current mailbox replies to the first emails, so that the user can open the mailbox interface 703 to pay attention to the first emails, thereby preventing the user from forgetting the first emails in the mailbox. In addition, human-computer interaction efficiency of email reply is also improved.

In some embodiments, when the mobile phone 2 starts the email APP, the reminder mode of the email APP is started by default. In some other embodiments, when the mobile phone 2 receives a tap operation of the user on an icon of the email APP, an option window may be displayed. The foregoing option window includes an option for representing the normal mode and an option for representing the reminder mode. When the mobile phone 2 receives an operation of the user on the option representing the normal mode, such as a tap operation, the normal mode of the email APP is started. When the mobile phone 2 receives an operation of the user on the option representing the reminder mode, such as a tap operation, the reminder mode of the email APP is started.

Certainly, no matter whether the second device enables the normal mode or the reminder mode of the email APP, after the current mailbox corresponding to the second device receives an email, whether the email carries time limit information will be identified. When it is identified that the time limit information is carried, the email may be determined as the first email. A handling reminder for the first email is implemented based on the time limit information, so as to urge the user to handle the first email in a timely manner. The foregoing handling reminder may be an internal reminder of the email APP, such as a fixed-point reminder or an overdue reminder implemented through one or a combination of timed top display, timed email notification, a prompt information change, and the like. Certainly, the foregoing handling reminder may alternatively be a reminder using another APP, such as an alarm clock reminder and a calendar reminder.

Figure 9A:
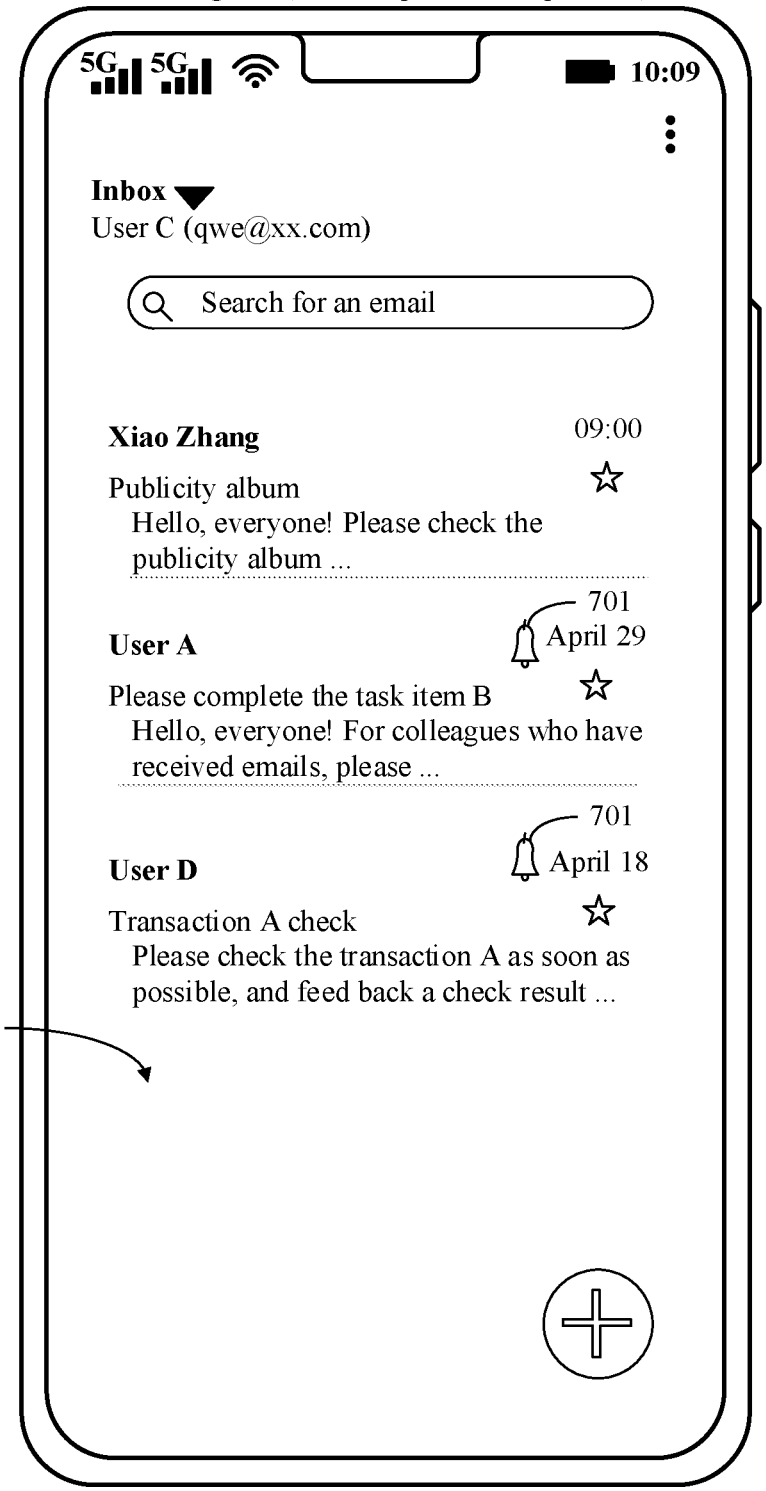
FIG. 9(A) and FIG. 9(B) are another schematic display diagram of an email receiving end according to an embodiment of this application.

For example, a mailbox of a user C is logged in on a second device (that is, a mobile phone 3), and a first email is identified. As shown in FIG. 9(A), after the mobile phone 3 starts the email APP, the mailbox of the user C is logged in, and a mailbox interface 902 is displayed. The mailbox interface 902 includes an email with a subject of "Publicity album" (referred to as an email 5), an email 3, and an email 4. It can be understood that the foregoing email 3, email 4, and email 5 are all emails received by the mailbox of the user C. Therefore, when the mailbox of the user C is logged in on the mobile phone 3, the email 3, the email 4, and the email 5 will be synchronized to the mailbox, and the foregoing email 3, email 4, and email 5 will be displayed on the mailbox interface 902.

In a process of synchronizing the email 3, the email 4, and the email 5 to the mailbox, the mobile phone 3 determines whether the email 3, the email 4, and the email 5 carry time limit information by parsing the email 3, the email 4, and the email 5. The email 3 and the email 4 carries time limit information, but the email 5 does not carry time limit information. Therefore, in the reminder mode of the started email APP, based on the time limit information identified from the email 4 and the email 3, on the mailbox interface 902, prompt information 1 corresponding to the email 3 is displayed, and prompt information 1 corresponding to the email 4 is displayed. As shown in FIG. 9(A), on the mailbox interface 902, identifiers 701 are correspondingly displayed for both the email 3 and the email 4.

In addition, the time limit information carried in the first email may include one or more of a reminder period, a deadline, a reminder time point, and the like. Certainly, when types of time limit information are different, different reminder types are implemented.

For example, when the time limit information carried in the first email includes the deadline, the mobile phone 3 can implement an overdue reminder for the first email based on the deadline. The overdue reminder is used to remind the user that the time has exceeded the deadline for handling the first email.

For example, when the mobile phone 3 parses that the deadline of the email 4 is 10:30 on April 30, if a system time of the mobile phone 3 does not reach the deadline and the mailbox of the user C does not reply to the email 4 (for example, the mobile phone 3 does not receive a reply operation of the user on the email 4), then as shown in FIG. 9(A), on the mailbox interface 902, an identifier 701 corresponding to the email 4 continues to be displayed. If the system time exceeds the deadline, for example, if the system time reaches 10:31, and the mailbox of the user C does not reply to the email 4, then on the mailbox interface 902, prompt information 3 (also referred to as second prompt information) corresponding to the email 4 is displayed. The foregoing prompt information 3 is used to remind the user that the time has exceeded the deadline for handling the first email. The foregoing prompt information 3 may be a prompt character, for example, the word "overdue". In addition, the foregoing prompt information 3 may alternatively be a special identifier, for example, an identifier 901 shown in FIG. 9(B). In this embodiment of the application, a presentation form of the prompt information 3 is not specifically limited.

For another example, when the time limit information carried in the first email includes a reminder time point, the mobile phone 3 can implement a fixed-point reminder for the first email based on the reminder time point. The fixed-point reminder is used to remind the user to handle the first email in advance or in a timely manner. The foregoing fixed-point reminder may include one or a combination of more of displaying the first email on top, performing email notification for the first email, and adjusting a display form of the prompt information 1 corresponding to the first email.

For example, the first email may be displayed on top. For another example, email notification is performed for the first email. For another example, the display form of the prompt information 1 corresponding to the first email is adjusted. The display form includes a shape and a dynamic/static state of the prompt information 1.

Figure 10A:
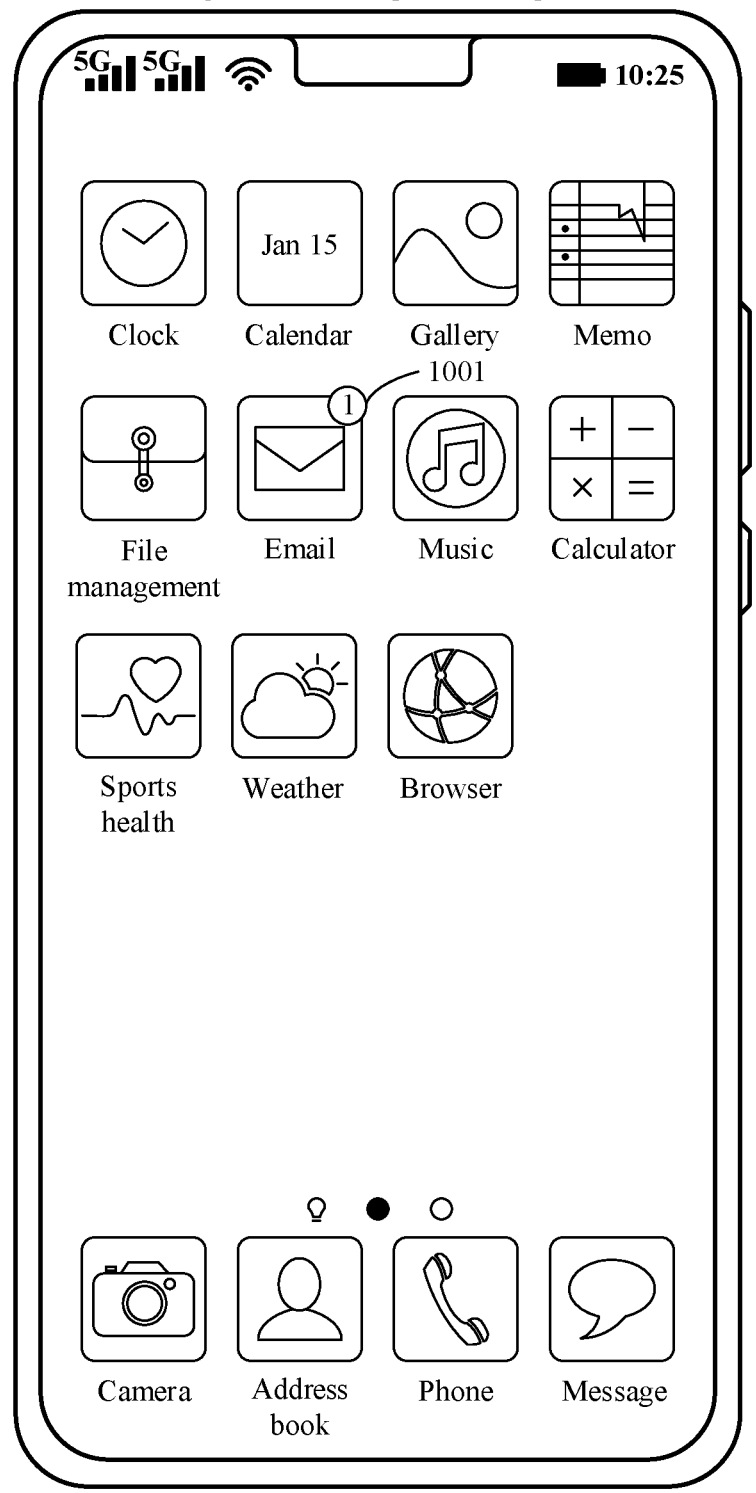
FIG. 10(A) and FIG. 10(B) are another schematic display diagram of an email receiving end according to an embodiment of this application.
Figure 10B:
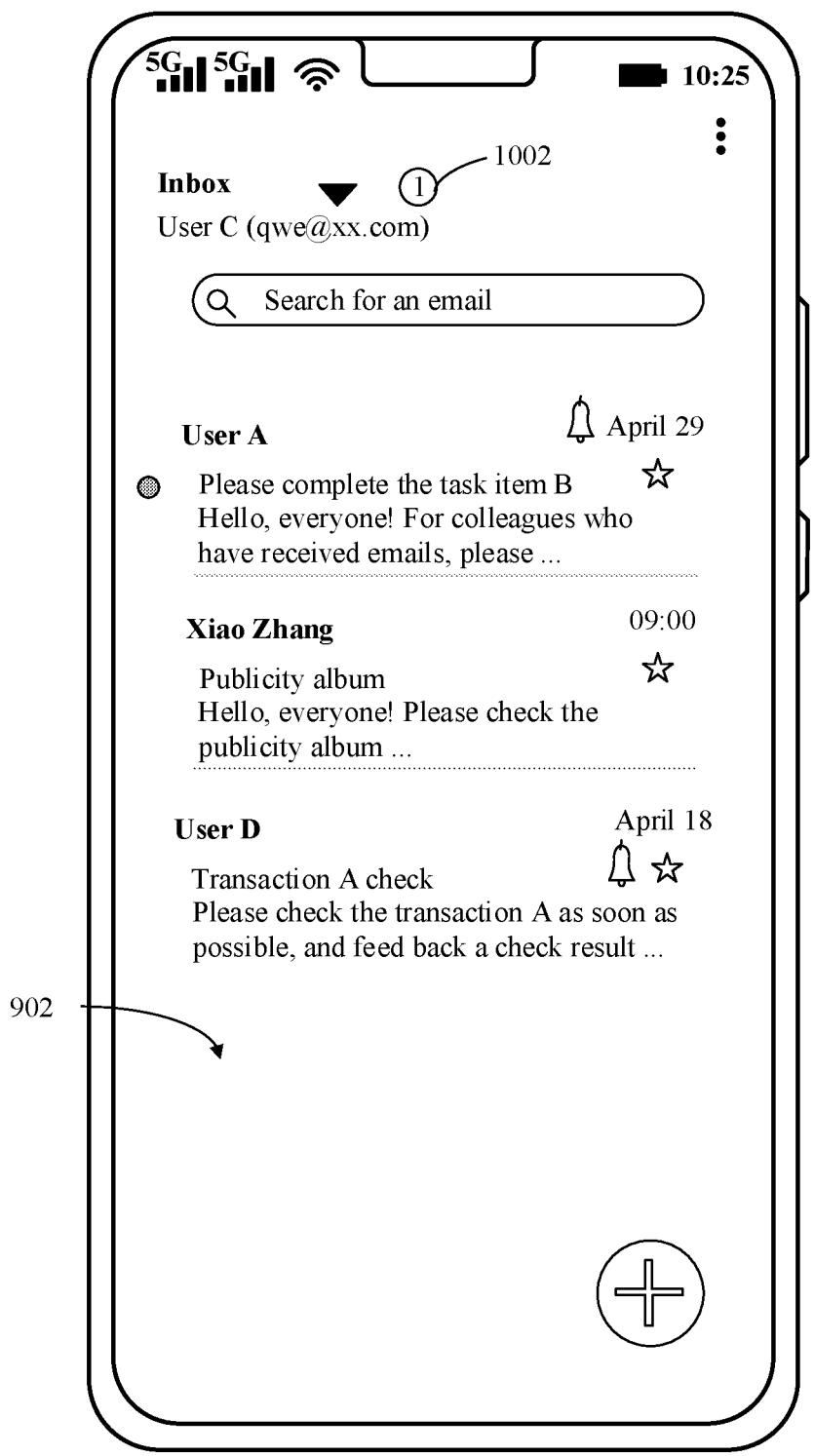

In an example, when the mobile phone 3 determines, through parsing, that the reminder time point carried in the email 4 is 10:25 on April 30, if the system time of the mobile phone 3 reaches 10:25 and the mailbox of the user C does not reply to the email 4, reminder information, for example, a reminder bubble 1001 shown in FIG. 10(A), may be displayed at an email APP icon on a home screen of the mobile phone 3. The reminder bubble 1001 is used to remind the user that there is a to-be-handled first email in the mailbox. The reminder bubble 1001 may be further used to indicate a quantity of to-be-handled first emails to the user. For example, a digit "1" displayed in the reminder bubble 1001 indicates that there is a to-be-handled first email in the mailbox. Then, when the mobile phone 3 receives an operation of the user on an icon of the email APP, such as a tap operation, as shown in FIG. 10(B), a mailbox interface 902 is displayed. In this case, the displayed mailbox interface 902 also includes reminder information, such as a reminder bubble 1002 shown in FIG. 10(B). A notification reminder for the email 4 is implemented.

In another example, when the system time of the mobile phone 3 reaches 10:25, the email 4 may be further displayed on top. As shown in FIG. 10(B), a display position of the email 4 is located before other emails, so as to implement an on-top reminder for the email 4.

In another example, when the system time reaches 10:25, prompt information 1 corresponding to the email 4 may be changed from a static identifier 701 to a dynamic identifier 701. The prompt information 1 corresponding to the email 4 may alternatively be changed from the identifier 701 to another graphic or text. It can be understood that the prompt information 1 before the change may also be referred to as fourth prompt information, which is used to prompt that the first email is an email that needs to be handled and replied to. The prompt information 1 changed to dynamic or another graphic or text form may also be referred to as first prompt information, which is used to indicate that the first email is to be handled.

In addition, in the normal mode, when the first email is received, the mobile phone 3 may not display the prompt information 1 corresponding to the first email. When the system time of the mobile phone 3 reaches the reminder time point, the reminder information 1 corresponding to the first email is displayed. In this case, the displayed prompt information 1 also becomes the first prompt information.

It can be understood that the reminder time point indicates a time of single reminding, while the reminder period indicates times of multiple reminding. For example, when the time limit information includes a reminder period, the mobile phone 3 can implement a fixed-point reminder for the first email based on the reminder period.

For example, when the mobile phone 3 determines, through parsing, that the reminder period carried in the email 4 is reminding once every 12 hours, then starting from the time when the reminder period is parsed out, reminding is performed once every 12 hours. For the implementation form of the reminder, refer to the reminder form corresponding to the reminder time point, for example, a notification reminder and/or an on-top reminder.

For another example, when the time limit information carried in the first email includes a deadline and a reminder time point, the mobile phone 3 may provide a notification reminder and/or an on-top reminder for the first email when the system time reaches the reminder time point and the mailbox of the user C does not reply to the first email. When the system time exceeds the deadline and the email of the user C does not reply to the first email, the mobile phone 3 may provide an overdue reminder for the first email.

For another example, when the time limit information carried in the first email includes a deadline and a reminder period, the mobile phone 3 may provide a notification reminder and/or an on-top reminder for the first email in each reminder period until the system time reaches the deadline. When the system time exceeds the deadline, an overdue reminder is provided for the first email.

The handling reminder mentioned in the foregoing example is a reminder inside the email APP. In this embodiment of this application, the handling reminder for the first email may alternatively be a reminder implemented by using another APP. In this way, even if the mobile phone 3 does not start the email APP, the user may still be reminded to handle the first email.

Figure 11A:
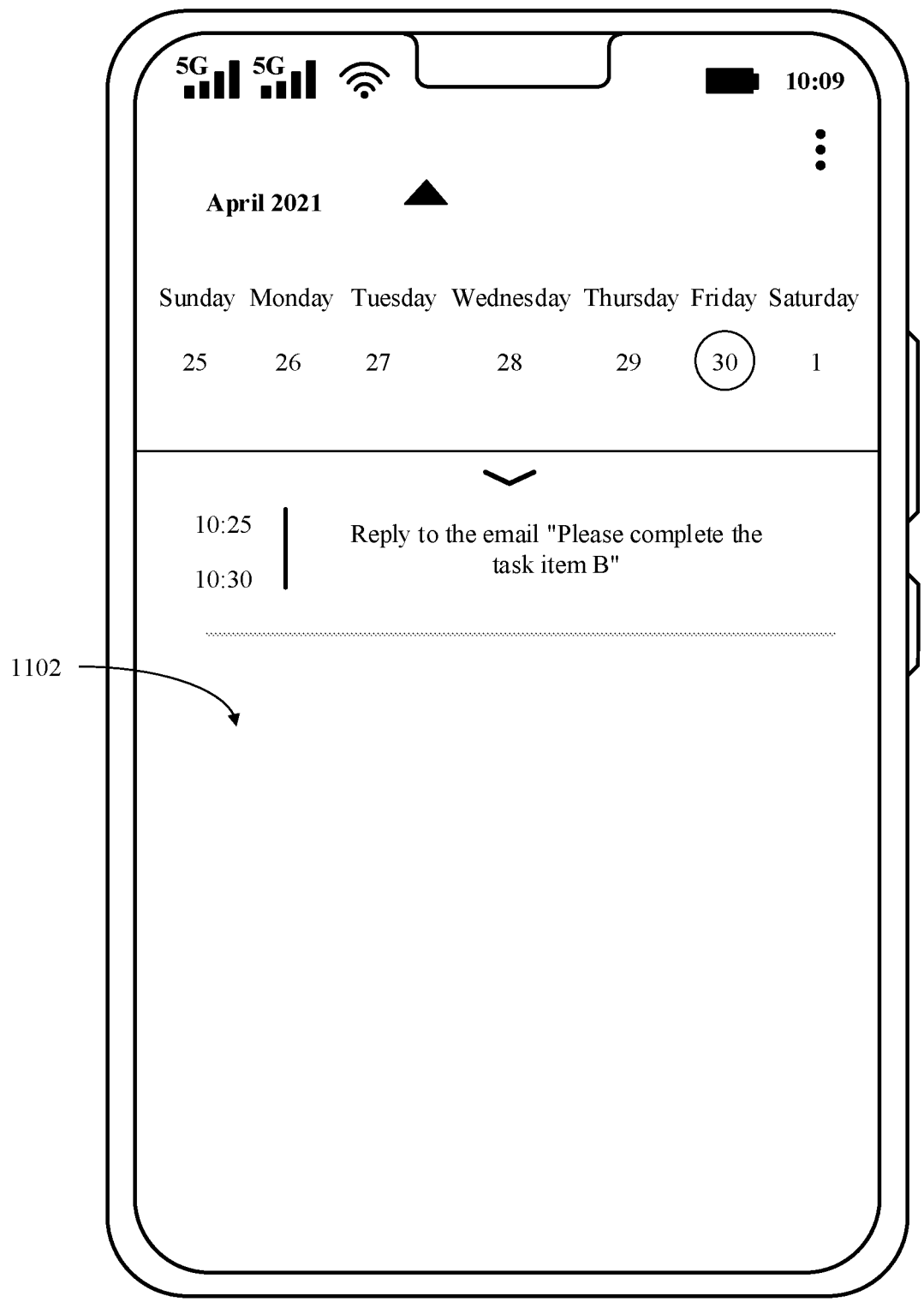
FIG. 11(A) and FIG. 11(B) are another schematic display diagram of an email receiving end according to an embodiment of this application.

For example, a calendar reminder may be implemented by using the calendar APP. As shown in FIG. 11(A), the mobile phone 3 displays a calendar interface 1102 when receiving an operation of the user on an icon of the calendar APP, such as a tap operation. The calendar interface 1102 includes a reminder item corresponding to the first email, for example, the reminder item "Reply to the email <Please complete the task item B>" corresponding to the email 4. In addition, the calendar interface 1102 further includes a starting time corresponding to the reminder item. The foregoing starting time may be determined based on time limit information of the first email. In an example, when the time limit information includes a reminder time point, the foregoing starting time may be a period of time after the reminder time point. For example, when the reminder time point of the email 4 is 10:25 on Apr. 30, 2021, a starting time of a task item corresponding to the email 4 may be from 10:25 on Apr. 30, 2021 to 10:30 on Apr. 30, 2021.

In another example, when the time limit information includes a reminder time point and a deadline, the foregoing starting time may be a period of time between the reminder time point and the deadline. For example, when the reminder time point of the email 4 is 10:25 on Apr. 30, 2021, and the deadline of the email 4 is 10:30 on Apr. 30, 2021, the starting time of the task item corresponding to the email 4 may be from 10:25 on Apr. 30, 2021 to 10:30 on Apr. 30, 2021.

In this way, when the system time reaches 10:25 on Apr. 30, 2021, the mobile phone 3 first performs a fixed-point reminder. For example, a notification box is displayed on the current interface (for example, a home screen) of the mobile phone 3. The notification box is used to prompt the user for the first email to be handled, and is, for example, a notification box 1101 shown in FIG. 11(B). The notification box 1o1 includes content that needs to be handled by the user.

Then, when the system time reaches 10:30 on Apr. 30, 2021, the mobile phone 3 performs an overdue reminder. For example, a notification box is displayed on the current interface (for example, a home screen) of the mobile phone 3. In this case, the displayed notification box is used to prompt the user that the time has exceeded the deadline for handling the first email.

Figure 12A:
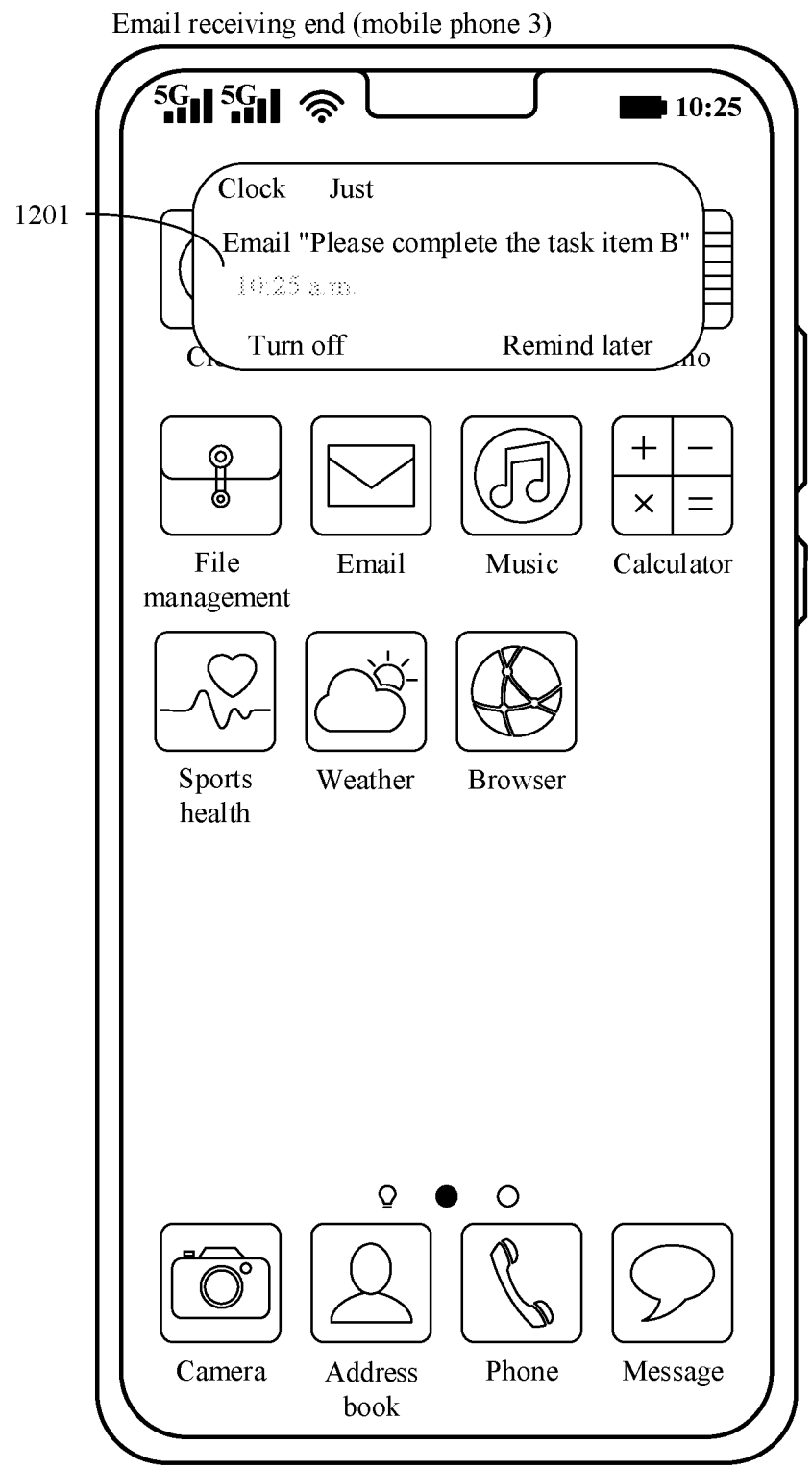
FIG. 12A is another schematic display diagram of an email receiving end according to an embodiment of this application.

For another example, an alarm clock reminder may also be implemented by using a clock APP. For example, when the system time of the mobile phone 3 reaches a time indicated by the reminder time point or the reminder period, an alarm clock reminder box, such as a reminder box 1201 shown in FIG. 12A, is displayed on the current interface (for example, a home screen) of the mobile phone 3. Alternatively, when the system time of the mobile phone 3 reaches a time indicated by the reminder time point or the reminder period, the mobile phone 3 may perform a reminder of a type such as ringing and vibrating. Alternatively, the mobile phone 3 may display an alarm clock reminder box, and perform reminders of ringing and vibrating. This is not specifically limited in this embodiment.

In addition, mailboxes logged in on a second device (for example, a mobile phone 2 and a mobile phone 3) may receive a plurality of emails with time limit information. To facilitate management of the foregoing plurality of emails with time limit information, the second device may display corresponding task items in a centralized manner, thereby prompting the user to handle the foregoing email.

It can be understood that the first email refers to all emails with time limit information. That is, the first email may be emails sent by a device or emails received by a device. To distinguish the description, the first email received by a device may also be referred to as a second email.

Figure 12B:
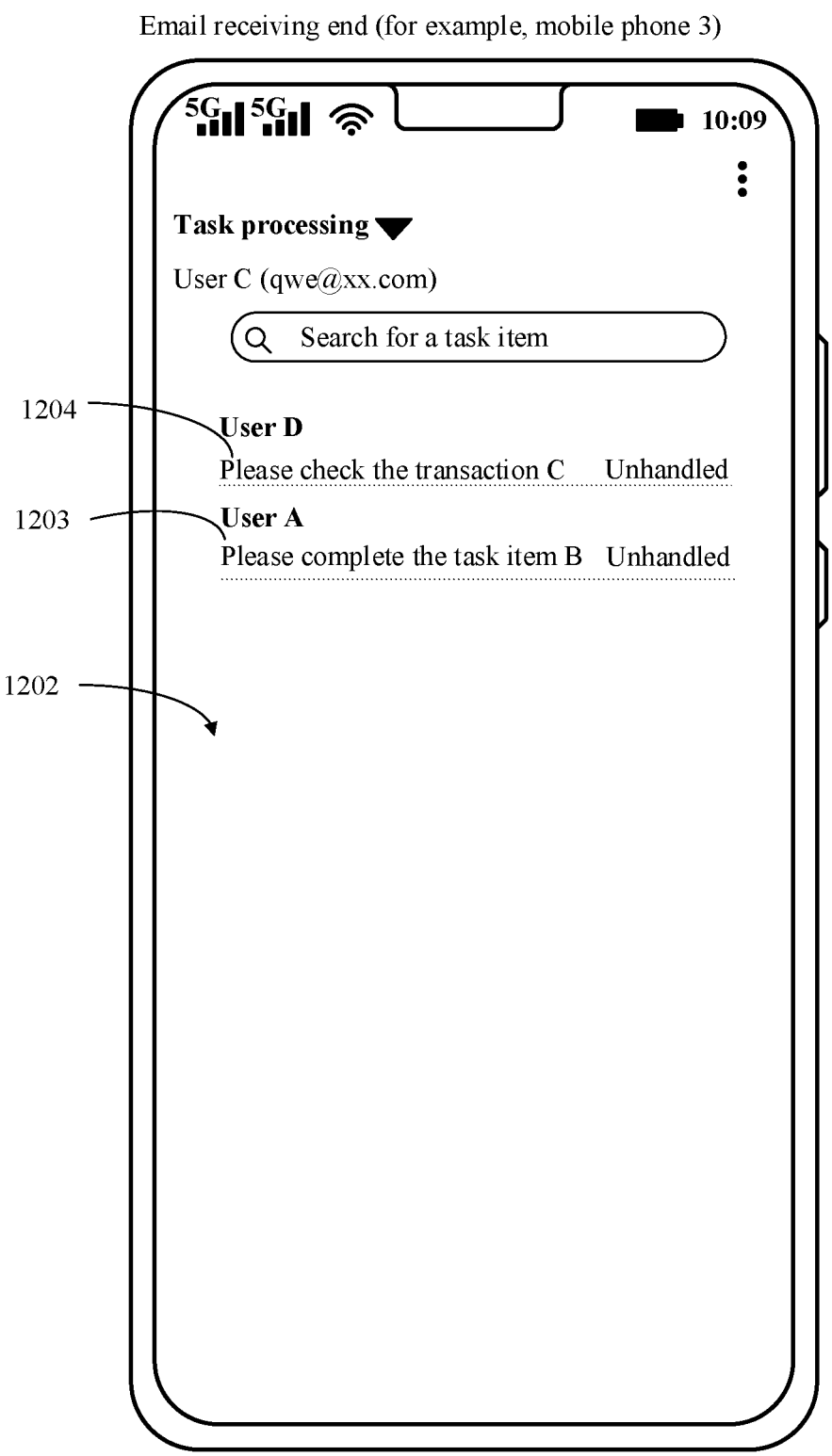
FIG. 12B(A), FIG. 12B(B), and FIG. 12B(C) are another schematic display diagram of an email receiving end according to an embodiment of this application.
Figure 12B:
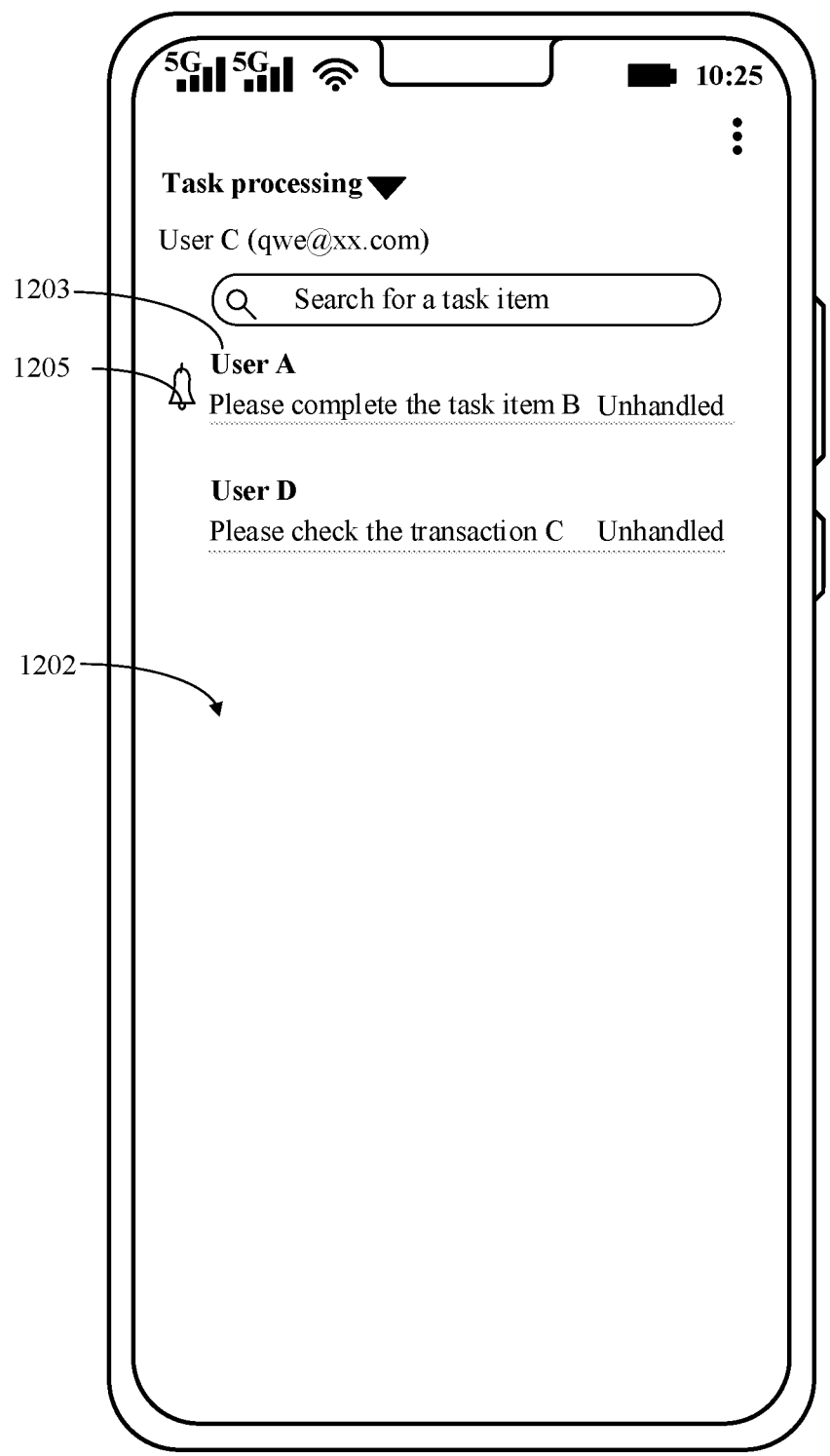
Figure 12B:
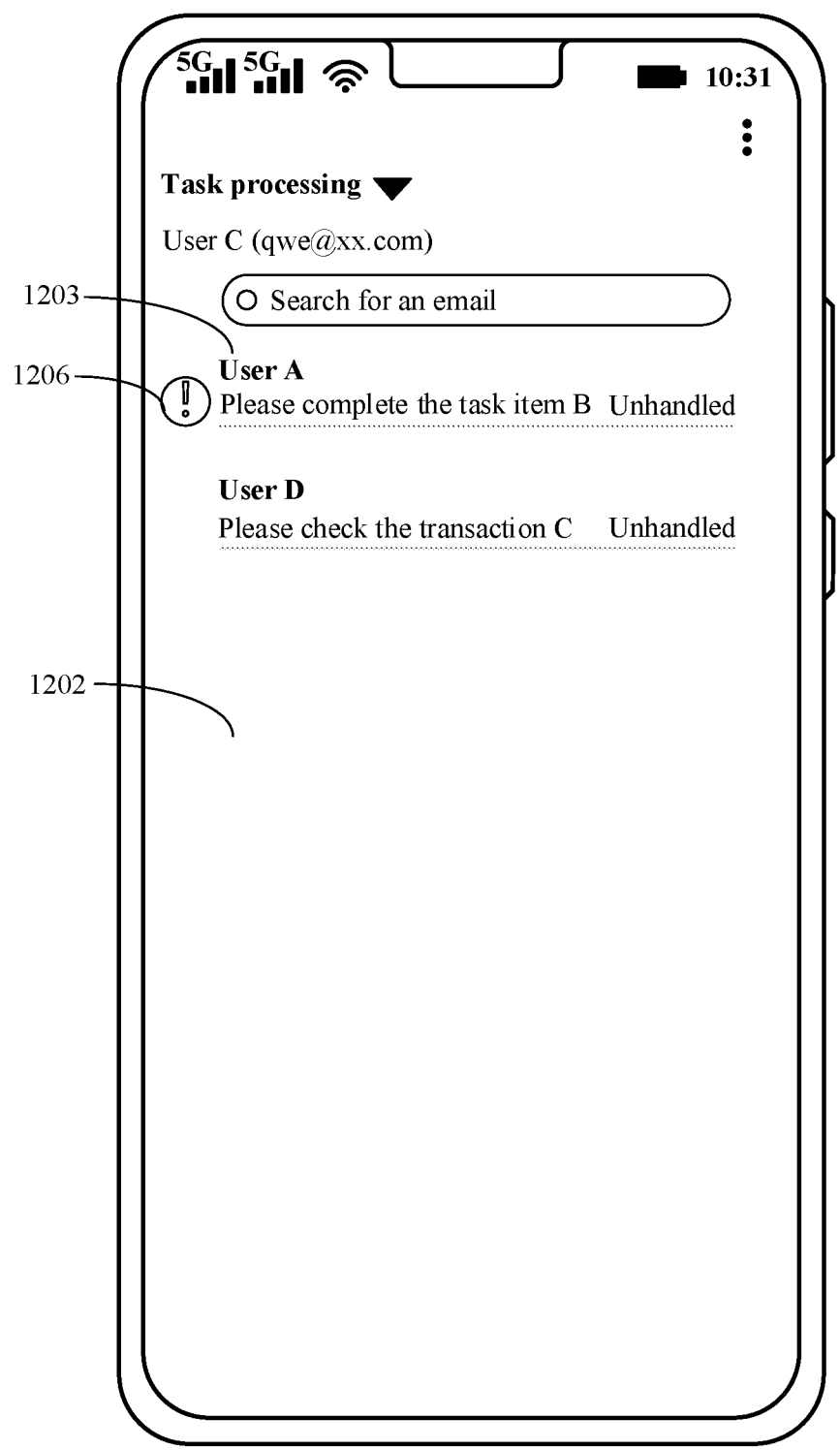

Using a mobile phone 3 as an example, when the mobile phone 3 receives a first operation of the user, a task processing interface 1202 shown in FIG. 12B(A) is displayed. The task processing interface 1202 may include task items for representing received second emails, for example, a task item 1203 corresponding to an email 4 and a task item 1204 corresponding to an email 3. The task items may be arranged based on a time sequence corresponding to the second emails. In an example, the foregoing time sequence may be a sending time sequence corresponding to the second emails. The foregoing sending time may be parsed out from the second emails. In another example, the foregoing time sequence may be a sequence in which the mailbox of the user C receives the second emails. On the task processing interface 1202, a handling state of the second emails is further displayed at each task item. For example, a handling state of the email 4 is displayed at the task item 1203, for example, a character "Unhandled" is displayed. A handling state of the email 3 is displayed at the task item 1204, for example, a character "Unhandled" is displayed.

In an example, the first operation that triggers displaying of the task processing interface 1202 by the mobile phone 3 may be: The mobile phone 3 receives an operation of the user on the first email displayed on the mailbox interface 902, such as double-tap on prompt information 1 corresponding to the first email.

In another example, the first operation that triggers displaying of the task processing interface 1202 by the mobile phone 3 may alternatively be: A second selection window is displayed when the mobile phone 3 receives a tap operation of the user on the first email displayed on the mailbox interface 902. The foregoing second selection window includes an option for checking the task processing interface and an option for checking email text. When the mobile phone 3 receives the user's selection of the option for checking the task processing interface, it is determined that a specific operation performed by the user has been received.

In some other embodiments, the task processing interface 1202 may further pop up when the system time of the mobile phone 3 reaches the reminder time point or the deadline.

In addition, in this embodiment of this application, a reminder for the first email may be further implemented on the task processing interface 1202 based on the time limit information of the first email.

For example, when the system time of the mobile phone 3 reaches the reminder time point corresponding to the first email, a task item corresponding to the first email is displayed on top of the task processing interface 1202. For example, when the system time reaches the reminder time point corresponding to the email 4, a task item 1203 corresponding to the email 4 is displayed on top of the task processing interface 1202, as shown in FIG. 12B(B). In addition, prompt information 4 may alternatively be displayed at the task item 1203. The prompt information 4 may be an identifier for prompting that the email 4 is to be handled, such as an identifier 1205. Therefore, the task processing interface 1202 implements a timing reminder for the first email.

For another example, when the system time of the mobile phone 3 exceeds the deadline corresponding to the first email, prompt information 5 (also referred to as third prompt information) is displayed at the task item of the first email. The prompt information 5 is an identifier used to remind that the first email is overdue. For example, when the system time exceeds the deadline corresponding to the email 4, as shown in FIG. 12B(C), an identifier 1206 is displayed at the task item 1203 on the task processing interface 1202.

In addition, it should be noted that the foregoing handling reminders are performed when the mailbox of the user C does not reply to the first email.

That is, after the second device sends a reply email to the first email, the second device no longer provides a handling reminder for the first email.

In addition, after the first device receives the reply email to the sent first email, the first device may further automatically count reply emails corresponding to the first email. When the first email corresponds to a plurality of receiving mailboxes, the user does not need to check which receiving mailboxes have replied and which receiving mailboxes do not reply, thereby improving efficiency of human-computer interaction. In addition, the first device may further regard each sent first email as a task item for management.

Figure 13A:
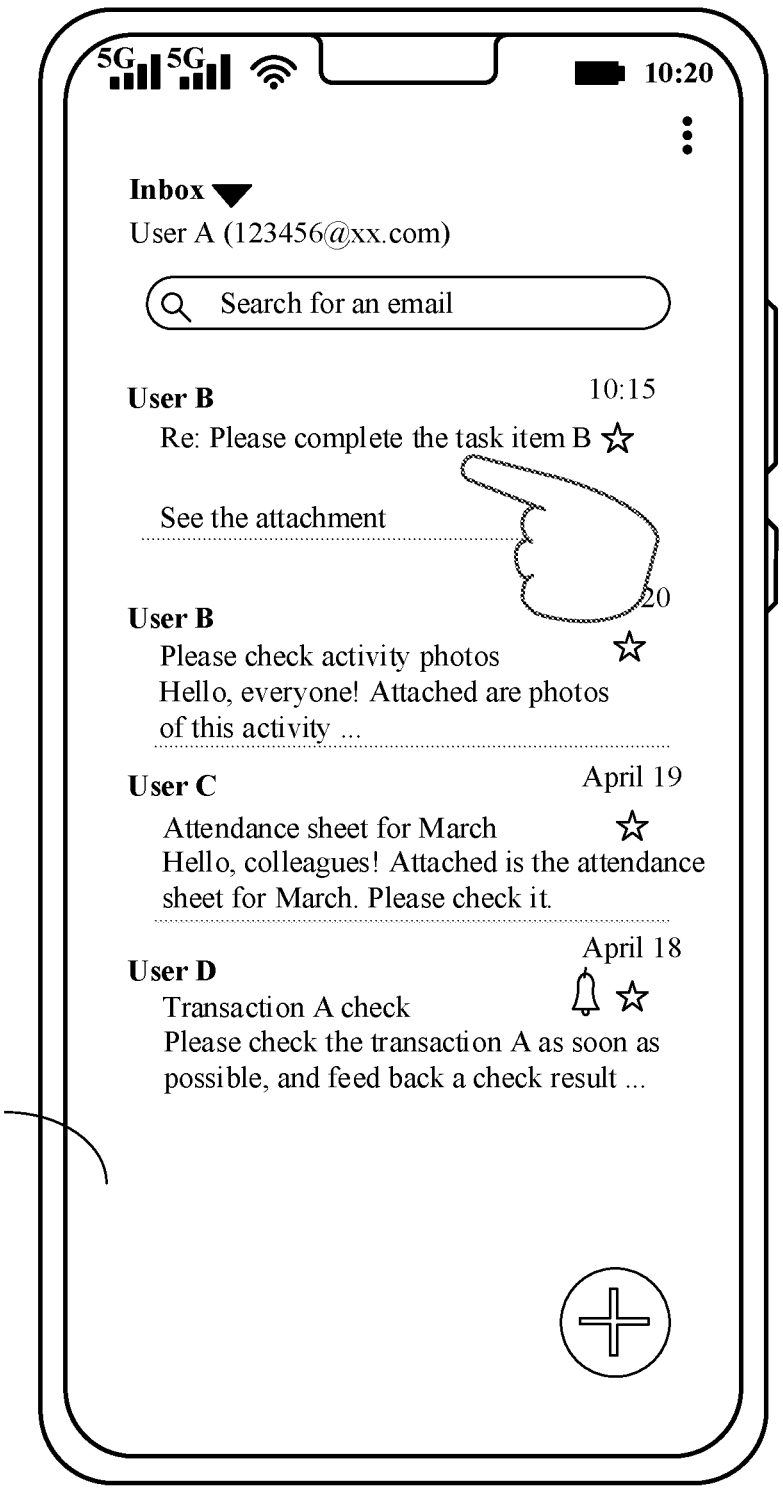
FIG. 13(A)-FIG. 13(B), and FIG. 13(C) are another schematic display diagram of an email sending end according to an embodiment of this application.
Figure 13B:
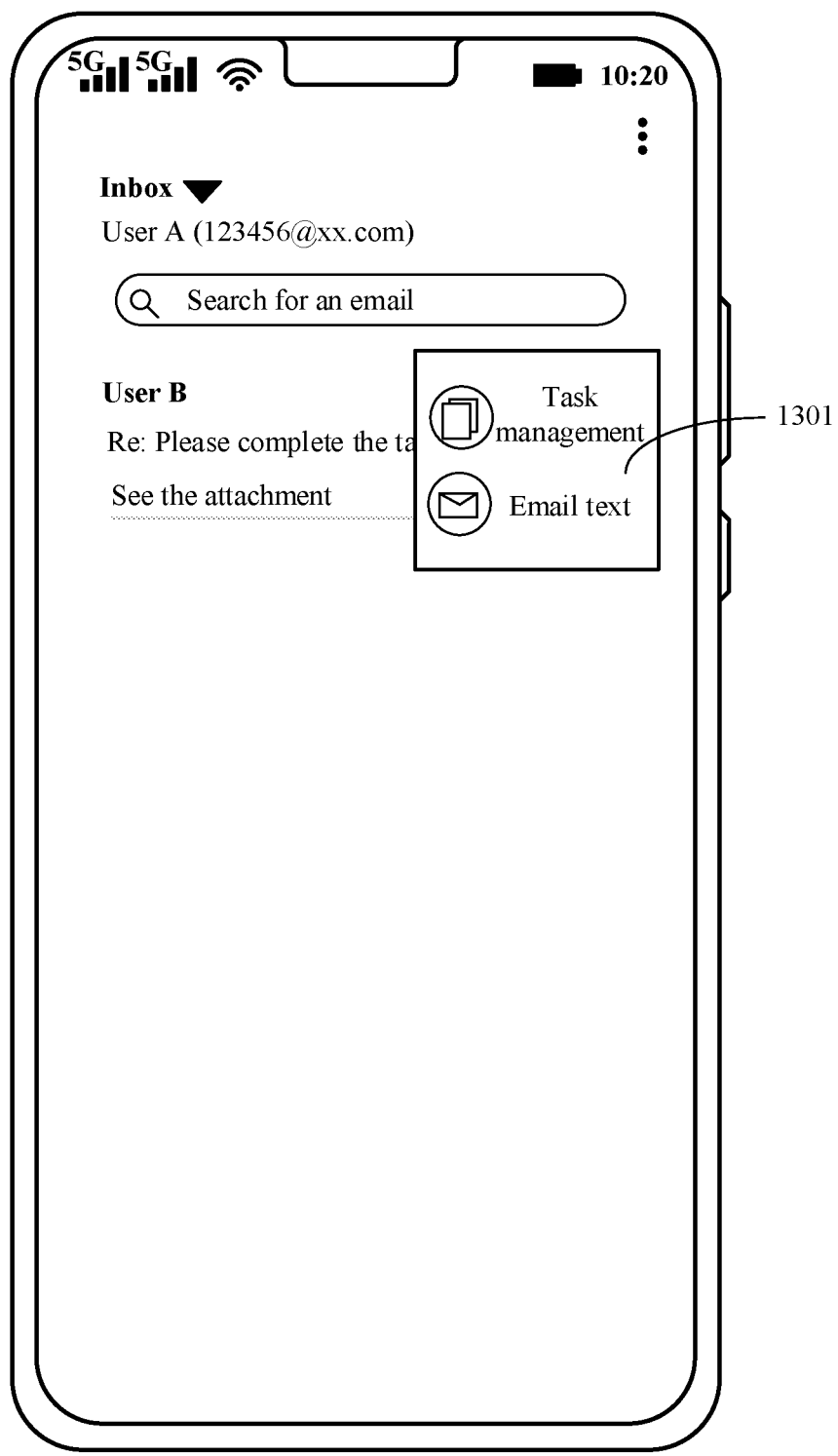

For example, the mailbox of the user B has replied to the email 4, while the mailbox of the user C does not reply to the email 4. When a publishing mailbox of the email 4 (that is, the mailbox of the user A) receives the reply email sent by the mailbox of the user B, as shown in FIG. 13(A), a mailbox interface 304 of the mobile phone 1 includes a reply email to the email 4 from the user B. The email 4 is a first email configured with time limit information. Therefore, when the mobile phone 1 receives an operation of the user for the reply email, such as a tap operation, as shown in FIG. 13(B), a third selection window 1301 may be displayed. The foregoing third selection window 1301 includes a task management option and an email text option.

For example, the user selects task management in the third selection window 1301. The mobile phone 1 receives the user's operation of tapping the task management option, indicating that the user needs to check a reply status of the email 4, which may also be referred to as a reply state. The reply status may be a statistical result of replies to the email 4, that is, the reply status may represent a correlation between a quantity of receiving mailboxes having replied to the email 4 and a quantity of all receiving mailboxes corresponding to the email 4. For example, the reply status may be displayed in a form of a statistical result such as a reply proportion chart and a reply proportion. The foregoing operation used to trigger displaying of the task management interface may also be referred to as the operation on the task management option.

For example, the user selects the email text in the third selection window 1301. The mobile phone 1 receives the user's operation of tapping the email text option, indicating that the user needs to check actual content of the reply email.

Figure 13C:
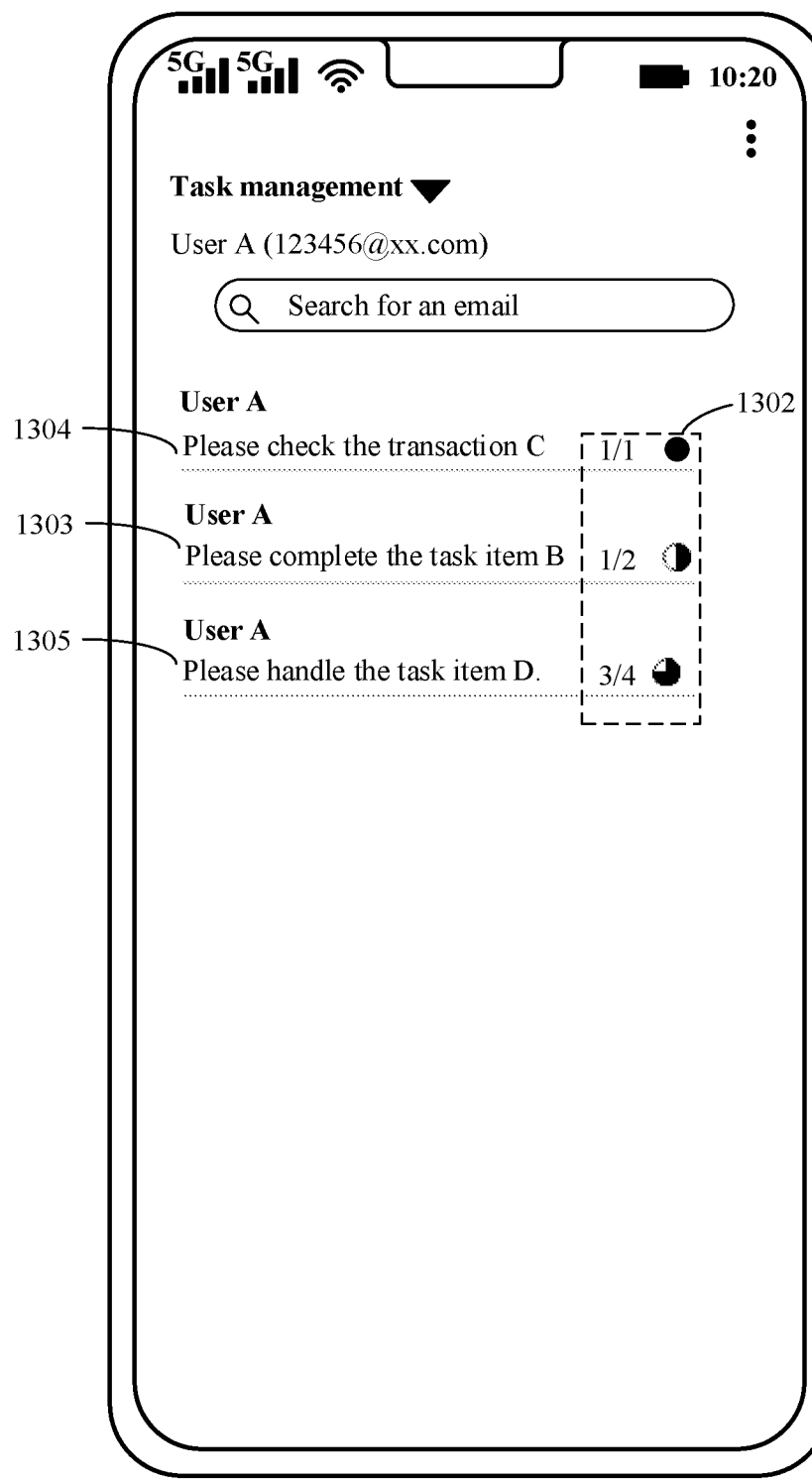

In addition, when the mobile phone 1 receives the user's operation of selecting task management, the mobile phone 1 displays a task management interface (also referred to as a third interface of the mailbox) shown in FIG. 13(C). When the mobile phone 1 receives the user's operation of selecting the email text, the mobile phone 1 displays a content interface corresponding to the reply email.

The task management interface includes a task item corresponding to the first email published by the mailbox of the user A. The task item includes information for representing a reply status of the first email, that is, a task state, such as completion information 1302 shown in FIG. 13(C).

For example, the email 4 corresponds to two receiving mailboxes, and only one receiving mailbox replies to the email 4. Therefore, as shown in FIG. 13(C), on the task management interface, corresponding completion information 1302, such as a reply proportion of ½ and a reply proportion chart for representing ½, may be displayed at a task item 1303 corresponding to the email 4.

For another example, the first email (referred to as an email 6) with a subject of "Check the transaction C" published by the current mailbox corresponds to a receiving mailbox, and the receiving mailbox has replied to the email 6. Therefore, as shown in FIG. 13(C), on the task management interface, corresponding completion information 1302, such as a reply proportion of 1/1 and a reply proportion chart for representing 1/1, may be displayed at a task item 1304 corresponding to the email 6.

For another example, the first email (referred to as the email 7) with a subject of "Please handle the task item D" published by the current mailbox corresponds to four receiving mailboxes, and three receiving mailboxes among the four receiving mailboxes have replied to the email 7. Therefore, as shown in FIG. 13(C), on the task management interface, corresponding completion information 1302, such as a reply proportion of ¾ and a reply proportion chart for representing ¾, may be displayed at a task item 1305 corresponding to the email 7.

Through displaying on the task management interface, the user may directly and quickly know a reply status of receiving mailboxes for each first email without collecting statistics manually. In this way, efficiency of human-computer interaction is improved, and accuracy is higher. The advantage is especially apparent when a plurality of first emails are published.

In addition, when the mobile phone 1 receives an operation on a task item, such as a tap operation, reply details of the first email corresponding to the task item may be further showed.

Figure 14A:
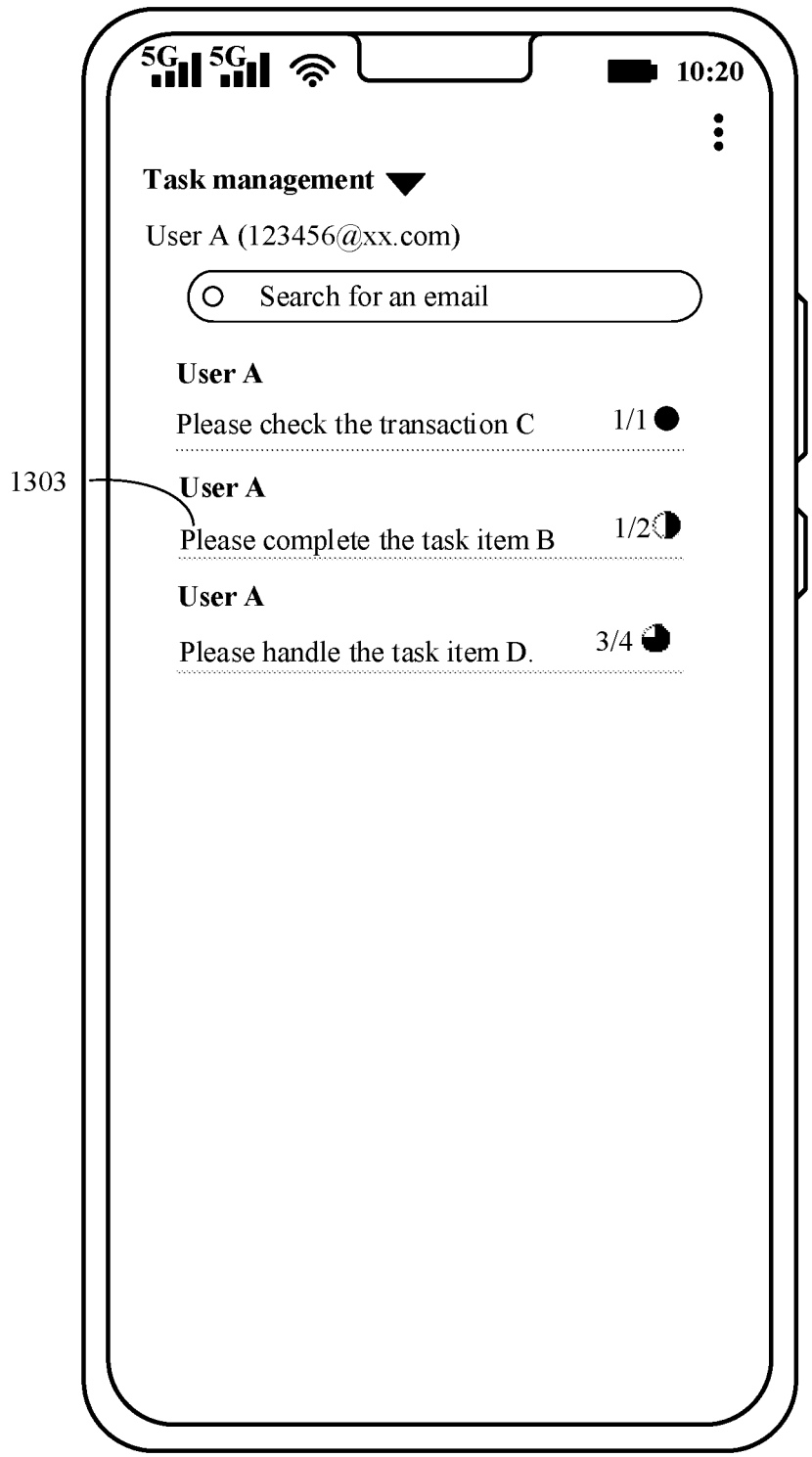
FIG. 14(A) and FIG. 14(B) are another schematic display diagram of an email sending end according to an embodiment of this application.
Figure 14B:
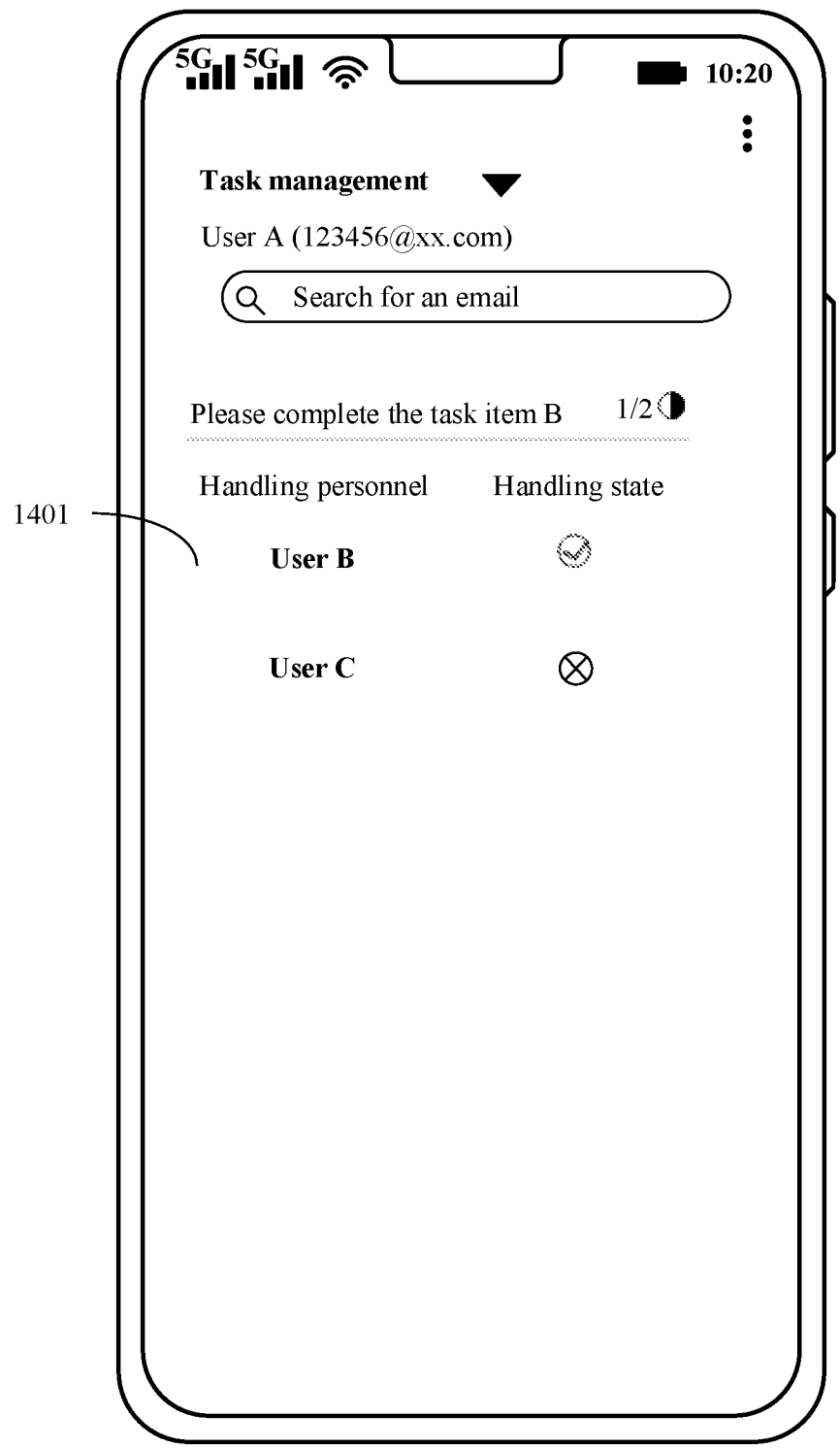

For example, as shown in FIG. 14(A), after a tap operation on a task item (that is, a task item 1303) of the email 4, as shown in FIG. 14(B), reply details 1401 are displayed. For example, the reply details 1401 include: The mailbox of the user B has replied to the email 4, while the mailbox of the user C is not prompted by the email 4. In some embodiments, the foregoing prompt may exist in a form of an image symbol, or may exist in a form of a character. In this way, the user can also more accurately know a reply status of the mailbox of the user B and the mailbox of the user C to the email 4. The user does not need to check all the reply emails related to the email 4 one by one. This improves user experience is improved while enhancing mailbox intelligence.

In addition to actively checking, by the user, the reply status of the first email, the mobile phone 1 may further actively remind the user to check the reply status of the sent first email.

In an implementation, the mobile phone 1 may remind, based on time limit information configured when the first email is created, the user to check the reply status of the sent first email, to avoid forgetting the sent first email. For example, if time limit information is configured when the email 4 is created, the mobile phone 1 may automatically remind the user based on the configured time limit information, so as to prevent the user from forgetting the sent email 4.

The foregoing manner of reminding to check the reply status of the first email may be an internal reminder of the email APP, or may be a reminder outside the email APP.

Using the time limit information including a reminder time point and a deadline as an example, a reminder inside the email APP is described below.

When the system time reaches the reminder time point, the email APP may perform timed notification. For example, on the task management interface, a task item corresponding to the first email may be displayed on top and/or marked as requiring attention, and the like. For another example, on an outbox interface of the email application, the first email may alternatively be displayed on top and/or marked as requiring attention, and the like.

Figure 15A:
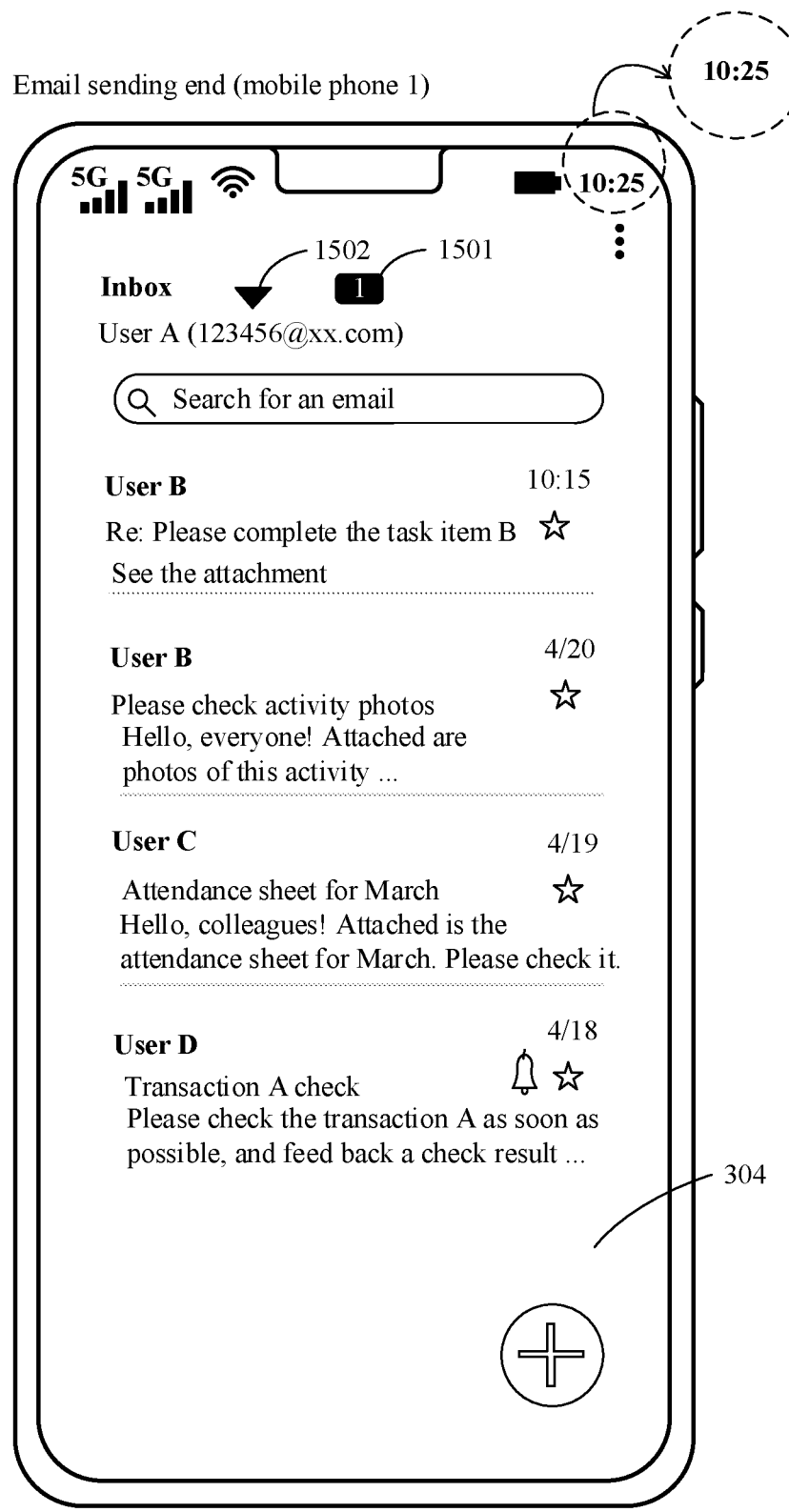
FIG. 15(A), FIG. 15(B), and FIG. 15(C) are another schematic display diagram of an email sending end according to an embodiment of this application.

For example, the reminder time point of the email 4 is 10:25 a.m. on April 30. After the system time reaches 10:25 a.m. on April 30, if the mobile phone 1 receives an operation of the user for opening the email APP, a mailbox interface 304 shown in FIG. 15(A) is displayed. The mailbox interface 304 displays reminder information, such as a reminder bubble 1501. The reminder bubble 1501 is used to remind the user that there is a to-do item in the mailbox. In addition, the reminder bubble 1501 may be further used to remind the user of the quantity of to-do items in the mailbox. For example, a digit "i" displayed in the reminder bubble 1501 indicates that there is a to-do item in the current mailbox. In addition, the mailbox interface 304 further includes a control for switching a mailbox folder, such as a control 1502. The foregoing control corresponds to an inbox icon of the mailbox interface 304. The user may check, by operating the control 1502, such as a tap operation, to-do items indicated by the reminder bubble 1501.

Figure 15B:
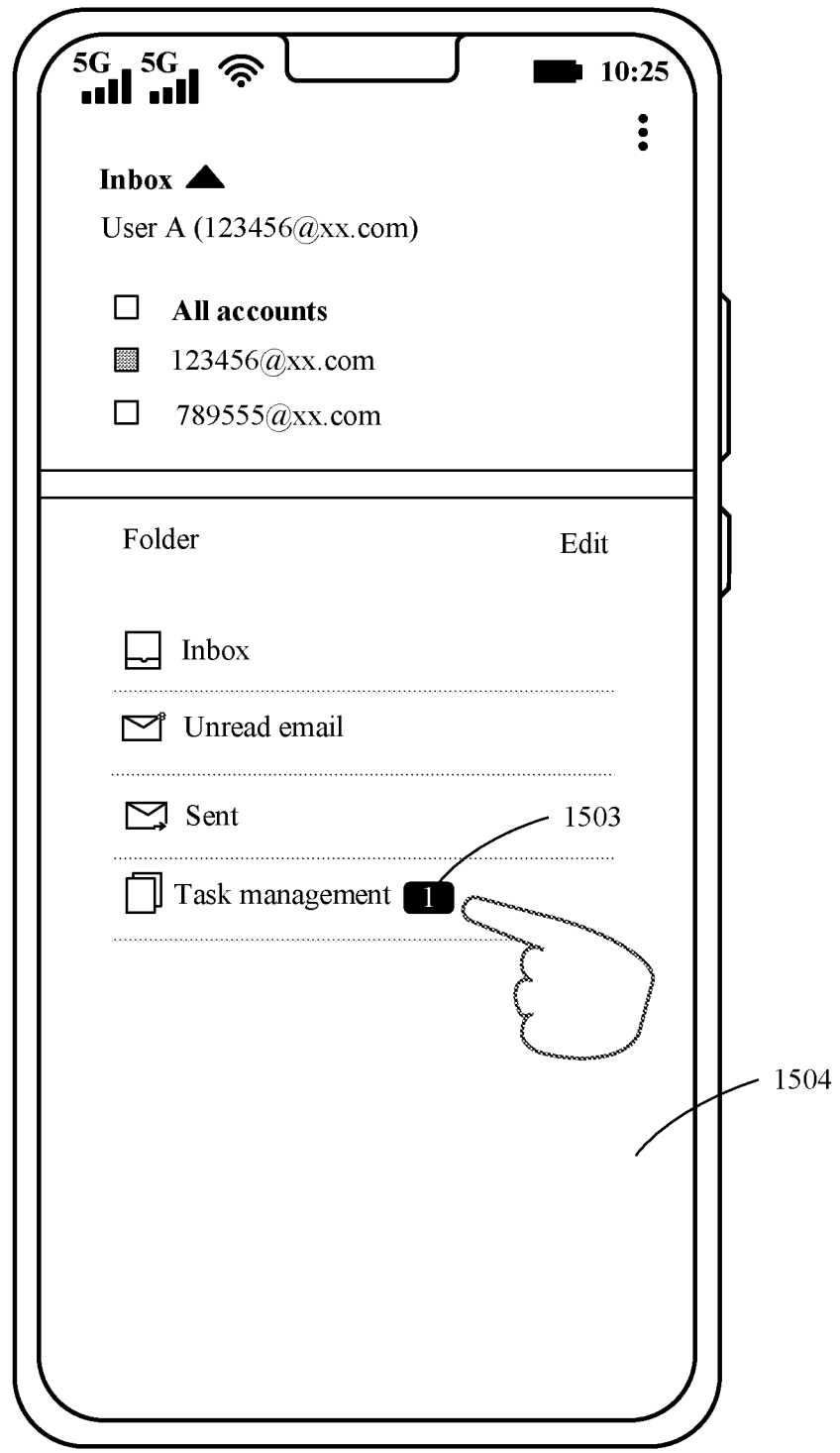

After the mobile phone 1 receives the tap operation on the control 1502, a folder interface 1504 shown in FIG. 15(B) is displayed. The folder interface 1504 includes an option corresponding to an inbox, an option corresponding to unread emails, an option corresponding to sent emails, and an option corresponding to task management. When the mobile phone 1 receives an operation of the user on the option corresponding to an inbox, a mailbox interface 304 is displayed. When the mobile phone 1 receives an operation of the user on the option corresponding to unread emails, a folder of unread emails is displayed. When the mobile phone 1 receives an operation of the user on the option corresponding to sent emails, a folder of sent emails is displayed.

Reminder information, such as a reminder bubble 1503, is displayed at the option corresponding to task management. The reminder bubble 1503 is used to prompt that the to-do item is that there is a first email that needs attention. For example, a digit "1" is displayed in the reminder bubble 1503, indicating that the to-do item is a first email that needs attention.

Figure 15C:
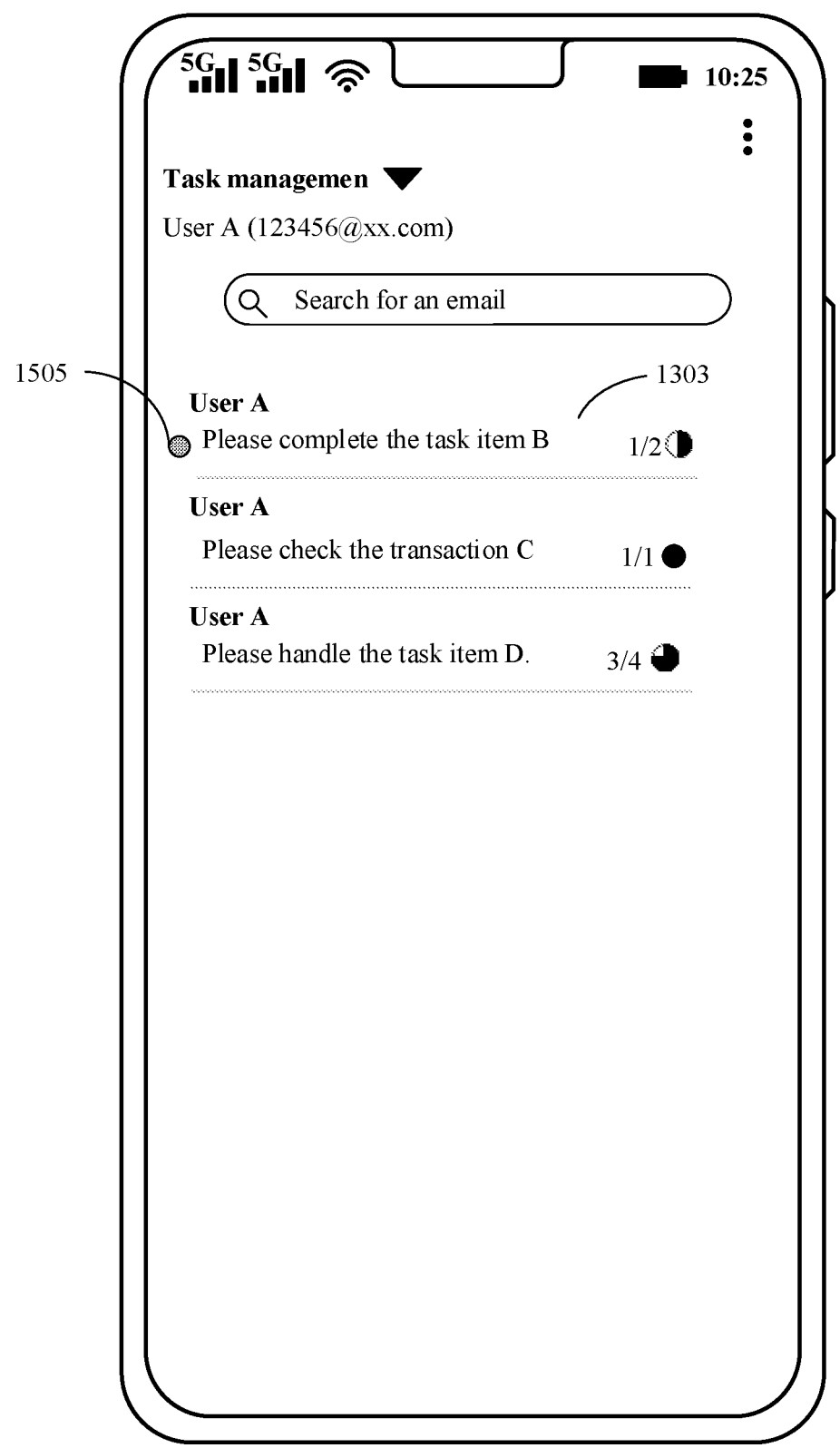

Then, when the mobile phone 1 receives an operation on the option corresponding to task management, such as a tap operation, as shown in FIG. 15(C), the mobile phone 1 may display a task management interface. The foregoing operation that triggers displaying of the task management interface may also be the operation of the task management option. On this task management interface, a task item 1303 corresponding to the email 4 is placed on top, and a to-do mark, such as a mark 1505, is displayed on the corresponding email 4. The mark 1505 is used to prompt the user to pay attention to a reply status of the email 4.

In addition, when the system time reaches the reminder time point, if at least one receiving mailbox among receiving mailboxes corresponding to the first email does not reply to the first email, then the email APP may also perform an overdue notification reminder.

Figure 16:
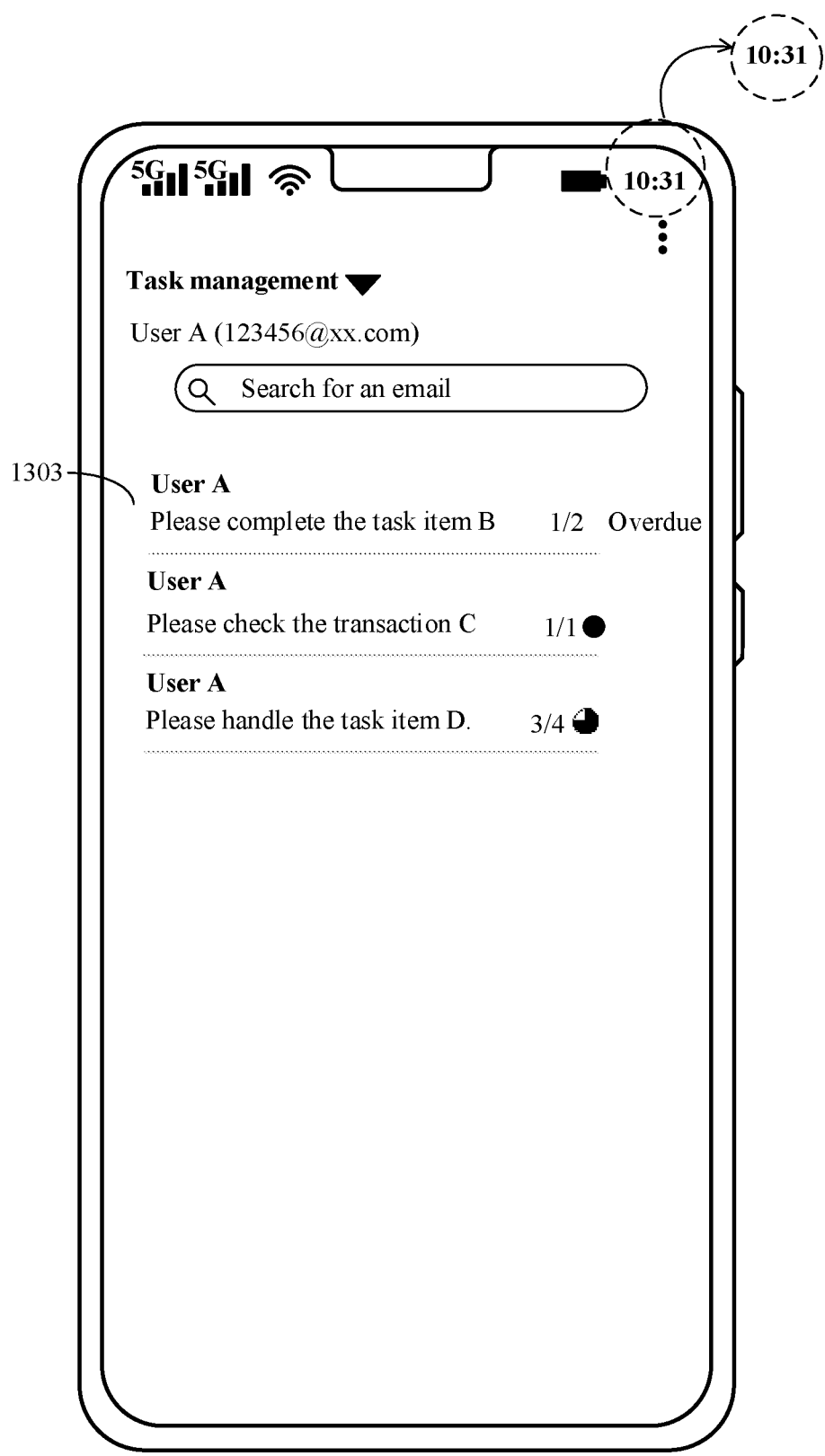
FIG. 16 is another schematic display diagram of an email sending end according to an embodiment of this application.

For example, the deadline for the email 4 is 10:30 a.m. on April 30. After the system time reaches 10:31 a.m. on April 30, there is at least one receiving mailbox that does not reply to the email 4, for example, the mailbox of the user C does not reply to the email 4. As shown in FIG. 16, on the task management interface, a task item corresponding to the email 4 is displayed on top, and a mark indicating overdue is displayed at the task item, for example, the character "overdue" is displayed.

For another example, on an outbox interface of the mobile phone 1, the first email may also be displayed on top and/or marked as overdue, and the like.

In addition, when the reminder time point corresponding to the first email is reached, on the mailbox interface 304, reply emails to the first email may be further arranged before other emails, so that the user can easily check an actual reply status of the first email.

In a possible implementation, an application other than the email APP may further perform a reminder based on time limit information. For example, an alarm clock application provides an alarm clock reminder. For another example, a schedule application performs a schedule reminder. In this way, even if the user does not enter the email APP, the user may also be reminded in a timely manner, thereby preventing the user from ignoring the sent first email. The specific implementation is similar to the implementation of a reminder performed by the second device. Details are not described herein one by one again.

In another implementation, the mobile phone 1 may further set a prompt time for the first email alone based on an operation of the user. Then, based on the prompt time, the user is reminded to check a reply status of the sent first email.

It can be understood that a principle of reminding the user to check the reply status of the first email based on the prompt time is the same as that of reminding the user to check the reply status of the first email based on the time limit information as described above.

For example, the foregoing prompt time includes a preset prompt time point and the preset overdue prompt time point. When the system time reaches the preset prompt time point, the email APP may perform a notification reminder or perform a reminder by using another application. When the system time exceeds the overdue prompt time point, if at least one receiving mailbox among receiving mailboxes corresponding to the first email does not reply to the first email, then the email APP may also perform an overdue notification reminder.

In addition, in some embodiments, the foregoing preset prompt time point and the reminder time point in the time limit information may be different time points. The foregoing overdue reminder time point and the deadline in the time limit information may be different time points.

In addition, the electronic device (the first device and the second device) may not only create and send a first email, but also receive a first email sent by another device. To facilitate management of a sent first email and a received first email, in some embodiments, task items corresponding to the received first email and task items corresponding to the sent first email may be displayed by using different interfaces, respectively. For example, task items corresponding to the received first email are displayed on a task processing interface 1202 shown in FIG. 12B(A), FIG. 12B(B), and FIG. 12B(C), and task items corresponding to the sent first email are displayed on a task management interface shown in FIG. 13(C).

Figure 17:
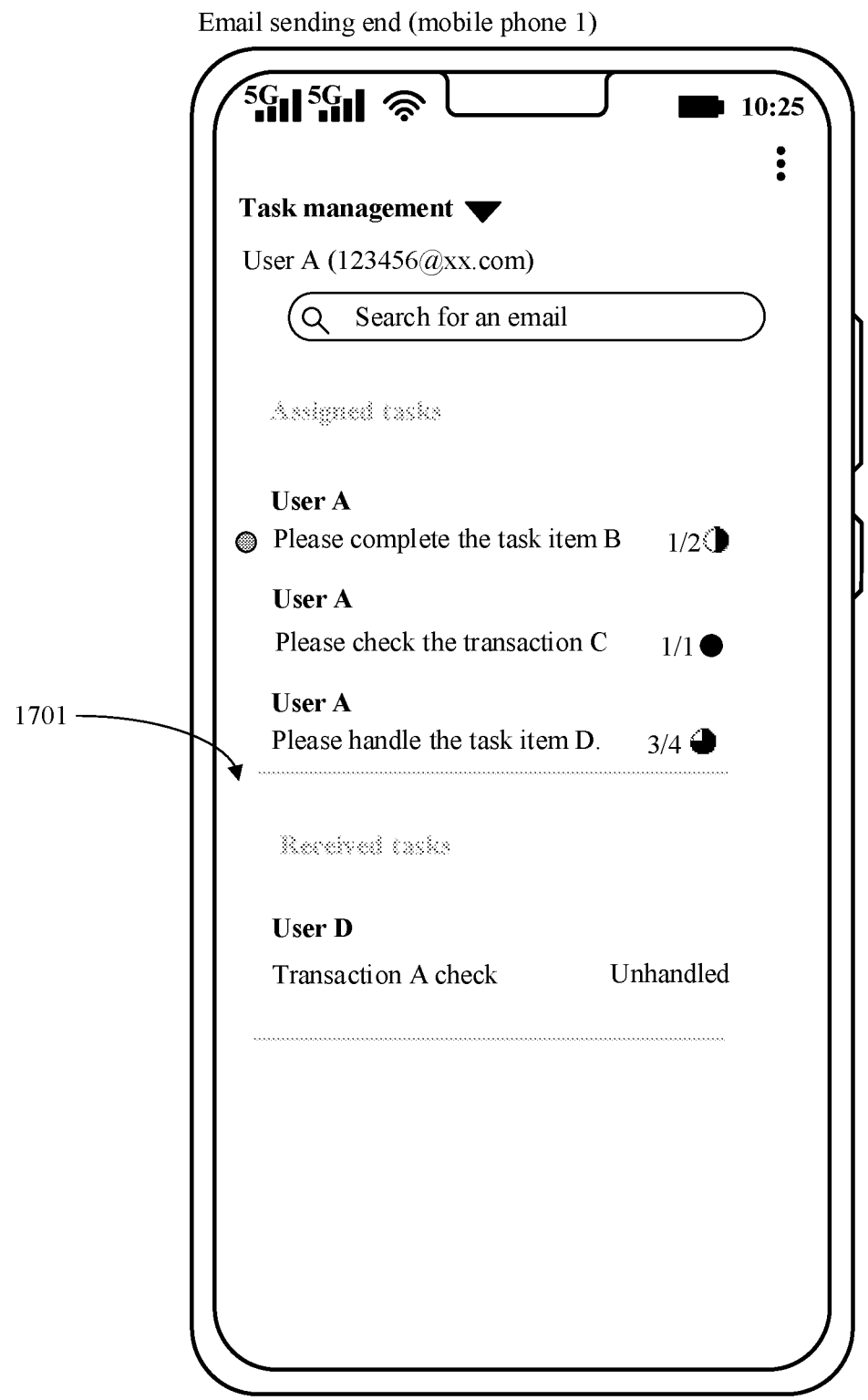
FIG. 17 is another schematic display diagram of an email sending end according to an embodiment of this application.

In some other embodiments, task items corresponding to the received first email and task items corresponding to the sent first email may alternatively be displayed by using a same interface. Using a mobile phone 1 as an example, as shown in FIG. 17, a task item list on a task management interface 1701 may be divided into two sub-items: an "Assigned tasks" sub-item and a "Received tasks" sub-item. Task items corresponding to all first emails sent by the mailbox of the user A may be displayed under the "Assigned tasks" sub-item. Task items corresponding to all first emails received by the mailbox of the user A may be further displayed under the "Received tasks" sub-item.

Software systems of the first device and the second device each may use a layered architecture, an event-driven architecture, a micronucleus architecture, a micro-service architecture, or a cloud architecture. This embodiment of this application uses an Android system with a layered architecture as an example to illustrate examples of software architectures of the first device and the second device.

The layered architecture divides software into several layers, and each layer has a clear function and division of labor. The layers communicate with each other by using an interface. In some embodiments, the Android system is divided into four layers: an application layer, an application framework layer, an Android runtime and a system library, and a kernel layer from top to bottom.

The application layer may include a series of application packages. For example, the application packages may include applications such as email, camera, gallery, calendar, call, map, navigation, WLAN, Bluetooth, music, video, and short message.

The application framework layer provides an application programming interface (application programming interface, API) and a programming framework for applications at the application layer. The application framework layer includes some predefined functions.

The application framework layer may include a view system, a notification manager, an HTTP request, a synchronization manager, an account manager, a device manager, and the like. This is not limited in this embodiment of this application.

The foregoing view system may be configured to construct display interfaces of applications. Each display interface may include one or more controls. Generally, the control may include interface elements such as an icon, a button, a menu, a tab, a text box, a dialog box, a status bar, a navigation bar, and a widget (Widget).

The foregoing notification manager (Notification Manager) enables applications to display notification information in a status bar, may be used to convey a notification-type message, and may automatically disappear after a short pause without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text message is displayed in the status bar, a prompt tone is made, vibration is performed, and an indicator light flashes.

The foregoing synchronization manager (syncmanager) is used to synchronize files corresponding to applications, for example, synchronize email data received by the email APP.

The system library and the kernel layer below the application framework layer may be referred to as an underlying system, and the underlying system includes an underlying display system for providing a display service. For example, the underlying display system includes a display driver in the kernel layer, a surface manager in the system library, and the like.

For example, the method according to this embodiment of this application may be performed in an email application of an electronic device (such as the first device and the second device).

Figure 18:
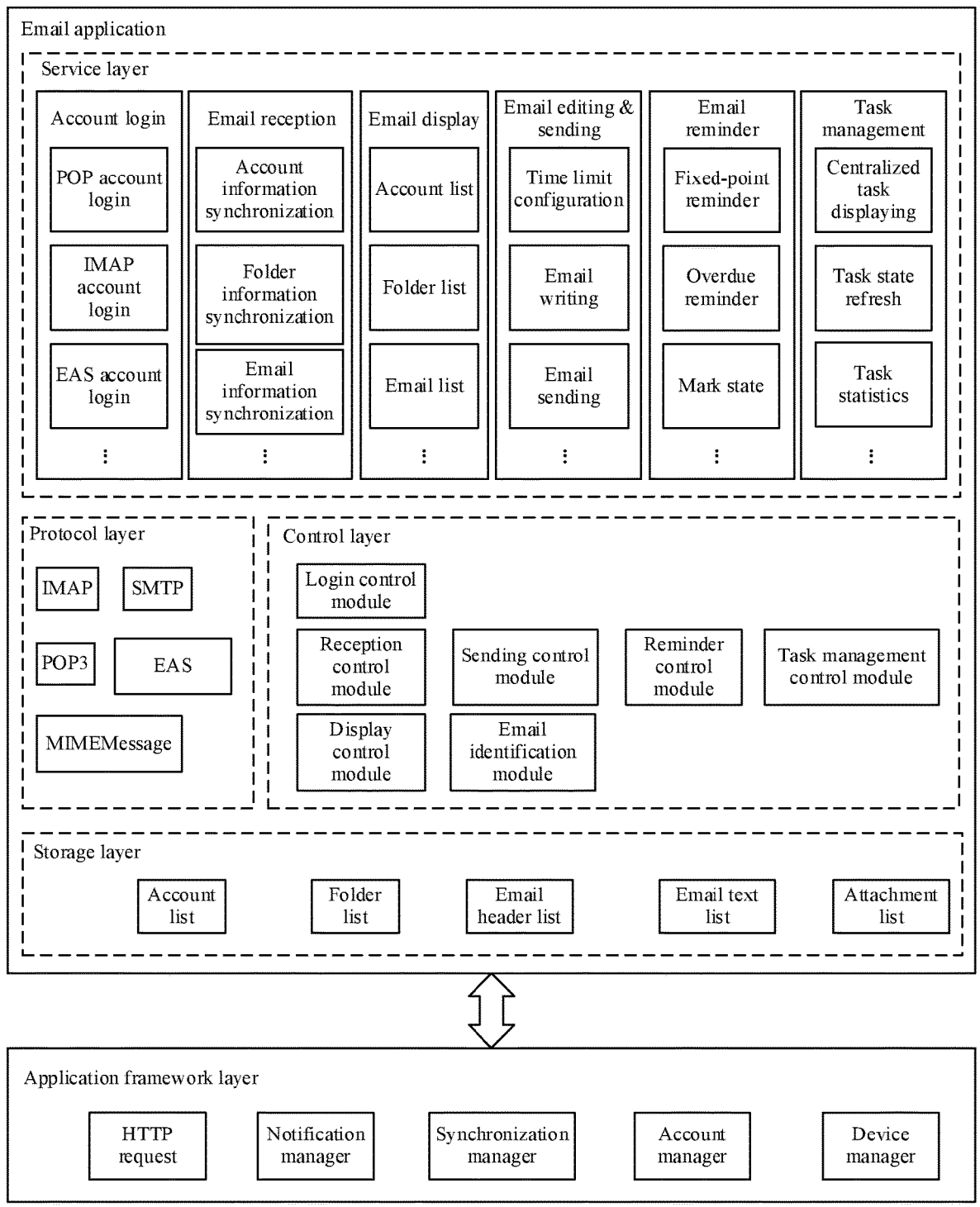
FIG. 18 is a schematic diagram of an architecture of an email application according to an embodiment of this application.

As shown in FIG. 18, the email application of the electronic device may include a service layer, a protocol layer, a control layer, and a storage layer.

The service layer corresponding to the electronic device includes service function modules that may be implemented by the email APP. In this embodiment of this application, the service function modules may include account login, email reception and identification, email display, email writing and sending, email reminders, task management, and the like.

The account login includes POP account login, IMAP account login, Exchange account login, and the like. The email reception includes account information synchronization, folder information synchronization, and email information synchronization. Certainly, for the implementation of the foregoing account login and email reception, reference may be made to the description of related technologies. Details are not described again.

In the foregoing email display, in addition to displaying of an account list, a folder list, and an email list, a task item list corresponding to a published first email may be further displayed on a task management interface or a task item list corresponding to a received first email may be further displayed on a task processing interface.

In addition, the email writing and sending includes: time limit configuration (refer to the time limit information configuration process in the foregoing embodiment), email writing, and email sending. In addition, in addition to a conventional reminder upon email reception, email reminders may be further a fixed-point reminder, an overdue reminder, and a state mark based on time limit information. Finally, task management includes centralized task displaying, task state refreshing, and task statistics.

Certainly, implementation of the foregoing functions needs support from a control layer corresponding to the electronic device.

In this embodiment of this application, the control layer corresponding to the electronic device may include a login control module, a reception control module, a display control module, a sending control module, an email identification module, a reminder control module, and a task management control module. The login control module can support implementation of account login. The reception control module can support implementation of email reception. The display control module can support implementation of email displaying. The sending control module can support implementation of email writing and sending. The reminder control module can support implementation of an email reminder. The task management control module can support implementation of task management.

It is not difficult to understand that in a process of implementing a support function of the control layer, it is further required to follow a mailbox protocol provided by the protocol layer corresponding to the first device. The mailbox protocol provided by the protocol layer corresponding to the first device includes an Internet mail access protocol (Internet mail access protocol, IMAP), exchange active sync (exchange active sync, EAS), post office protocol version 3 (post office protocol version 3, POP3), simple mail transfer protocol (simple mail transfer protocol, SMTP), multipurpose Internet mail extensions (Multipurpose Internet Mail Extensions, MIME) information protocol (referred to as an MIMEMessage protocol), and the like.

For example, the login control module can implement IMAP account login by following the IMAP protocol. The login control module can implement EAS account login by following the EAS protocol. The login control module can implement POP account login by following the POP3 protocol. In addition, after IMAP account login (or POP account login) is implemented by following the IMAP protocol (or the POP3 protocol), the sending control module may send generated email data based on the SMTP.

For another example, before sending email data, the sending control module further needs to construct an email header and an email body (including email text and an email attachment) based on the MIMEMessage protocol.

In addition, after editing of the first email is completed, fields and data corresponding to the first email are stored at the storage layer corresponding to the first device. When the first device determines that the first email needs to be sent, the fields and data corresponding to the first email are obtained from the storage layer, and are encapsulated based on the MIMEMessage protocol. After the first email is sent, the first email is still stored locally, that is, field data corresponding to the first email at the storage layer will not be deleted.

The storage layer corresponding to the foregoing electronic device may include an account list, a folder list, an email header list, an email text list, and an attachment list. The account list is used to store information of an email account. The folder list is used to store folder information under each mailbox account (an inbox, an outbox, sent emails, to-be-sent emails, a draft box, and the like). The email header list is used to store metadata of an email (a recipient, a sender, a carbon copy recipient, a subject, a summary, and the like). The email text list is used to store text content of an email. The attachment list is used to store an attachment part in email data.

In this embodiment of this application, the foregoing email header list is further used to store time limit information, so as to encapsulate the time limit information into an email header. It can be understood that encapsulating, by the first device, the time limit information into an email header does not cause the email to be filtered.

Certainly, in some embodiments, the first device may also encapsulate the time limit information in email text. This is not specifically limited.

After receiving an email, the reception control module further needs to parse out a corresponding email header and email body (including email text and an email attachment) based on the MIMEMessage protocol, and store the email header and the email body at the storage layer.

In addition, the email application of the electronic device may further interact with the application framework layer of the electronic device to obtain required system support.

An implementation principle of the email application provided in this embodiment of this application is described below.

When the electronic device receives an operation of the user for creating a new email (for example, receives the user's tap on a control 301), the display control module displays an email editing interface by invoking a view system. In this embodiment of this application, the sending control module may receive time limit information and email data (for example, including email metadata, email text, and an email attachment) configured by the user, and configure the same to the first email being edited.

Figure 19:
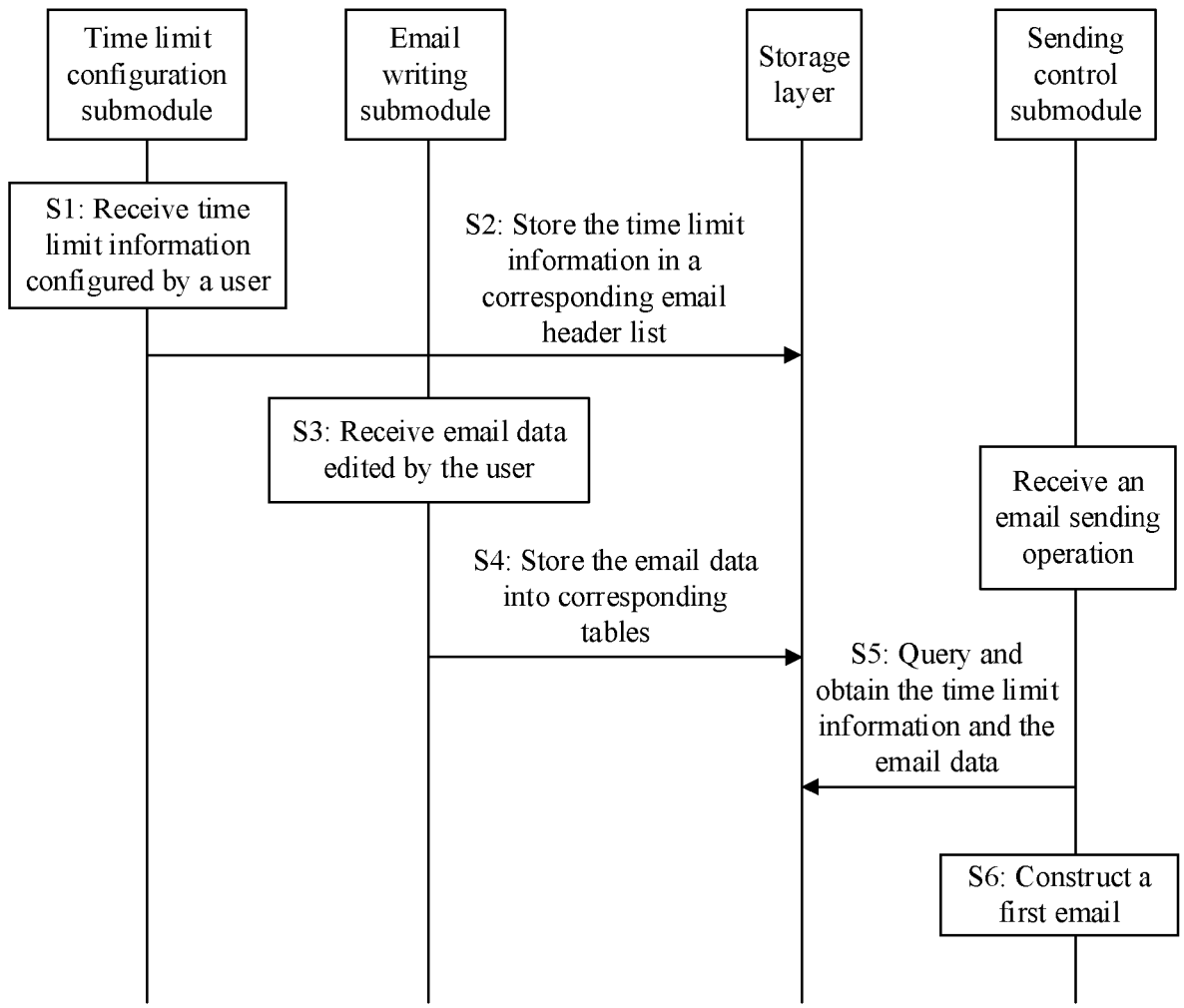
FIG. 19 is a diagram illustrating interaction between functional modules for implementing time limit information configuration according to an embodiment of this application.

In an implementation, the foregoing sending control module may include a time limit configuration submodule, an email writing submodule, and a sending control submodule. As shown in FIG. 19, an operation process of the email application according to this embodiment of this application is as follows.

S1: The time limit configuration submodule receives time limit information configured by a user.

In some embodiments, the foregoing time limit configuration submodule may receive information transmitted by a control in a reminder bar. For example, the control in the reminder bar may include one or a combination of more of a control for setting a reminder period, a control for setting a deadline, and a control for setting a reminder time point.

Upon receiving an operation of the user on the control for setting a reminder period, the time limit configuration submodule displays a first selection box by invoking the view system. In this way, the time limit configuration submodule can obtain a configured reminder period based on the user's operation in the first selection box.

Upon receiving an operation of the user on the control for setting a deadline, the time limit configuration submodule displays a second selection box by invoking the view system. In this way, the time limit configuration submodule can obtain a configured deadline based on the user's operation in the second selection box.

Upon receiving an operation of the user on the control for setting a reminder time point, the time limit configuration submodule displays a third selection box by invoking the view system. In this way, the time limit configuration submodule can obtain a configured reminder time point based on the user's operation in the second selection box.

S2: The time limit configuration submodule stores the time limit information into a corresponding email header list.

In some embodiments, the received time limit information may be further converted into a standard format. For example, the received time limit information is converted into a format required by iCalendar. The time limit information after format conversion is written into the email header list at the storage layer.

In another embodiment, the time limit information may alternatively be stored in the email text list, so that the time limit information can be easily encapsulated into the email text.

S3: The email writing submodule receives email data edited by the user.

In some embodiments, the email writing submodule may receive the email data input by the user in an input box of a recipient, a "Blind carbon copy/carbon copy, sender" input field, a "Subject" input field, an "Email text" editing area, and an email attachment adding area, for example, a receiving mailbox entered by the user in the input box of the recipient, for another example, a carbon copy mailbox and a sending mailbox entered by the user in the "Blind carbon copy/carbon copy, sender" input field, for another example, an email subject entered by the user in the "Subject" input field, for another example, email text entered by the user in the "Email text" editing area, and for another example, an email attachment added by the user in the email attachment adding area.

S4: The email writing submodule stores the received email data into corresponding lists respectively.

In some embodiments, the foregoing corresponding lists may be an email header list, an email text list, and an attachment list at the storage layer. For example, a receiving mailbox, a sending mailbox, a carbon copy mailbox, a subject, a summary, and the like may be stored in the email header list. Email text is stored in the email text list. An email attachment is stored in the attachment list.

It can be understood that there is no necessary sequence between S1 and S3. In addition, both the time limit information and the email data stored at the storage layer may be modified before an email is sent. In some embodiments, if the user does not cooperate with the time limit information, only S3 and S4 may be included.

S5: When receiving an email sending operation of the user, the sending control submodule queries and obtains, from the storage layer, time limit information and email data that are configured by the user on an email editing interface.

In some embodiments, after data corresponding to the first email being edited is stored at the storage layer, the data will be associated with a folder of to-be-sent emails. In this way, after receiving the email sending operation of the user, the sending control submodule may search for, from the email header list, the email text list, and the attachment list, entries associated with the folder of to-be-sent emails, so as to obtain the time limit information and email data that are configured by the user on the email editing interface. That is, fields and data of the first email are obtained.

S6: The sending control submodule constructs a first email.

In some embodiments, the sending control submodule obtains fields and data of the first email from the storage layer based on a specification of the MIMEMessage protocol, and constructs an email header and an email body (including email text and an email attachment) of the first email.

The MIMEMessage protocol is an email format standard, including an email header specification (refer to rfc4021) and an email body specification.

In this embodiment of this application, the email header specification in the MIMEMessage protocol is improved to encapsulate the time limit information into the email header.

In some embodiments, the first device may add a reminder field in the email header. The foregoing reminder field may include one or more of a field representing a reminder time point (for example, ReminderTime), a field representing a deadline (EndTime), and a field representing a reminder period. In this way, after being received, the time limit information may be written into a field corresponding to an email header based on a type of the time limit information.

For example, an email header with a reminder time point and a deadline added is as follows:
Return-Path:mlemos@acm.org
To:Manuel Lemosmlemos@linux.local
Subject:Testing Manuel lemos'MIME E-mail composing and sending PHP class:HTML massage
From:mlemos:mlemos@acm.org
Reply-To: mlemos@acm.org
Sender: mlemos@acm.org
Remindertime:300//5 min before the deadline
EndTime:2021xxxxx
MIME-Version:1.0
Content-Type:multipart/mixed;

The reminder time point (Remindertime:300) and the deadline (EndTime:2021xxxx) in the foregoing email header are newly added fields, and the other parts are an example of a conventional email header. For the foregoing deadline, refer to a standard form of date. For example, after being converted into a standard time format, 18:30:00 on Sep. 1, 2012 is 20120901T183000.

For another example, an email header with a reminder period and a deadline added is as follows:
Return-Path:mlemos@acm.org
To:Manuel Lemosmlemos@linux.local
Subject:Testing Manuel lemos'MIME E-mail composing and sending PHP class:HTML massage
From:mlemos:mlemos@acm.org
Reply-To: mlemos@acm.org
Sender: mlemos@acm.org
RRULE: FREQ=MONTHLY; INTERVAL=2; BYADY=29//29$^{th}$ every other month
EndTime:2021xxxxx
MIME-Version:1.0
Content-Type:multipart/mixed;

The reminder period (RRULE:FREQ=MONTHLY; INTERVAL=2; BYADY=29) and the deadline (EndTime:

2021xxxx) in the foregoing email header are newly added fields, and the other parts are an example of a conventional email header.

The foregoing reminder period may be configured based on an iCalendar specification. The iCalendar, referred to as "iCal", is a standard for "calendar data exchange" (RFC 2445). This standard provides a public data format for storing information about calendar, such as an event, an appointment, and a to-do item. This standard not only allows the user to send a meeting or a to-do event by email, but also allows independent use, not limited to a specific transport protocol. This standard can support setting of a repeated reminder.

It can be understood that RRULE, Remindertime, and EndTime are only example fields for storing time limit information. In another embodiment, another field may also be defined for storing the time limit information. In this embodiment of this application, a form of field for storing the time limit information is not specifically limited.

Figure 20:
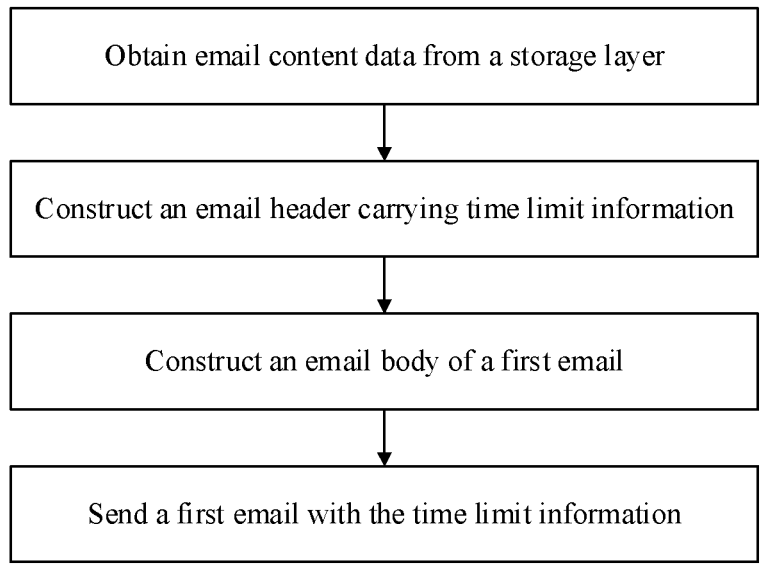
FIG. 20 is a flowchart of steps of sending an email in an email creation method according to an embodiment of this application.

That is, as shown in FIG. 20, the method according to this embodiment of this application may include: obtaining email content data from a storage layer, where the email content data includes email header-related data and email body-related data, the email header-related data includes an address of a recipient, an address of a recipient, an address of a carbon copy recipient, an email subject, time limit information in a standard format, and the like, and the email body-related data includes email text, an email attachment, and the like; constructing, based on the email header-related data and the MIMEMessage protocol, an email header with time limit information, that is, an email header of a first email; and constructing, based on the email body-related data and the MIMEMessage protocol, an email body of the first email. It can be understood that, after the email header and the email body of the first email are constructed, a complete first email is obtained.

In addition, the sending control submodule may further use a corresponding email transport protocol to send the first email by using a corresponding server. For example, when an IMAP account is logged in by using the email APP, the sending control submodule may send the first email by using an SMTP server based on the SMTP. For another example, when a POP account is logged in by using the email APP, the sending control submodule may send the first email by using an SMTP server based on the SMTP.

In addition, after the first email is created, management of the first email by the electronic device also starts. Each first email corresponds to a task item. The task item has a task state, and the task state may be a reply status of a receiving mailbox to the first email. If all the receiving mailboxes reply to the first email, the task state is completed. If there is a receiving mailbox that does not reply to the first email, the task is not completed.

In this embodiment of this application, task management may be divided into centralized task displaying, task state refreshing, task statistics, and the like.

Figure 21:
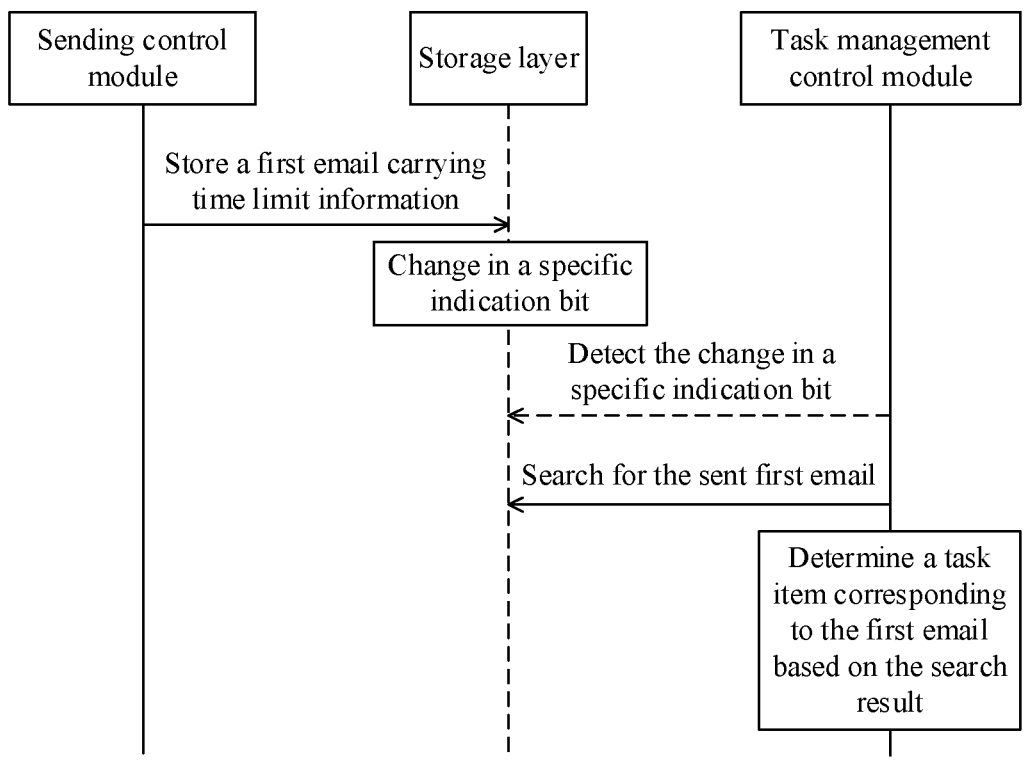
FIG. 21 is a diagram illustrating interaction for centralized displaying of tasks by a first device in a method according to an embodiment of this application.

In some embodiments, as shown in FIG. 21, after the sending control module writes the obtained time limit information into the storage layer, a specific indication bit at the storage layer changes from a first mark to a second mark. The task management control module of the electronic device triggers query of the first email from the storage layer after detecting the change in the specific indication bit at the storage layer. For example, the task management control module may search the stored email header list for an entry with time limit information, for example, check whether there is a reminder field in an entry of the email header list.

If an entry with time limit information is found, and a corresponding email has been sent (for example, this email has been associated with a folder of sent emails), the task management control module creates a task item based on an email (that is, a first email) corresponding to the entry, and displays, by using the display control module, the task item on a task management interface shown in FIG. 14(A). In addition, after the task management control module of the electronic device completes the search, the specific indication bit at the storage layer may be further restored to the first mark.

In addition, after the first email is sent, in this embodiment of this application, the reminder control module may remind the user to pay attention to a reply status of the first email.

Figure 22:
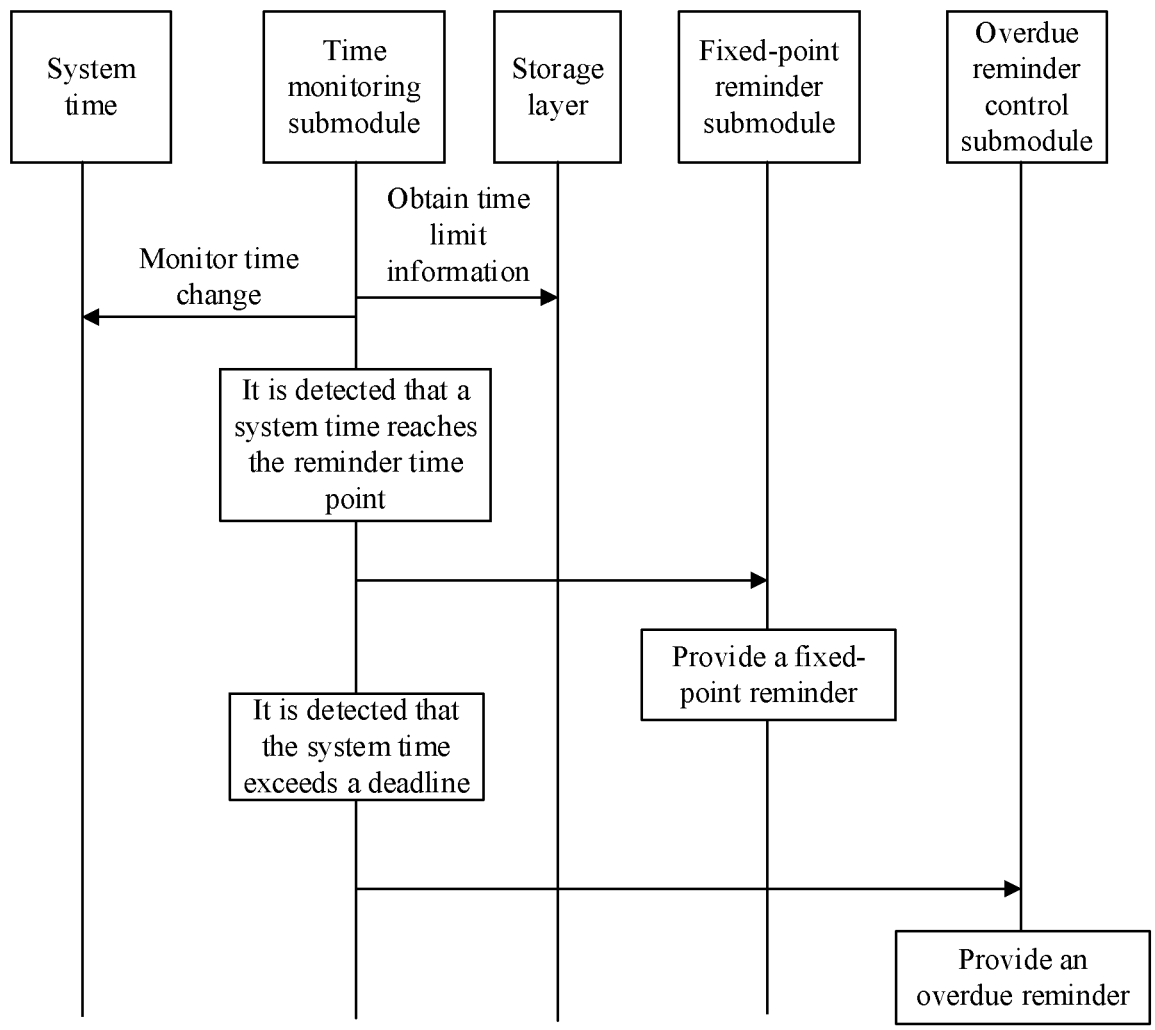
FIG. 22 is a diagram illustrating interaction between functional modules for implementing an internal reminder in an email application according to an embodiment of this application.

In an implementation, the reminder control module may include a time monitoring submodule, a fixed-point reminder submodule, and an overdue reminder submodule. For example, the time limit information includes a reminder time point and a deadline. As shown in FIG. 22, the time monitoring submodule monitors a change in a system time, and compares the system time with the time limit information stored at the storage layer. If it is detected that the system time reaches a reminder time indicated by the time limit information, the fixed-point reminder submodule or the overdue reminder submodule starts an email reminder.

For example, when the time monitoring submodule detects that the system time reaches the reminder time point, the time monitoring submodule may notify the fixed-point reminder submodule to start a fixed-point reminder, so as to remind the user to pay attention to the published first email.

In an implementation, the fixed-point reminder may be a notification reminder and/or a task on-top reminder. For example, the fixed-point reminder submodule may invoke a notification mechanism (NotificationManager) at the application framework layer to provide a notification reminder. For example, the fixed-point reminder submodule may determine a first email with a smallest difference between a reminder time point and a system time, and mark the first email to represent that the first email needs to be displayed on top. In this way, when the task management control module sorts task items corresponding to the sent first email, task items with on-top display marks are arranged before other task items to obtain a task item list. In this way, when the display control module displays the task item list on the task management interface, task items reaching the corresponding reminder time point may be displayed on top.

Then, when the time monitoring submodule detects that the system time exceeds the deadline and at least one receiving mailbox does not reply, an overdue reminder is provided.

In an implementation, the overdue reminder may be a notification reminder, a task on-top reminder, and/or an overdue mark. The overdue reminder submodule may invoke the notification mechanism (NotificationManager) at the application framework layer to provide a notification reminder. The overdue reminder submodule may determine a first email with a smallest difference between a deadline and a system time, and mark the first email to represent that the first email needs to be displayed on top. In this way, when the task management control module sorts task items corresponding to the sent first email, task items with on-top display marks are arranged before other task items to obtain a task item list. The display control module displays the task item list on the task management interface. In addition, the fixed-point reminder submodule and the overdue reminder submodule may mark the first email differently, and the reminder control module may further include a marking submodule. In this way, when the marking submodule identifies that the first email is marked by the overdue reminder submodule, the marking submodule may invoke the view system to display an overdue mark corresponding to the first email on the task management interface, such as the character "overdue" in FIG. 16.

Figure 23:
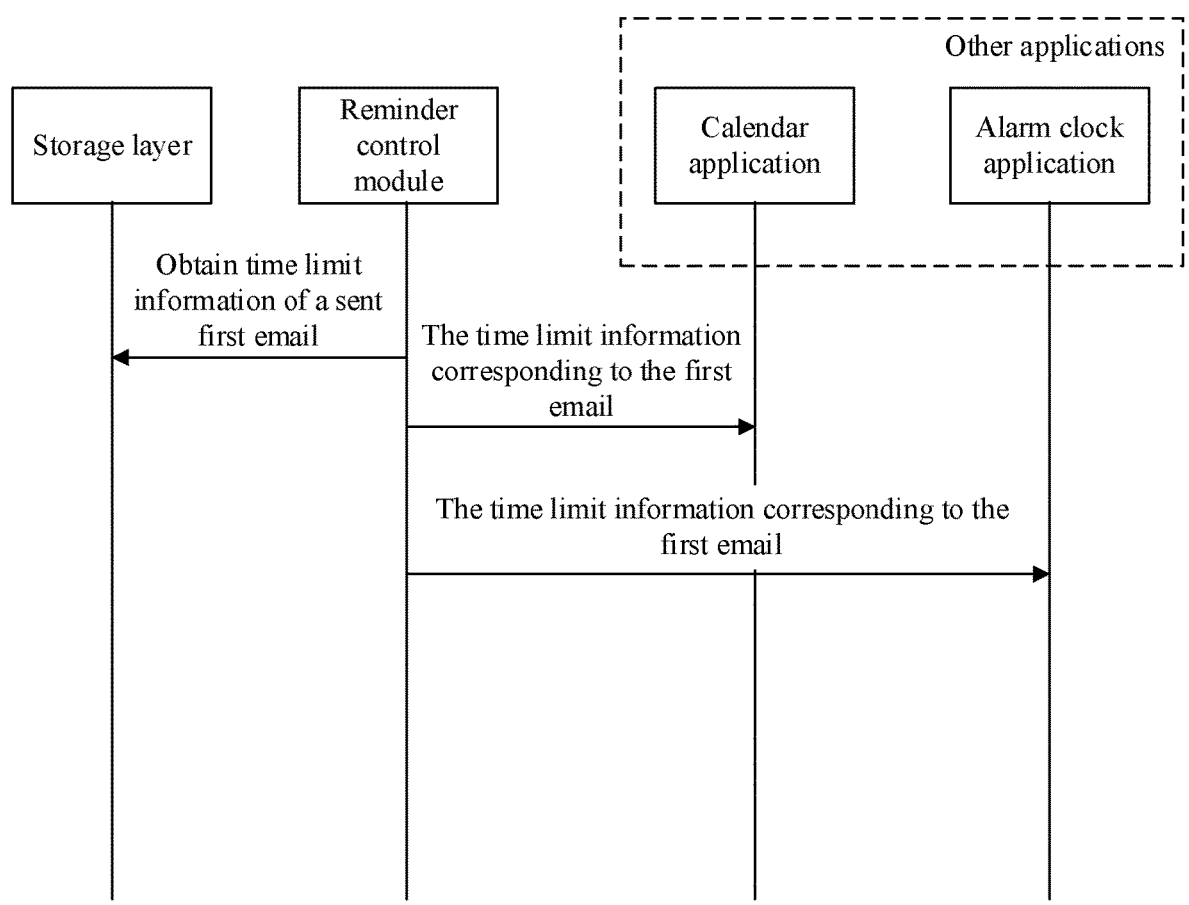
FIG. 23 is a diagram illustrating interaction between functional modules for implementing a reminder in other applications according to an embodiment of this application.

Certainly, in another possible embodiment, as shown in FIG. 23, the reminder control module of the electronic device queries, after detecting that an email is stored at the storage layer (for example, detecting that the specific indication bit at the storage layer becomes the second mark), whether the stored email has time limit information. If there is time limit information, the time limit information may be obtained from the storage layer and transmitted to another program (for example, an alarm clock application or a schedule application) to implement an alarm clock reminder and/or a schedule reminder.

Figure 24:
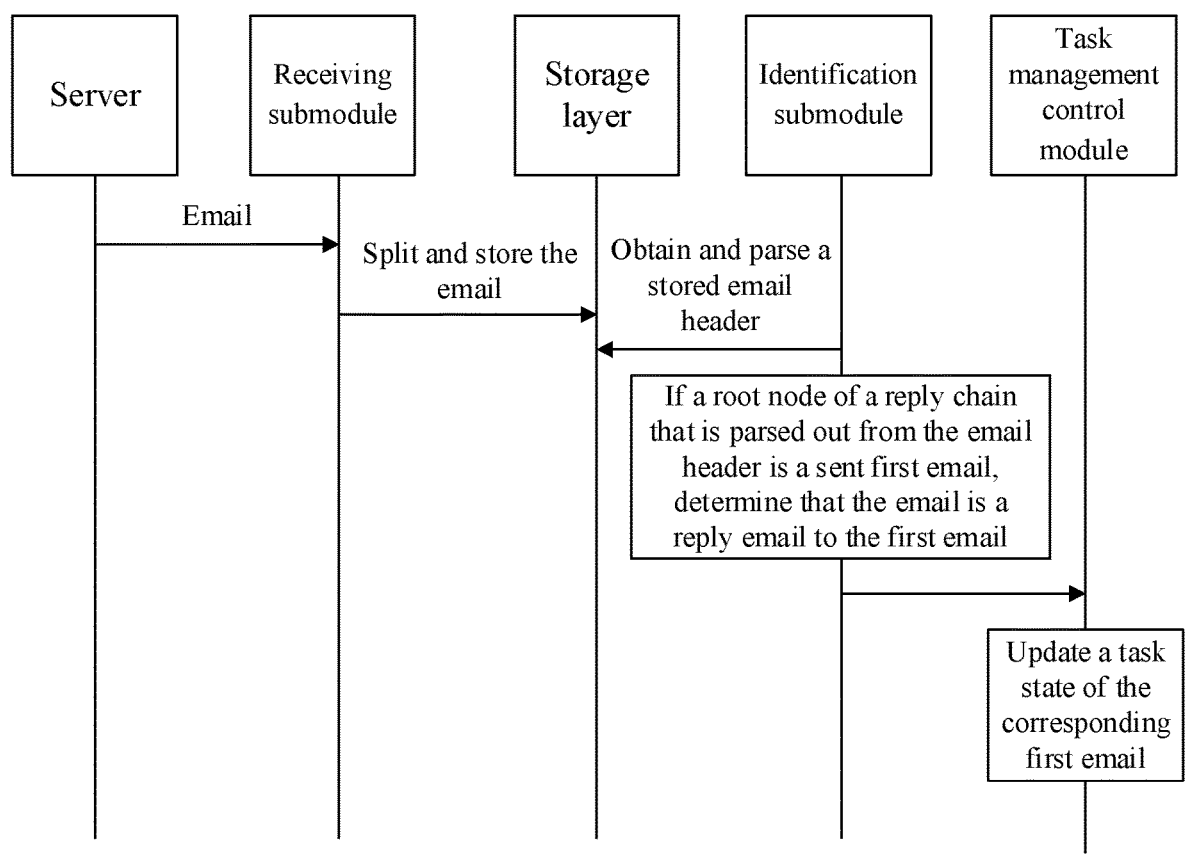
FIG. 24 is a diagram illustrating interaction between functional modules for monitoring a task state of a sent first email according to an embodiment of this application.

In some embodiments, the reception control module may include a receiving submodule and an identification submodule. As shown in FIG. 24, the receiving submodule may receive a new email from a server. For example, when an IMAP account (or a POP account) is logged in by using the email APP of the electronic device, the receiving submodule may receive an email by using an SMTP server.

In some embodiments, the receiving submodule may periodically receive new emails from a server based on a predetermined email receiving period. For example, emails are received once from a corresponding server every 10 minutes.

In some other embodiments, when the email APP is started, the receiving submodule may be automatically triggered to receive new emails from a server.

In another possible embodiment, when an email receiving operation of the user, such as a slide-down operation of the user on a mailbox interface, is received, the receiving submodule may further receive a new email from a server in response to the received slide-down operation.

After receiving the email, the receiving submodule may further split the email into an email header part, an email text part, and an email attachment part, and store the email header part, the email text part, and the email attachment part in an email header list, an email text list, and an attachment list, respectively. In addition, the identification submodule may further parse out the email header of the email. The email header includes a key header field: References (refer to RFC4021 and RFC2822). References includes a list of recorded message-ids, that is, a reply chain of the email. For example, an email B replies to an email A, and References may be "MessageA,MessageB". In References, MessageA is the message-id of the email A, and MessageB is the message-id of the email B. MessageA is a root node of References, and is also a source email corresponding to MessageB. Therefore, it may be determined that the email B is a reply to the email A.

Therefore, in some embodiments, the identification submodule can obtain the root node of the new email by parsing the References field in the email header, and determine whether the root node of the new email is a first email published by the current mailbox, that is, determine whether the new email is a reply email to the first email.

If yes, the task management control module updates a task state corresponding to the first email. For example, the new email is added to a statistical table corresponding to the first email. Then a reply proportion of the first email is determined based on a quantity of reply emails in the statistical table and with reference to a quantity of receiving mailboxes of the first email. Therefore, the task state corresponding to the first email is updated. In this way, the user can know a task completion status of the first email more quickly and conveniently.

After the task state corresponding to the first email is updated, the display control module may also correspondingly update a task state of a task item corresponding to the first email on the task management interface.

In some other embodiments, after the identification submodule determines that the root node of the new email is a message-id of the first email, whether the new email is a duplicated email may be further determined with reference to the statistical table corresponding to the first email. Therefore, accuracy of statistics is improved.

For example, the identification submodule may compare a stored email in the statistical table with the new email. For example, References fields of the stored email and the new email are compared. If the References field of the stored email and the new email are the same, the new email is determined as a duplicated reply email. There is no need to put the new email into the statistical table, and update of the task state is not triggered. For example, if the References field of the stored email in the statistical table is "MessageA, MessageB" and the References field of the new email is "MessageA,MessageB", then the new email is determined as a duplicate email.

Apparently, the electronic device may further quickly identify a reply email corresponding to the sent first email based on References fields of received emails. When it is required to remind the user to pay attention to the published first email, the electronic device may further first identify a corresponding reply email by using the References field, and arrange the identified reply email before other emails, thereby facilitating check by the user.

In addition, the electronic device may create a first email, or may receive a first email sent by another mailbox. The identification submodule may be further configured to identify whether a received email is a first email sent by another mailbox. The following description is based on an example in which the electronic device is an email receiving end of a first email.

Figure 25:
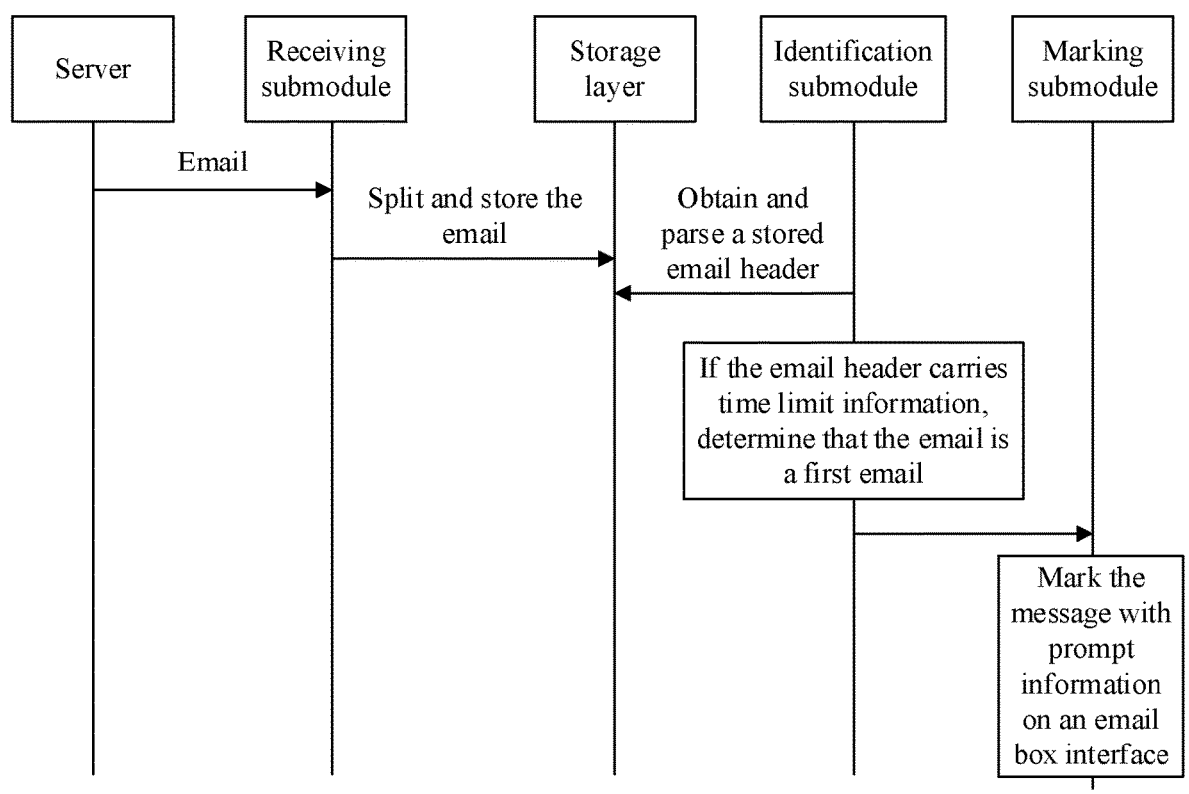
FIG. 25 is a diagram illustrating interaction between functional modules for implementing a reminder for a received first email according to an embodiment of this application.

In an implementation, as shown in FIG. 25, the identification submodule may parse and identify an email header stored at a storage layer. For example, after an email header of a received email is parsed based on the MIMEMessage protocol, it is determined whether a field for storing time limit information exists in the email header. If so, it is determined that the first email sent by another mailbox is received.

For example, the identification submodule may identify fields such as RRULE and EndTime in the email header, so as to determine whether a new email is a first email.

Finally, when the identification submodule identifies that the first email has been received, the marking submodule may invoke the view system to display prompt information 1 corresponding to the first email on a mailbox interface 703.

In an example, after the identification submodule determines that an email stored at the storage layer is a first email, the marking submodule may further write, at the storage layer, a specific identifier corresponding to the email, where the specific identifier is used to represent that the email is the first email. In this way, when emails received by the mailbox of the user are displayed on the mailbox interface 703, prompt information 1 is displayed on the mailbox interface 703 corresponding to an email with a specific identifier; and for an email without a specific identifier, only the email is displayed on the mailbox interface 703.

After the identification submodule determines that a received email is a first email, the time monitoring submodule in the reminder control module may monitor a system time, and compare the system time with time limit information of the first email. If it is detected that the system time reaches a reminder time indicated by the time limit information, the fixed-point reminder submodule or the overdue reminder submodule starts an email reminder.

Figure 26:
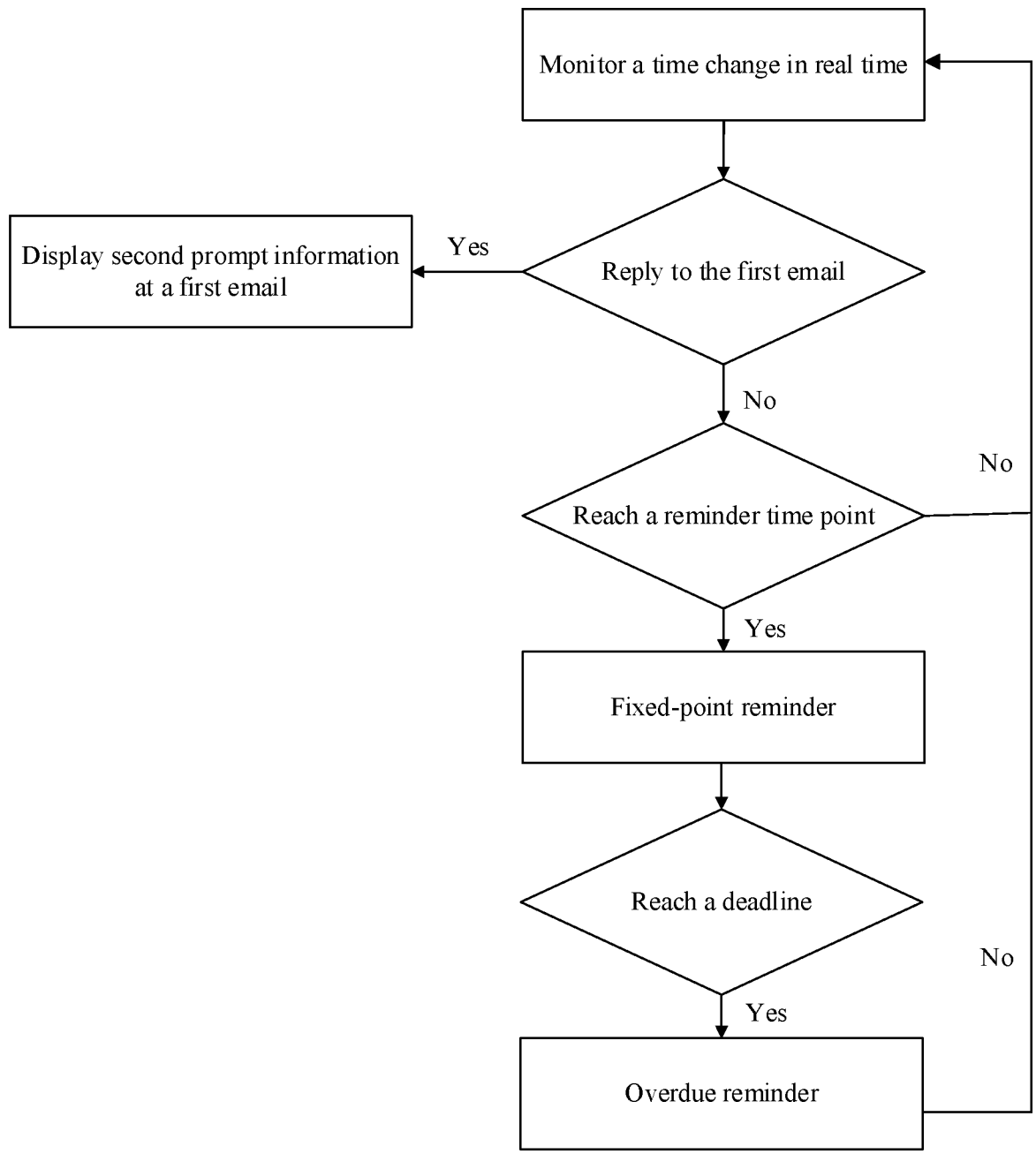
FIG. 26 is a flowchart of steps of providing a reminder for a first device that has performed reception according to an embodiment of this application.

Using the time limit information being a reminder time point and a deadline as an example, with reference to FIG. 26, the method according to this embodiment of this application may include: A time monitoring submodule monitors a change in a system time in real time. In addition, the time monitoring submodule is further configured to receive an operation sensed by a reply control. The reply control may be a combination of a plurality of controls. For example, the reply control may include a control for triggering displaying of a details interface of a first email, a control for triggering editing of a reply email, and a control for sending an email. In this way, the time monitoring submodule may detect, in a timely manner, whether the current mailbox replies to the first email. For example, when user operation information transmitted by the control for triggering displaying of a details interface of a first email, a control for triggering editing of a reply email, and a control for sending an email is sequentially received, it may be determined that the first email has been replied to.

If the corresponding current mailbox has replied to the first email, the marking submodule is notified to adjust the prompt information corresponding to the first email, for example, replace prompt information 1 displayed at the first email with prompt information 2.

If the current mailbox does not reply to the first email, it is determined whether the system time reaches the reminder time point of the first email. When the reminder time point is reached, a fixed-point reminder is started.

In an implementation, the fixed-point reminder may be a notification reminder and/or an email on-top reminder (for example, as shown in FIG. 10(A) and FIG. 10(B)).

For example, the reminder control module may invoke a notification mechanism (NotificationManager) at the application framework layer to provide a notification reminder.

For example, the reminder control module may search for an entry corresponding to the received first email from the email header list, and obtain the reminder time point from the entry. Then, the reminder control module compares the reminder time point with the system time, and if the system time reaches the reminder time point, the first email is marked at the storage layer to represent that the email needs to be displayed on top. In this way, when arranging a list of received emails, the display control module arranges, before other received emails, the first email marked as to be displayed on top, thereby implementing an email on-top reminder.

Figure 9B:
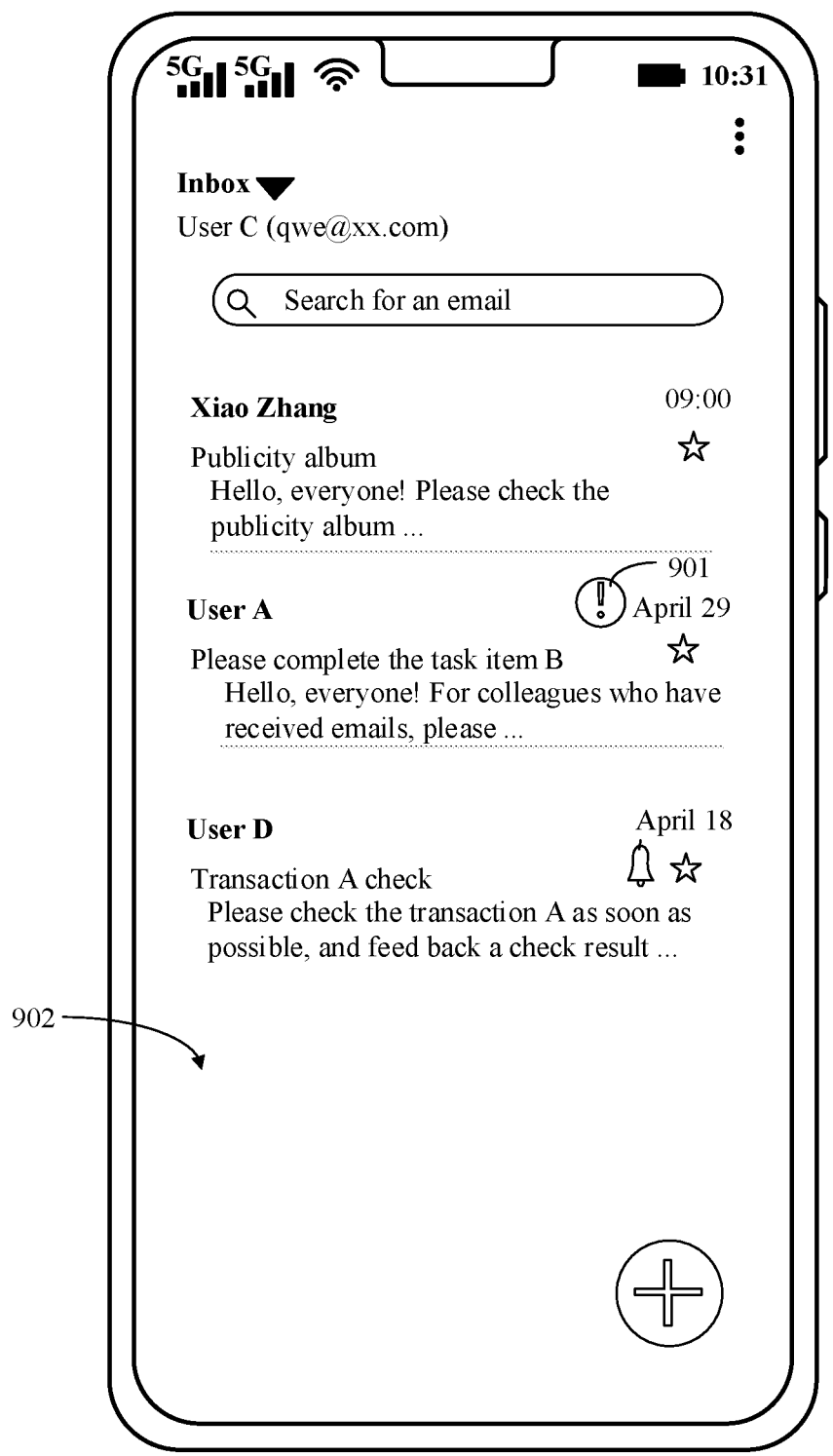

Then, the time monitoring submodule continues to determine whether the system time reaches the deadline. When the system time exceeds the deadline, an overdue reminder is provided (as shown in FIG. 9(B)). For example, when determining that the system time has exceeded the deadline, the time monitoring submodule instructs the marking submodule to change the prompt information 1 corresponding to the first email to prompt information 3.

Figure 11B:
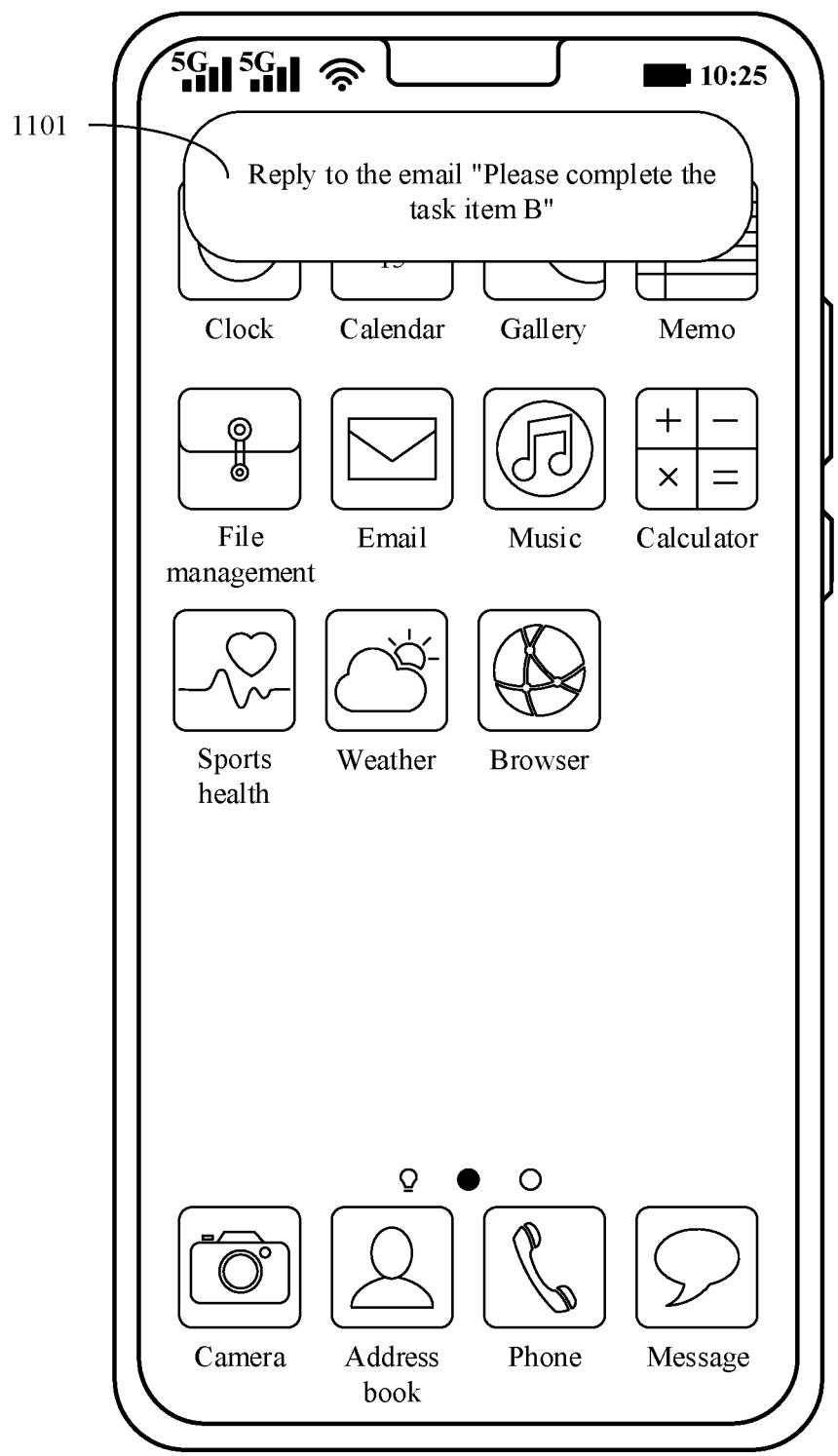

Certainly, in another possible embodiment, the reminder control module may further transmit the time limit information at the storage layer to another program (for example, an alarm clock application or a schedule application) to implement an alarm clock reminder and/or a schedule reminder, as shown in FIG. 11(A), FIG. 11(B), and FIG. 12A.

An embodiment of this application further provides an electronic device, where the electronic device may include a wireless communication module, a memory, and one or more processors. The wireless communication module and the memory are coupled to the processor. The memory is configured to store computer program code, where the computer program code includes computer instructions. When the processor executes the computer instructions, the electronic device is enabled to perform the steps in the foregoing embodiments. Certainly, the electronic device includes, but is limited to, the wireless communication module, the memory, and the one or more processors described above. For example, for a structure of the electronic device, refer to the structure shown in FIG. 2.

Figure 27:
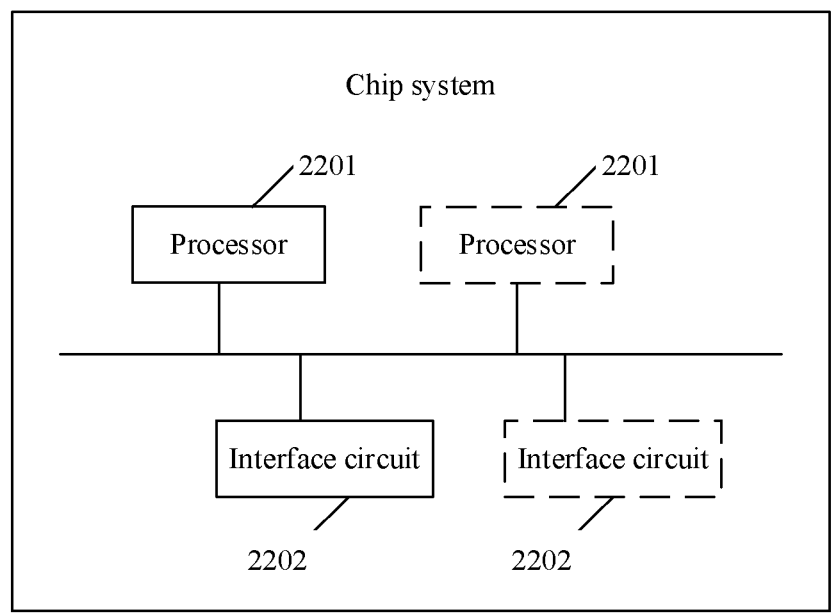
FIG. 27 is a schematic diagram of composition of a chip system according to an embodiment of this application.

An embodiment of this application further provides a chip system, where the chip system may be applied to the electronic device in the foregoing embodiment. As shown in FIG. 27, the chip system includes at least one processor 2201 and at least one interface circuit 2202. The processor 2201 may be a processor in the foregoing electronic device. The processor 2201 and the interface circuit 2202 may be interconnected by using a line. The processor 2201 may receive computer instructions from the memory of the foregoing electronic device by using the interface circuit 2202 and execute the computer instructions. When the computer instructions are executed by the processor 2201, the electronic device is enabled to perform the steps performed by the mobile phone in the foregoing embodiment. Certainly, the chip system may further include other discrete devices. This is not specifically limited in this embodiment of this application.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above. For the specific working processes of the system, apparatus and units described above, reference may be made to the corresponding processes in the above-mentioned method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such understanding, the technical solution of this embodiment of this application which is essential or a part contributing to the prior art or all or a part of the technical solution may be embodied in the form of a software product, and the computer software product is stored in a storage medium and includes several instructions for enabling a computer device (which may be a personal computer, a server or a network device) for a processor to perform all or some steps of the method according to each embodiment of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but the protection scope of the embodiments of this application is not limited thereto. Any variation or replacement made within the technical scope disclosed in the embodiments of this application shall fall within the protection scope of the embodiments of this application. Therefore, the protection scope of the embodiments of this application shall be subject to the protection scope of the claims.

The invention claimed is:

1. An email management method, wherein the method comprises:
    sending, by an electronic device, a first email to a first recipient, a second recipient, and a third recipient by using an email application installed on the electronic device and configured with a first email address of a user of the electronic device, wherein the first email instructs each recipient of the first email to perform a task associated with the first email;
    presenting, by the electronic device, an editing interface of the first email on the email application, wherein the editing interface of the first email comprises a reminder bar, and the reminder bar comprises a second control;
    receiving, by the electronic device, a second operation of the user on the second control of the reminder bar;
    configuring, by the electronic device, a first time limit for the first email in response to the second operation of the user on the second control, wherein the first time limit is a deadline time point for replying to the first email;
    receiving, by the electronic device, a first reply email to the first email from the first recipient;
    displaying, by the electronic device, first completion information in a task item of the first email in response to the electronic device receiving the first reply email, wherein the first completion information indicates a first reply completion status of the first email, the first reply email is addressed to the first email address, and wherein the first completion information is based on data parsed from the first reply email by the email application installed on the electronic device;
    receiving, by the electronic device, a second reply email from the second recipient to the first email;
    displaying, by the electronic device, second completion information in a task item of the first email in response to the electronic device receiving the second reply email, wherein the second completion information indicates a second reply completion status of the first email, the second completion information is determined based on a reply status representing whether a reply email to the first email has been received for each recipient of the first email, the second reply email is addressed to the first email address, and wherein the second completion information is based on data parsed from the second reply email by the email application installed on the electronic device; and
    in response to a system time of the electronic device reaching the first time limit, and no reply email being received in response to the first email from the third recipient, displaying, by the electronic device, the first email on top of an outbox interface of the email application, and displaying an overdue mark.

2. The method according to claim 1, wherein the first completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email.

3. The method according to claim 1, wherein the second completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email.

4. The method according to claim 1, wherein the editing interface of the first email further comprises a recipient input box; and
    wherein the method further comprises displaying, by the electronic device, mailbox names or mailbox addresses of the first recipient and the second recipient and the third recipient in the recipient input box in response to a first operation of the user on the recipient input box.

5. The method according to claim 1, wherein after the electronic device receives emails, the method further comprises:
    parsing out a reply chain of each of the received emails from email headers of the received emails; and
    determining, by the email application installed on the electronic device, that emails whose source emails are the first email and that are among the received emails are reply emails to the first email.

6. The method according to claim 1, wherein the method further comprises:
    configuring, by the electronic device via the editing interface, the first email comprising first time limit information corresponding to the deadline time point and second time limit information corresponding to a reminder time point using a first control,
    wherein sending the first email comprises sending the first email comprising the first time limit information and the second time limit information in a header list of the first email, and
    wherein the first email causes a receiving mailbox associated with another electronic device corresponding to at least the first recipient of the first email to automatically configure a deadline based at least in part on the first time limit information and a reminder based on the second time limit information.

7. The method according to claim 1, wherein the method further comprises:
    configuring outputting of first prompt information associated with a future time point;
    in response to the first reply email, replacing, by the email application installed on the electronic device, the first prompt information associated with the first email with second prompt information associated with the first email; and displaying a user interface comprising the second prompt information, wherein the second prompt information comprises graphic information or text information.

8. The email management method according to claim 1, wherein the first completion information is based on data parsed from the first reply email by the email application installed on the electronic device and corresponding to the first email address that is a recipient of the first reply email, and the second completion information is based on data parsed from the second reply email by the email application installed on the electronic device.

9. The email management method according to claim 1, wherein the first email comprises the first time limit.

10. The email management method according to claim 9, wherein the first time limit causes an email application running on a second electronic device corresponding to the first recipient to automatically provide a reminder based on the first time limit.

11. The email management method according to claim 9, wherein the first time limit causes a second application external from an email application running on a second electronic device corresponding to the first recipient to automatically provide a reminder based on the first time limit.

12. An electronic device, comprising:
a processor; and
a computer program stored in a memory;
wherein the computer program is executable by the processor to:
send a first email to a first recipient, a second recipient, and a third recipient by using an email application installed on the electronic device and configured with a first email address of a user of the electronic device, wherein the first email instructs each recipient of the first email to perform a task associated with the first email;
present an editing interface of the first email on the email application, wherein the editing interface of the first email comprises a reminder bar, and the reminder bar comprises a second control;
receive a second operation of the user on the second control of the reminder bar;
configure a first time limit for the first email in response to the second operation of the user on the second control, wherein the first time limit is a deadline time point for replying to the first email;
receive a first reply email to the first email from the first recipient;
display first completion information in a task item of the first email in response to the electronic device receiving the first reply email, wherein the first completion information indicates a first reply completion status of the first email, the first reply email is addressed to the first email address, and wherein the first completion information is based on data parsed from the first reply email by the email application installed on the electronic device;
receive a second reply email from the second recipient to the first email;
display second completion information in a task item of the first email in response to the electronic device receiving the second reply email, wherein the second completion information indicates a second reply completion status of the first email, the second completion information is determined based on a reply status representing whether a reply email to the first email has been received for each recipient of the first email, the second reply email is addressed to the first email address, and wherein the second completion information is based on data parsed from the second reply email by the email application installed on the electronic device; and
in response to a system time of the electronic device reaching the first time limit, and no reply email being received in response to the first email from the third recipient, display the first email on top of an outbox interface of the email application, and display an overdue mark.

13. The electronic device according to claim 12, wherein the first completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email, the plurality of recipients comprising at least the first recipient and the second recipient.

14. The electronic device according to claim 12, wherein the second completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email, the plurality of recipients comprising at least the first recipient and the second recipient.

15. The electronic device according to claim 12, wherein the first completion information is based on data parsed from the first reply email by the email application installed on the electronic device and corresponding to the first email address that is a recipient of the first reply email, and the second completion information is based on data parsed from the second reply email by the email application installed on the electronic device.

16. The electronic device according to claim 12, wherein the first email comprises the first time limit.

17. A non-transitory computer storage medium, wherein the non-transitory computer storage medium stores computer instructions, and when the computer instructions are run on an electronic device, the electronic device is enabled to:
send a first email to a first recipient, a second recipient, and a third recipient by using an email application installed on the electronic device and configured with a first email address of a user of the electronic device, wherein the first email instructs each recipient of the first email to perform a task associated with the first email;

present an editing interface of the first email on the email application, wherein the editing interface of the first email comprises a reminder bar, and the reminder bar comprises a second control;

receive a second operation of the user on the second control of the reminder bar;

configure a first time limit for the first email in response to the second operation of the user on the second control, wherein the first time limit is a deadline time point for replying to the first email;

receive a first reply email to the first email from the first recipient;

display first completion information in a task item of the first email in response to the electronic device receiving the first reply email, wherein the first completion information indicates a first reply completion status of the first email, the first reply email is addressed to the first email address, and wherein the first completion information is based on data parsed from the first reply email by the email application installed on the electronic device;

receive a second reply email from the second recipient to the first email;

display second completion information, in a task item of the first email in response to the electronic device receiving the second reply email, wherein the second completion information indicates a second reply completion status of the first email, the second completion information is determined based on a reply status representing whether a reply email to the first email has been received for each recipient of the first email, the second reply email is addressed to the first email address, and wherein the second completion information is based on data parsed from the second reply email by the email application installed on the electronic device; and in response to a system time of the electronic device reaching the first time limit, and no reply email being received in response to the first email from the third recipient, display the first email on top of an outbox interface of the email application, and display an overdue mark.

18. The non-transitory computer storage medium according to claim 17, wherein the first completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email, the plurality of recipients comprising at least the first recipient and the second recipient.

19. The non-transitory computer storage medium according to claim 17, wherein the second completion information comprises a reply proportion of the first email and/or a reply proportion chart of the first email, wherein the reply proportion of the first email comprises a statistical result representing a correlation between a quantity of received replies corresponding to the first email and a quantity of recipients corresponding to the first email, wherein the email application installed on the electronic device automatically counts the quantity of received replies corresponding to the first email, and wherein the reply proportion chart represents the quantity of received replies corresponding to the first email and the quantity of recipients corresponding to the first email, wherein the reply proportion or the reply proportion chart is associated with a plurality of recipients of the first email, the plurality of recipients comprising at least the first recipient and the second recipient.

20. The non-transitory computer storage medium according to claim 17, wherein the first completion information is based on data parsed from the first reply email by the email application installed on the electronic device and corresponding to the first email address that is a recipient of the first reply email, and the second completion information is based on data parsed from the second reply email by the email application installed on the electronic device.

* * * * *